(12) United States Patent
Müller et al.

(10) Patent No.: US 9,856,791 B2
(45) Date of Patent: Jan. 2, 2018

(54) WAVE DISC ENGINE APPARATUS

(71) Applicant: Board of Trustees of Michigan State University, East Lansing, MI (US)

(72) Inventors: Norbert Müller, Haslett, MI (US); Janusz Piechna, Warsaw (PL); Guangwei Sun, East Lansing, MI (US); Pablo-Francisco Parraga, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 1016 days.

(21) Appl. No.: 13/969,900

(22) Filed: Aug. 19, 2013

(65) Prior Publication Data

US 2013/0327010 A1    Dec. 12, 2013

Related U.S. Application Data

(63) Continuation of application No. PCT/US2012/026527, filed on Feb. 24, 2012.
(Continued)

(51) Int. Cl.
*F02C 3/14* (2006.01)
*F01D 1/32* (2006.01)
(Continued)

(52) U.S. Cl.
CPC ............. *F02C 3/14* (2013.01); *F01D 1/32* (2013.01); *F02C 3/165* (2013.01); *F02C 5/04* (2013.01);
(Continued)

(58) Field of Classification Search
CPC ...... B01J 3/08; F01D 1/32; F02C 5/00; F02C 5/02; F02C 5/04; F02C 5/12; F02K 7/02; F02K 7/06; F23R 7/00
See application file for complete search history.

(56) References Cited

U.S. PATENT DOCUMENTS 1,291,273 A * 1/1919 Tyler ..................... F02C 5/02
                                                        415/166
2,045,152 A    6/1936 Lebre
(Continued)

FOREIGN PATENT DOCUMENTS

BE        443643 A    1/1942
CH        225426 A    1/1943
(Continued)

OTHER PUBLICATIONS

DE 10355356 Translation; Doebbeling et al. "Gas flow cooling method, by cooling fluid for removing heat energy from gas flow to temperature below ambient temperature of turbomachine". Jul. 14, 2005.*

(Continued)

*Primary Examiner* — Pascal M Bui Pho
*Assistant Examiner* — Kyle Thomas
(74) *Attorney, Agent, or Firm* — Harness, Dickey & Pierce, PLC

(57) ABSTRACT

A wave disc engine apparatus is provided. A further aspect employs a constricted nozzle in a wave rotor channel. A further aspect provides a sharp bend between an inlet and an outlet in a fluid pathway of a wave rotor, with the bend being spaced away from a peripheral edge of the wave rotor. A radial wave rotor for generating electricity in an automotive vehicle is disclosed in yet another aspect.

40 Claims, 36 Drawing Sheets

Related U.S. Application Data

(60) Provisional application No. 61/446,882, filed on Feb. 25, 2011.

(51) Int. Cl.
  *F02C 3/16* (2006.01)
  *F02C 5/04* (2006.01)
  *F02C 5/10* (2006.01)
  *F02K 7/04* (2006.01)

(52) U.S. Cl.
  CPC .................. *F02C 5/10* (2013.01); *F02K 7/04* (2013.01); *F05D 2240/302* (2013.01); *F05D 2250/82* (2013.01); *Y02T 50/673* (2013.01)

(56) References Cited

U.S. PATENT DOCUMENTS

| | | | |
|---|---|---|---|
| 2,399,394 A | 4/1946 | Seippel | |
| 2,864,237 A | 12/1958 | Coleman, Jr. et al. | |
| 2,904,245 A | 9/1959 | Pearson | |
| 2,904,246 A | 9/1959 | Pearson | |
| 2,970,745 A | 2/1961 | Berchtold | |
| 3,726,619 A | 4/1973 | Adams | |
| 3,756,310 A | 9/1973 | Becker | |
| 3,797,559 A | 3/1974 | Paul et al. | |
| 3,811,796 A | 5/1974 | Coleman, Jr. et al. | |
| 3,828,573 A | 8/1974 | Eskeli | |
| 3,869,808 A | 3/1975 | Sawyer | |
| 3,879,937 A | 4/1975 | Jenny | |
| 3,952,798 A | 4/1976 | Jacobson et al. | |
| 3,958,899 A | 5/1976 | Coleman, Jr. et al. | |
| 4,002,414 A | 1/1977 | Coleman, Jr. et al. | |
| 4,005,587 A | 2/1977 | Eskeli | |
| 4,044,824 A | 8/1977 | Eskeli | |
| 4,171,623 A | 10/1979 | Lavigne, Jr. et al. | |
| 4,182,402 A | 1/1980 | Adrian | |
| 4,397,613 A | 8/1983 | Keller | |
| 4,582,128 A | 4/1986 | Jarreby | |
| 4,597,835 A | 7/1986 | Moss | |
| 4,627,890 A | 12/1986 | Porter et al. | |
| 4,662,342 A | 5/1987 | Altmann et al. | |
| 4,719,746 A | 1/1988 | Keller | |
| 5,052,898 A | 10/1991 | Cook | |
| 5,116,205 A | 5/1992 | Kirchhofer | |
| 5,119,886 A | 6/1992 | Fletcher et al. | |
| 5,154,580 A | 10/1992 | Hora | |
| 5,267,432 A | 12/1993 | Paxson | |
| 5,274,994 A | 1/1994 | Chyou et al. | |
| 5,297,384 A | 3/1994 | Paxson | |
| 5,445,216 A | 8/1995 | Cannata | |
| 5,464,325 A | 11/1995 | Albring et al. | |
| 5,490,760 A | 2/1996 | Kotzur | |
| 5,503,222 A | 4/1996 | Dunne | |
| 5,520,008 A | 5/1996 | Ophir et al. | |
| 5,522,217 A | 6/1996 | Zauner | |
| 5,639,208 A | 6/1997 | Theis | |
| 5,647,221 A | 7/1997 | Garris, Jr. | |
| 5,894,719 A | 4/1999 | Nalim et al. | |
| 5,904,470 A | 5/1999 | Kerrebrock et al. | |
| 5,916,125 A | 6/1999 | Snyder | |
| 5,931,640 A | 8/1999 | Van Houten et al. | |
| 5,932,940 A | 8/1999 | Epstein et al. | |
| 6,065,297 A | 5/2000 | Tischer et al. | |
| 6,082,341 A | 7/2000 | Arai et al. | |
| 6,134,109 A | 10/2000 | Muller et al. | |
| 6,138,456 A | 10/2000 | Garris | |
| 6,185,956 B1 | 2/2001 | Brasz | |
| 6,196,809 B1 | 3/2001 | Takahashi et al. | |
| RE37,134 E | 4/2001 | Wilson | |
| 6,238,524 B1 | 5/2001 | Zebuhr | |
| 6,253,833 B1 | 7/2001 | Koster et al. | |
| 6,261,419 B1 | 7/2001 | Zebuhr | |
| 6,328,094 B1 | 12/2001 | Mori et al. | |
| 6,351,934 B2 | 3/2002 | Snyder | |
| 6,381,948 B1 | 5/2002 | Klingels | |
| 6,388,346 B1 | 5/2002 | Lopatinsky et al. | |
| 6,392,313 B1 | 5/2002 | Epstein et al. | |
| 6,393,208 B1 | 5/2002 | Nosenchuck | |
| 6,427,464 B1 | 8/2002 | Beaverson et al. | |
| 6,439,209 B1 | 8/2002 | Wenger et al. | |
| 6,449,939 B1 | 9/2002 | Snyder | |
| 6,460,342 B1 | 10/2002 | Nalim | |
| 6,505,462 B2 | 1/2003 | Meholic | |
| 6,526,936 B2 | 3/2003 | Nalim | |
| 6,584,764 B2 | 7/2003 | Baker | |
| 6,606,854 B1 | 8/2003 | Siefker et al. | |
| 6,928,804 B2 | 8/2005 | Venkataramani et al. | |
| 6,988,493 B2 | 1/2006 | Wenger et al. | |
| 7,044,718 B1 | 5/2006 | Platts | |
| 7,137,243 B2 | 11/2006 | Snyder et al. | |
| 7,487,641 B2 | 2/2009 | Frechette et al. | |
| 7,555,891 B2 | 7/2009 | Muller et al. | |
| 7,621,118 B2 | 11/2009 | Snyder et al. | |
| 7,963,096 B2 | 6/2011 | VanHolstyn | |
| 8,132,399 B2 | 3/2012 | VanHolstyn | |
| 8,443,583 B2 | 5/2013 | Nalim et al. | |
| 8,627,680 B2 | 1/2014 | Haley et al. | |
| 2001/0015058 A1 | 8/2001 | Snyder | |
| 2001/0052229 A1 | 12/2001 | Rakhmailov | |
| 2002/0038555 A1 | 4/2002 | Zebuhr | |
| 2002/0071979 A1 | 6/2002 | DuBose et al. | |
| 2003/0079713 A1 | 5/2003 | Nalim | |
| 2005/0193713 A1 | 9/2005 | Kovasity et al. | |
| 2008/0000238 A1 | 1/2008 | Ribaud et al. | |
| 2008/0041065 A1* | 2/2008 | Muller ................ F01D 1/12 60/804 |

FOREIGN PATENT DOCUMENTS

| | | |
|---|---|---|
| CH | 229280 A | 10/1943 |
| DE | 485386 C | 11/1929 |
| EP | 0582809 A1 | 2/1994 |
| EP | 0592817 A1 | 4/1994 |
| FR | 2891310 A3 | 3/2007 |
| GB | 2373 | 0/1913 |
| GB | 959721 A | 6/1964 |
| GB | 1126705 A | 9/1968 |
| JP | 56101003 A | 8/1981 |
| JP | 60150427 A | 8/1985 |
| JP | 62020630 A | 1/1987 |
| JP | 4081510 A | 3/1992 |
| JP | 4094419 A | 3/1992 |
| JP | 6159101 A | 6/1994 |
| WO | WO-2012005619 A1 | 1/2012 |

OTHER PUBLICATIONS

A. Kharazi et al., "Preliminary Study of a Novel R718 Turbo-Compressoin Cycle Using a 3-Port Condensing Wave Rotor", GT2004-53622, Proceedings of ASME Turbo Expo Power for Land, Sea, and Air, Jun. 2004 pp. 1-7.

G. Welch, "Overview of Wave-Rotor Technology for Gas Turbine Engne Topping Cycles", U.S. Army Research Laboratory (Lewis field), (believed to have been published before Nov. 12, 2004), pp. 1-17.

J. Kentfield, "Wave-Rotors and Highlights of their Development", AIAA98-3248, 34th AIAA/ASME/SAE/ASEE Joint Propulsion Conference and Exhibit, Jul. 1998, pp. 1-9.

J. Piechna et al., "Radial-Flow Wave Rotor Concepts, Unconventional Designs and Applications", Draft IMECE2004-59022, Proceedings of IMECE04 2004 ASME International Mechanical Engineering Congress, Nov. 2004, pp. 1-10.

M. Frackowiak et al., "Numerical Simulation of Unsteady-Flow Processes in Wave Rotors", Draft IMECE2003-60973, Proceedings of IMECE04 2004 ASME International Mechanical Engineering Congress, Nov. 2004, pp. 1-16.

N. Müller, "Design of Compressor Impellers for Water as a Refrigerant", ASHRAE Transaction, vol. 107 at 214-222 (2001).

N. Müller, "Ein schneller Algorithmus für Entwurf und Berechnung von Laufrädern mit Radialfaserschaufeln", Klingenberg J., Heller

(56) References Cited

OTHER PUBLICATIONS

W.: Beiträge Zur Strömungs-Mechanik, TU Dresden at 235-244 (2001).
P. Akbari et al., "Performance Investigation of Small Gas Turbine Engines Topped with Wave Rotors", AIAA 2003-4414, 39th AIAA/ASME/SAE/ASEE Joint Propulsion Conference and Exhibit, Jul. 2003, pp. 1-11.
P. Akbari et al., "A Review of Wave Rotor Technology and Its Applications", IMECE2004-60082, Proceedings of IMECE04 2004 ASME International Mechanical Engineering Congress, Nov. 2004, pp. 1-23.
P. Akbari et al., "Gas Dynamic Design Analyses of Charging Zone for Reverse-Flow Pressure Wave Superchargers", Proceedings of ICES03 2003 Spring Technical Conference of the ASME Internal Combustion Engine Division, May 2003, (ASME 2002), ICES2003-690, pp. 1-11.
P. Akbari et al., "Performance Improvement of Recuperated and Unrecuperated Microturbines Using Wave Rotor Machines", Paper No. 218, CIMAC Congress 2004, Kyoto, pp. 1-13.
P. Akbari et al., "Performance Improvement of Small Gas Turbines through Use of Wave Rotor Topping Cycles", GT2003-38772, Proceedings of ASME Turbo Expo Power for Land, Sea, and Air, Jun. 2003, (ASME 2002), 2002, pp. 1-11.
P. Akbari et al., "Preliminary Design Procedure for Gas Turbine Topping Reverse-Flow Wave Rotors", GTSJ, IGTC2003Tokyo FR-301, Proceedings of the International Gas Turbine Congress, Nov. 2003, pp. 1-8.
P. Akbari et al., "Utilizing Wave Rotor Technology to Enhance the Turbo Compression in Power and Refrigeration Cycles", IMECE2003-44222, Proceedings of IMECE'03 2003 ASME International Mechanical Engineering Congress and Exposition, Nov. 2003, pp. 1-9.
A. Mehra et al., "A Six-Wafer Combustion System for a Silicon Micro Gas Turbine Engine", Journal of Microelectromechanical Systems, vol. 9, No. 4, Dec. 2000, pp. 517-527.
M. Schmidt, "Portable MEMS Power Sources", 2003 IEEE International Solid-State Circuits Conference, Session 22, TD: Embedded Technologies, Paper 22.5, 8 pages.
S. Ashley, "Turbines on a Dime", XP-000727170, Mechanical Engineering ASME, vol. 119, No. 10, Oct. 1997, pp. 78-81.
F. Iancu et al., "Feasibility Study of Integrating Four-Port Wave Rotors into Ultra-Micro Gas Turbines (UμGT)", XP-002391768, 40th AIAA/ASME/SAE/ASEE Joint Propulsoin Conference and Exhibit, Jul. 2004, pp. 1-12.
J. Wilson et al., "Wave Rotor Optimization for Gas Turbine Engine Topping Cycles", Journal of Propulsion and Power, vol. 12, No. 4, Jul.-Aug. 1996, pp. 778-785.
Y. Oguri et al., "Research on Adaptation of Pressure Wave Supercharger (PWS) to Gasoline Engine", 2001-01-0368, SAE Technical Paper Series, SAE 2001 World Congress, Mar. 5-8, 2001, pp. 1-7.
H. Heisler, "Advanced Engine Technology", SAE International, 1997, pp. 356-363.
B. Berlinger, "New Pressure Wave Supercharger Improves Engine Performance, Reduces Emissions", Caterpillar, Tech of the Week (believed to have been published or publically used prior to Nov. 12, 2004), 2 pages.
M. Nalim, "Longitudinally Stratified Combustion in Wave Rotors", Journal of Propulsion and Power, vol. 15, No. 6, Nov.-Dec. 2000, pp. 1060-1068.
R. Nalim et al., "Two-Dimensional Flow and NOx Emissions in Deflagrative Internal Combustion Wave Rotor Configurations", GT-2002-30085, Proceedings of ASME International Turbine Institute ASME Turbo Expo, Jun. 2002, pp. 1-11.
J. Wilson, "Design of the NASA Lewis 4-Port Wave Rotor Experiment", Nasa Contractor Report 202351, Contract No. NAS3-27186, AIAA-97-3139, Jun. 1997, pp. 1-6.
P. Azoury, "Engineering Applications of Unsteady Fluid Flow", John Wiley & Sons, 1992, pp. 1-31, 109-144 (including contents, pp. vii-ix; foreward, pp. xi-xii; preface, pp. xiii-xvii).
Photograph of Comprex Axial Wave Rotor in Mazda Diesel Engine (publicly used in or before 1987); 1 page.
Capstone C60 Natural Gas (MicroTurbine)—Product Datasheet, Capstone Turbine Corp. (2003); 2 pages.
Livermore, Carol; "Here Come the Microengines;" The Industrial Physicist, (Dec. 2001/Jan. 2002); 4 pages.
"Mini Generator Has Enough Power to Run Electronics;" Georgia Institute of Technology (Nov. 24, 2004); 2 pages.
Gerard E. Welch et al., Wave-Rotor-Enhanced Gas Turbine Engine Demonstrator, Gas Turbine Operation and Technology for Land, Sea and Air Propulsion and Power Systems Symposium, NATA/TM-1999-209459, Oct. 18-21, 1999.

\* cited by examiner

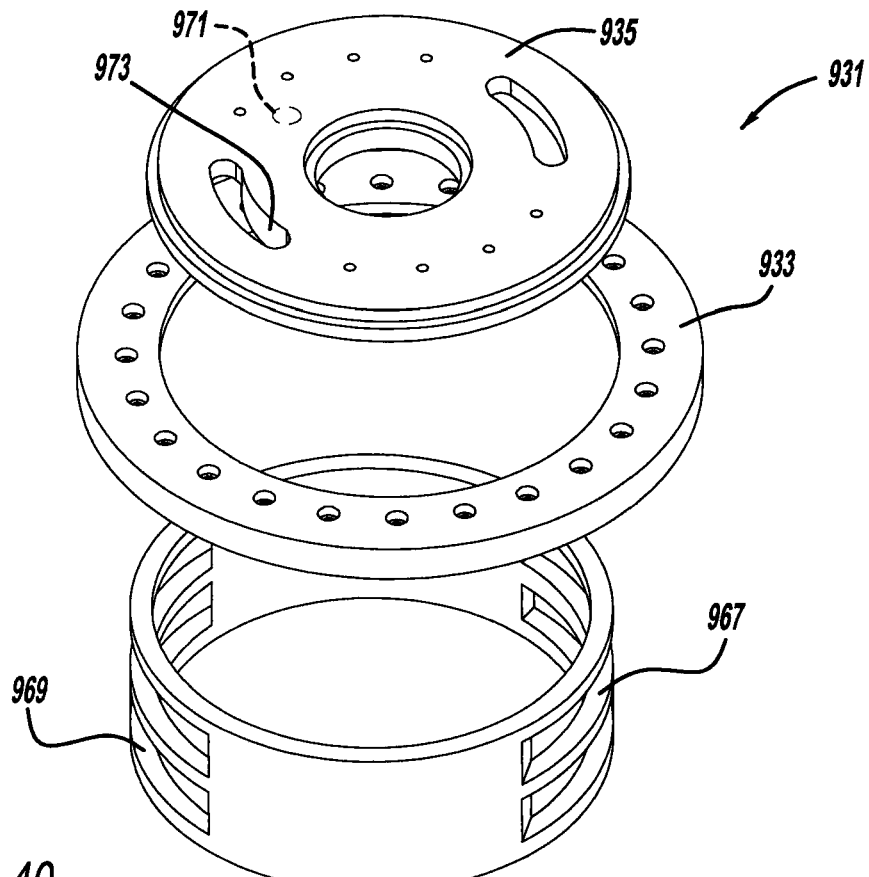
FIG - 40
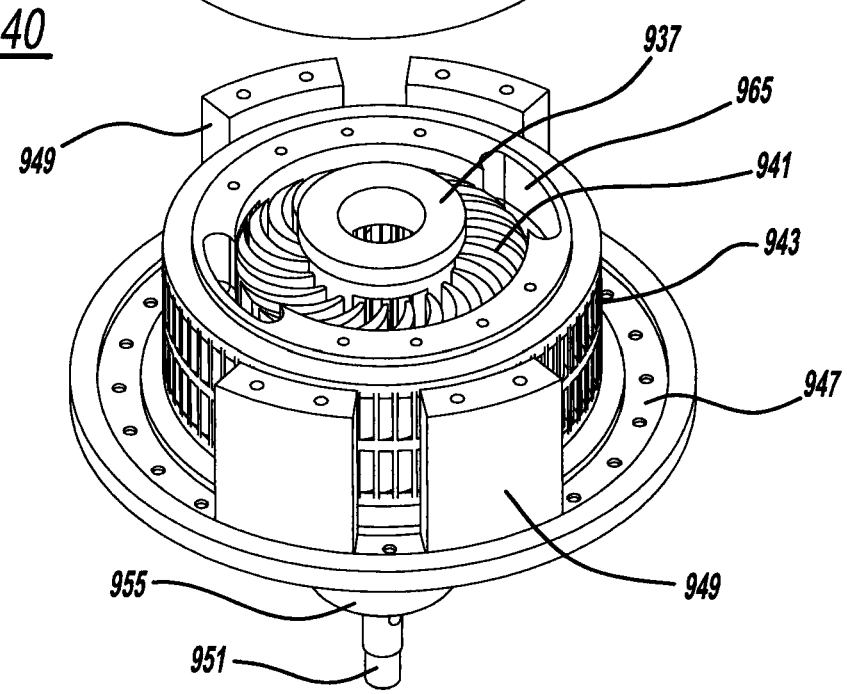

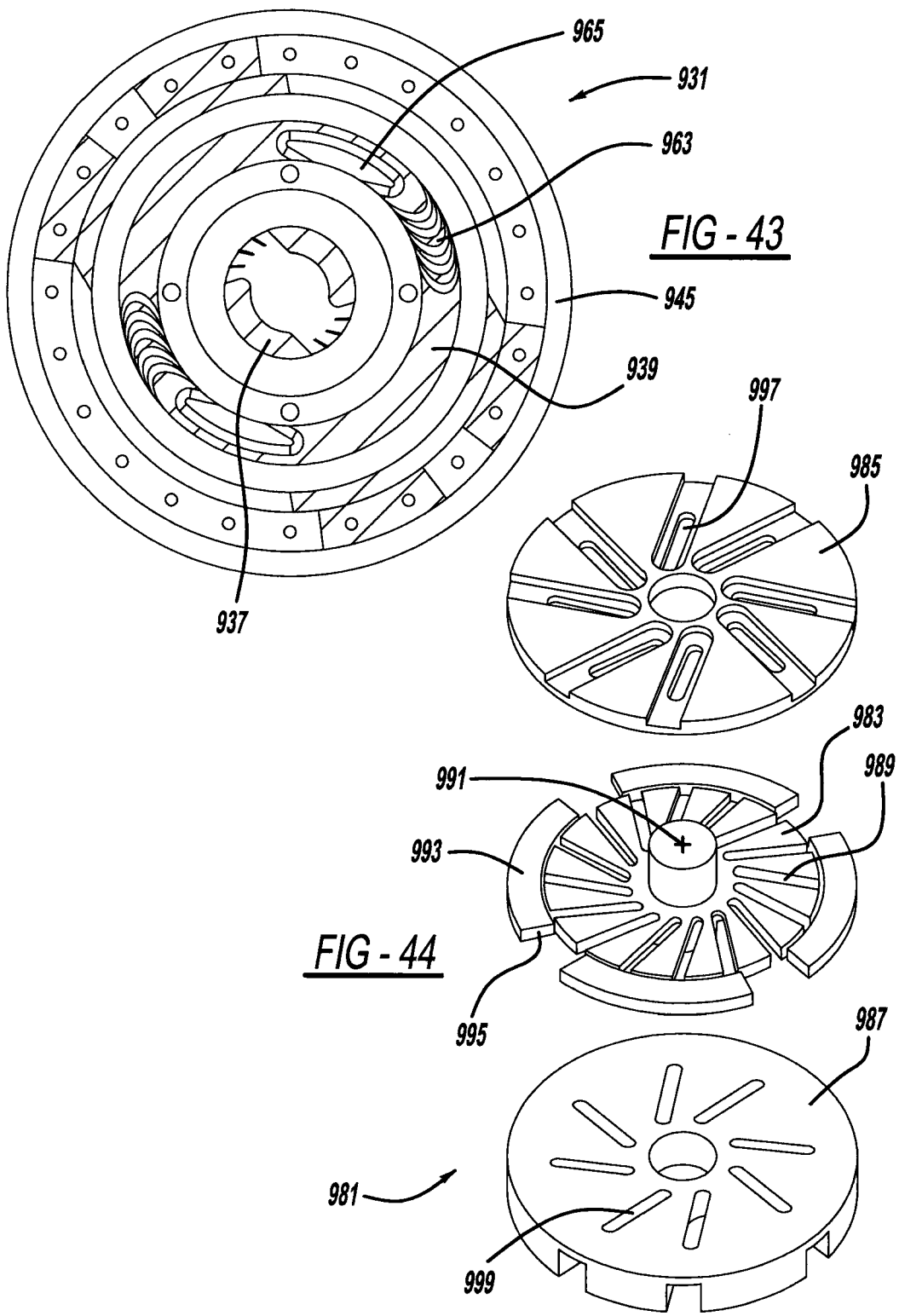

WAVE DISC ENGINE APPARATUS

CROSS REFERENCE TO RELATED APPLICATIONS

This application is a continuation of International Patent Application No. PCT/US2012/026527, filed on Feb. 24, 2012, which claims priority to U.S. Provisional Application Ser. No. 61/446,882, filed on Feb. 25, 2011, both of which are incorporated by reference herein.

GOVERNMENT FUNDING

This invention was made with government support under DE-AR0000004 awarded by the U.S. Department of Energy. The government has certain rights in the invention.

BACKGROUND AND SUMMARY

The present invention relates generally to fluid power devices and more particularly to a wave disc engine apparatus.

It is known to use an axial wave rotor as a super charger in internal combustion engines for automotive vehicles. Such conventional devices are described in P. Akbari, R. Nalim and N. Mueller, "A Review of Wave Rotor Technology and its Applications," Journal of Engineering for Gas Turbines and Power, ASME, vol. 128, p. 717 (October 2006). Wave rotors have also been proposed for use in propulsive jet engines and power turbines as disclosed in U.S. Pat. No. 6,584,764 entitled "Propulsion Modules" which issued to Baker on Jul. 1, 2003; U.S. Pat. No. 5,894,719 entitled, "Method and Apparatus for Cold Gas Reinjection and Through-Flow and Reverse-Flow Wave Rotors" which issued to Nalim et al. on Apr. 20, 1999; and U.S. Pat. No. 5,267,432 entitled "System and Method for Cancelling Expansion Waves in a Wave Rotor" which issued to Paxton on Dec. 7, 1993. These patents are all incorporated by reference herein.

More recently, one or more of the present inventors invented a radial wave rotor. This device is disclosed in U.S. Pat. No. 7,555,891 entitled "Wave Rotor Apparatus" which issued to Müller et al. on Jul. 7, 2009, and U.S. Patent Publication No. 2008/0041065 entitled "Ultra-Micro Gas Turbine" which was published to Müller et al. on Feb. 21, 2008, both of which are incorporated by reference herein. While the radial wave rotors were significant advancements in wave rotor design, additional improvements are desirable.

In accordance with the present invention, a wave disc engine apparatus is provided. A further aspect employs a constricted nozzle in a wave rotor channel. A further aspect provides a sharp bend between an inlet and an outlet in a fluid pathway of a wave rotor, with the bend being spaced away from a peripheral edge of the wave rotor. A radial wave rotor for generating electricity in an automotive vehicle is disclosed in yet another aspect. In a further aspect, a multiple-layered disc apparatus uses different radial channels on one layer versus another in order to obtain synergistic benefits from combustion and/or expansion/compression pressure wave functional differences between the layers. A return conduit between different fluid passageways of a wave rotor is used in a further embodiment. Moreover, methods of manufacturing and using a wave disc engine apparatus and/or wave rotor are provided.

The present invention is advantageous over conventional devices. For example, improved torque is advantageously achieved with the nozzle design and/or channel shapes in certain aspects of the present apparatus. Furthermore, improved engine efficiencies should also be available with certain aspects of the present apparatus. For example, with an open outlet aspect, a shock wave propagates directly without being reflected on an outer housing wall. By way of a further example, with the return conduit aspect, additional energy is extracted from high pressure exhaust gas. Additional advantages and features of the present invention will become apparent from the following description and appended claims, taken in conjunction with the accompanying drawings.

BRIEF DESCRIPTION OF THE DRAWINGS

FIG. 40 is a partially exploded perspective view showing the twenty-sixth embodiment apparatus;

FIG. 43 is a cross-sectional view, taken along line 43-43 of FIG. 42, showing the twenty-sixth embodiment apparatus;

FIG. 44 is an exploded perspective view showing a twenty-seventh embodiment apparatus of the present invention;

DETAILED DESCRIPTION

A wave rotor of the present wave disc engine apparatus is a non-steady flow device that uses shock waves to pressurize fluids by transferring energy from a high-pressure flow to a low-pressure flow in narrow channels. For the gas turbine wave disc engine use, the wave rotor employs a hot, high-pressure exhaust gas from a combustion chamber to generate a shock wave that compresses cooler, lower-pressure air received from a compressor. This results in an increase in both temperature and pressure of the air entering the combustion chamber, allowing for a higher overall pressure ratio for the entire cycle for a fixed turbine inlet temperature. Such a pressure exchange wave rotor effectively combines a steady-state turbo machine with unsteady, compressible gas flow principles to achieve higher cycle efficiencies.

Each port of the present wave rotor assembly is designed to expose the channels to working fluids at a specific shaft angle and for a specific duration. Shock and expansion waves are initiated inside the channels by pressure differences, caused by port opening and closing. Because the channels are exposed to both hot and cold gases, the wave rotor is naturally self-cooled. Additionally, due to the pre-expansion of the burned gases in the wave rotor, the combustor can operate at higher temperatures without raising the turbine inlet temperature. This is especially advantageous in applications where the temperature is limited by material constraints.

Furthermore, the present wave disc engine preferably utilizes a combustion engine cycle including compression, combustion, expansion with work extraction, and heat rejection to ambience and narrow, radially arranged and curved channels. Compression work is typically provided through work generated during expansion. Moreover, use of shock waves that move with sonic speed reduces inertia of the hardware and ensures rapid response. With the expansion at sonic speed immediately after combustion, the resonance time at high temperature is extremely short, which advantageously results in ultra-low NOx emissions. Additionally, the relevant heat transfer time and areas are extremely small, therefore drastically reducing heat losses.

Figure 1:
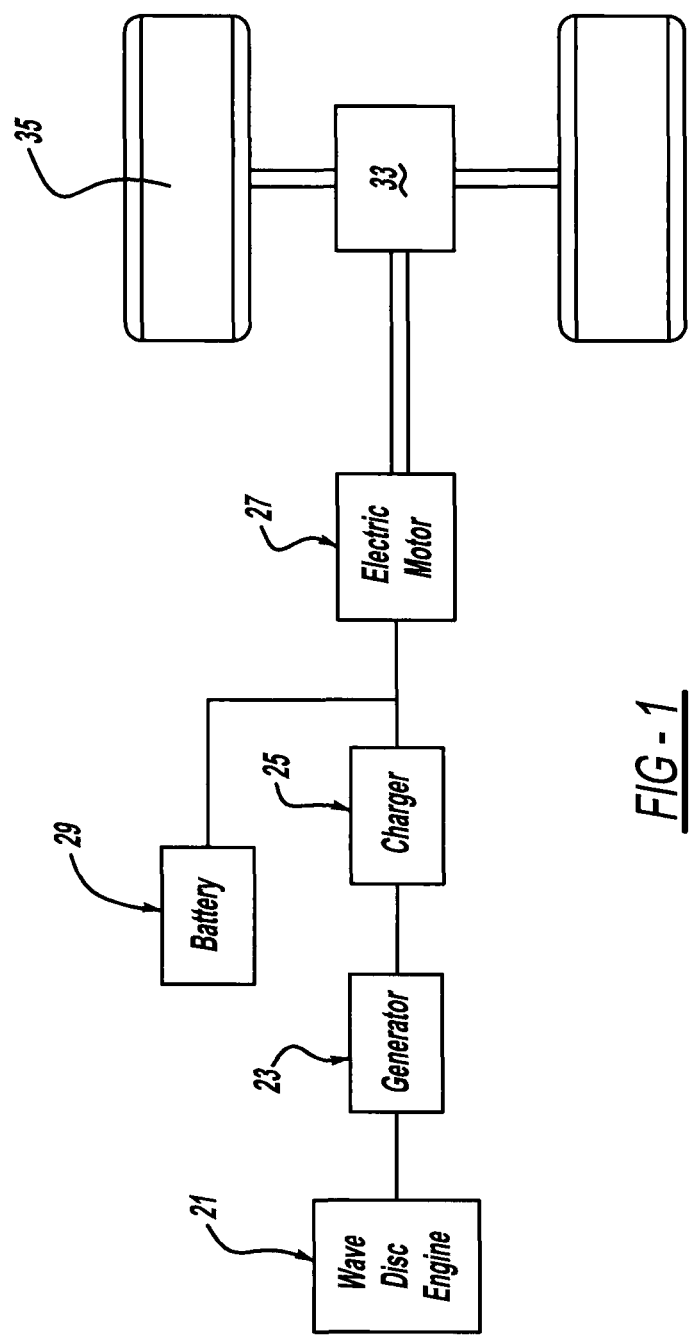
FIG. 1 is a diagrammatic view showing an electric drive system for an automotive vehicle in a first embodiment of the present invention apparatus.
Figure 2:
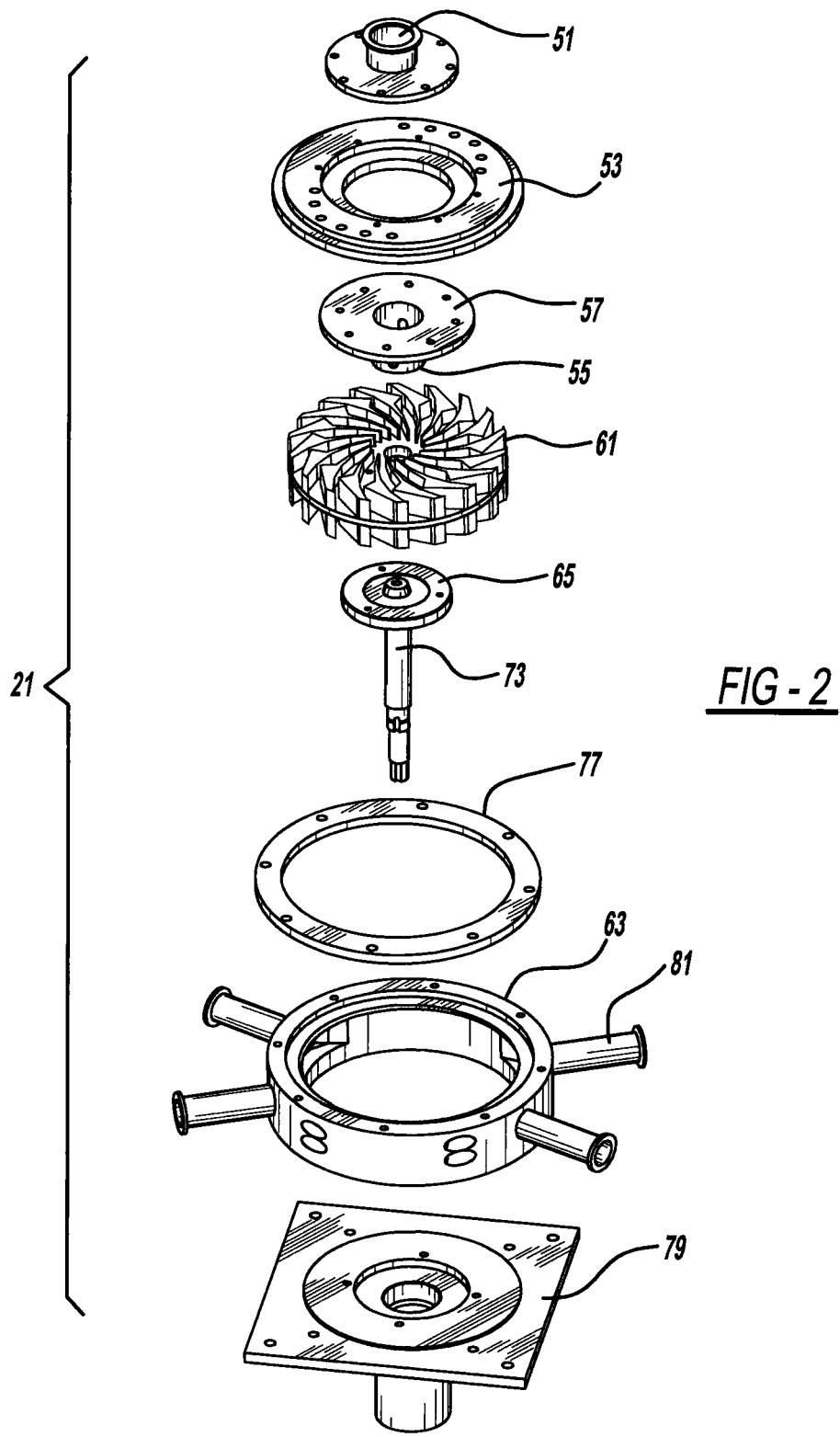
FIG. 2 is an exploded perspective view showing the first embodiment apparatus.
Figure 3:
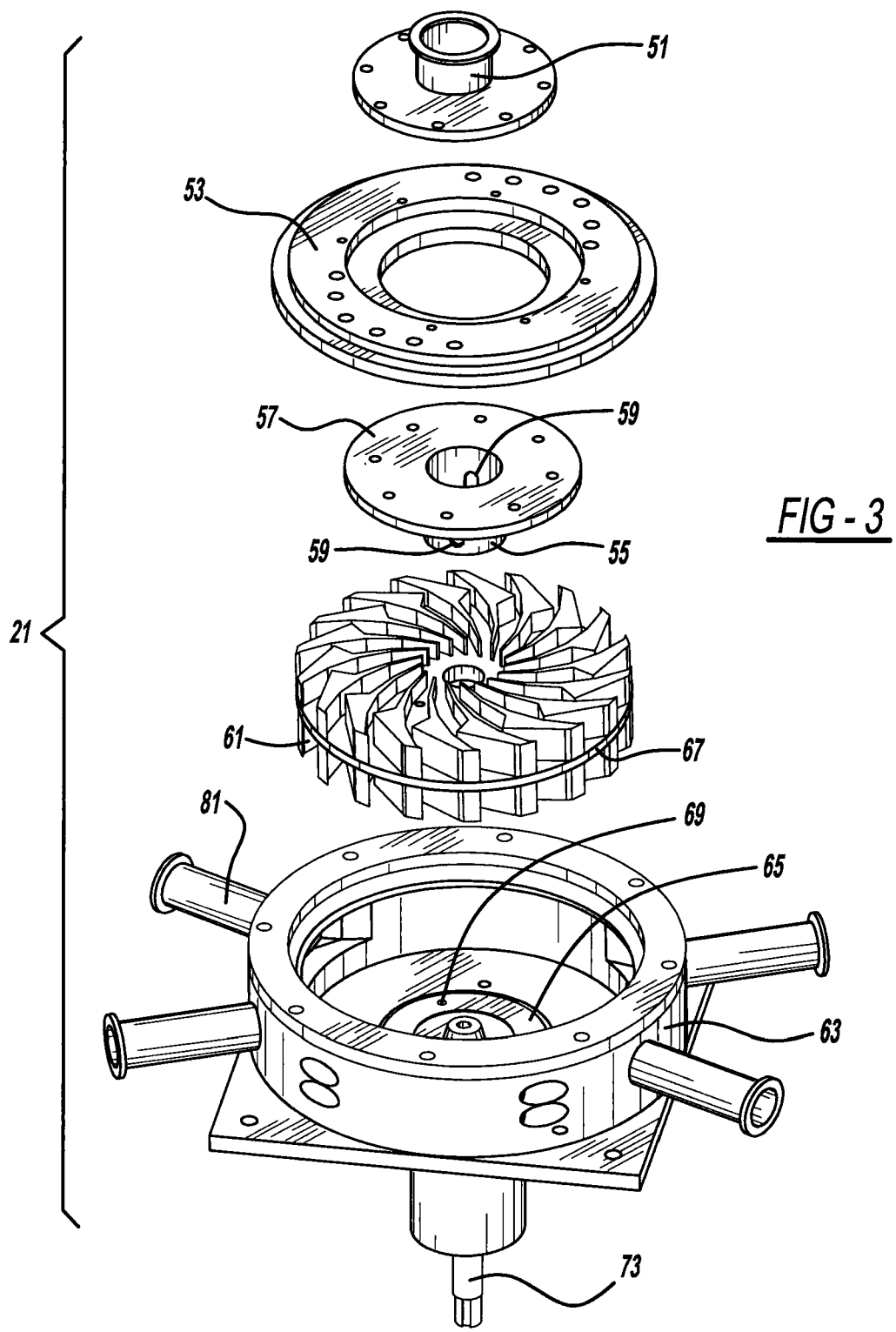
FIG. 3 is a partially exploded perspective view showing the first embodiment apparatus.
Figure 4:
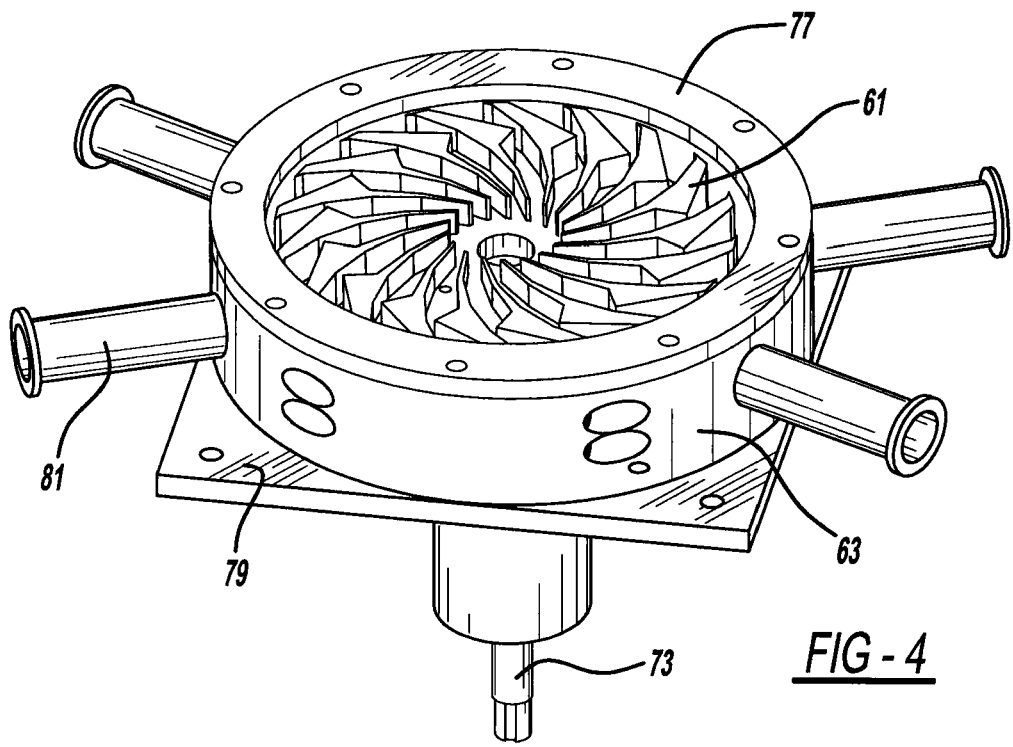
FIG. 4 is a perspective view showing the first embodiment apparatus, with a cover and inner end plate removed.
Figure 9:
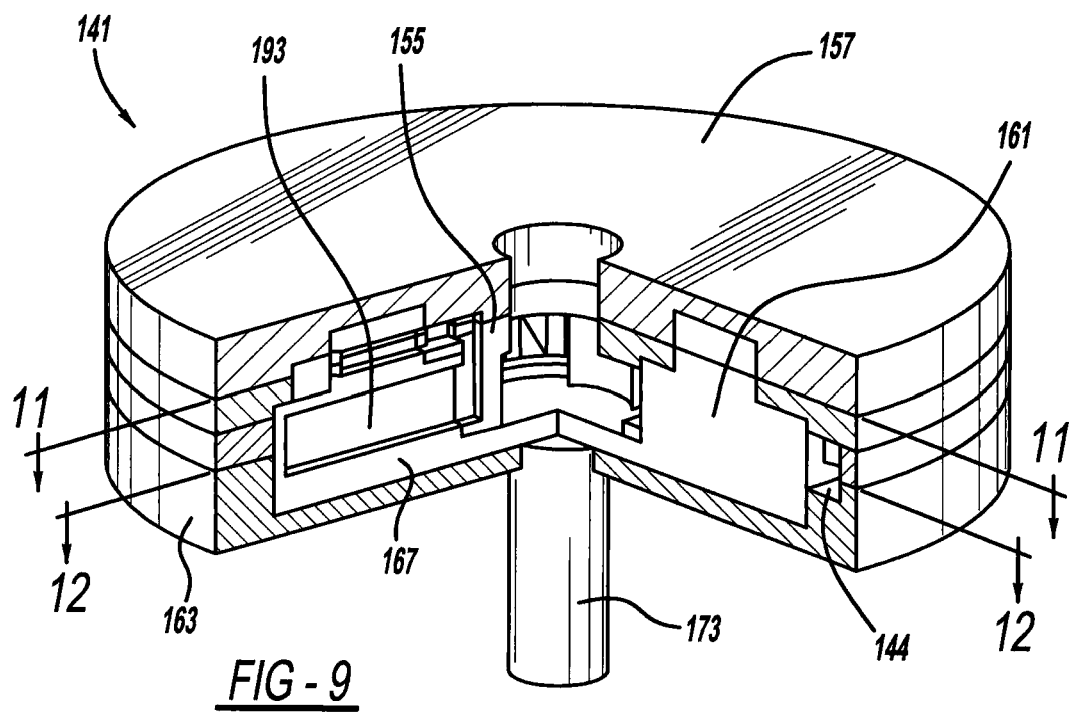
FIG. 9 is a fragmentary perspective view showing a third embodiment apparatus of the present invention.
Figure 5:
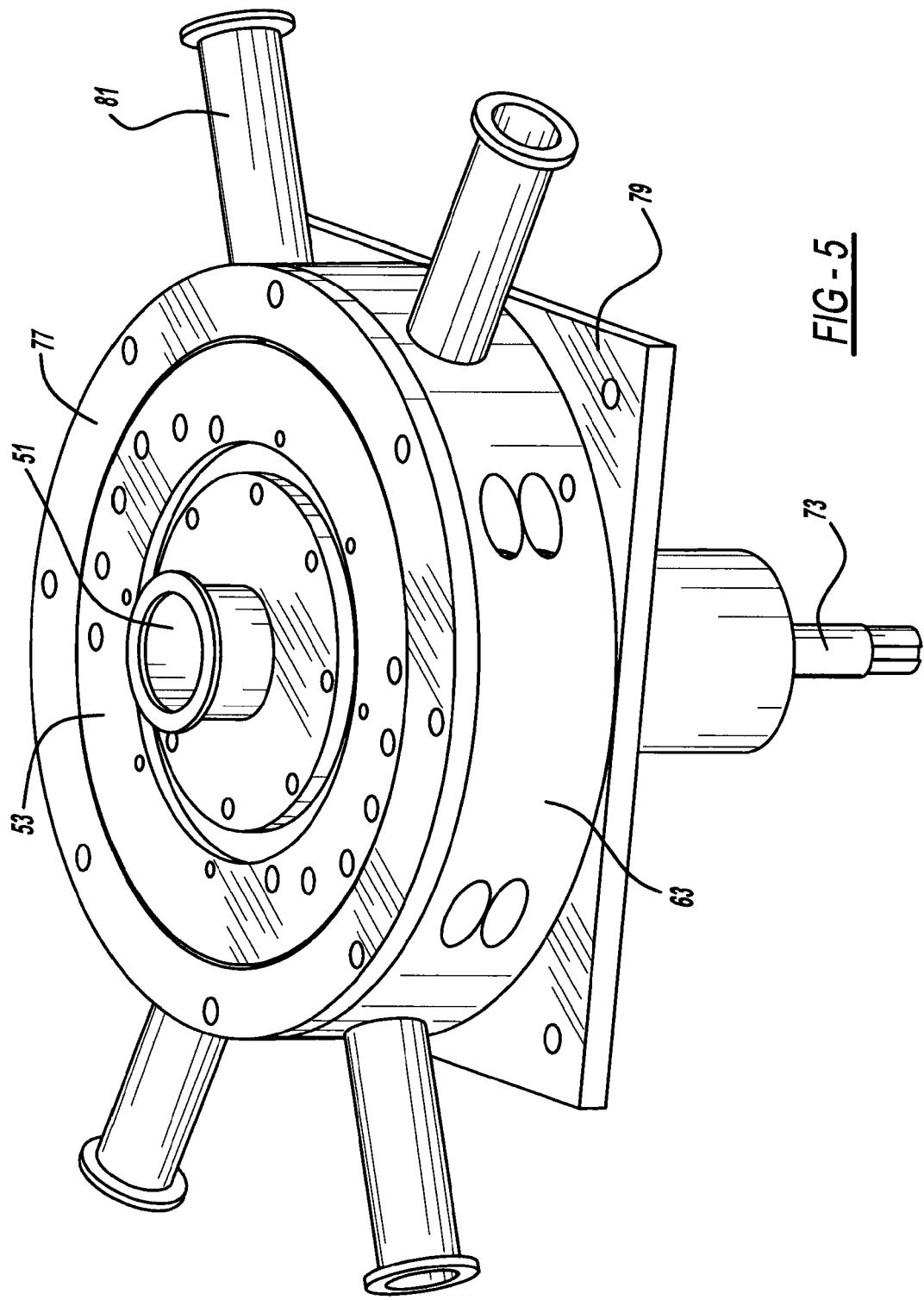
FIG. 5 is a perspective view showing the first embodiment apparatus, in a fully assembled condition.

Referring to FIG. 1, a wave disc engine 21 rotates a generator 23 which, in turn, creates electrical current sent to a charger 25. The generator and charger supply electrical power to an electric drive or traction motor 27. Ultimately and/or in addition, the generator and charger may supply electricity to recharge a battery 29 which supplies electrical power to motor 27. Electric traction motor 27 is connected to a powertrain 33, such as a drive shaft, differential, gearbox, and axle, which rotate driving wheels 35 of an electric or hybrid electric/internal combustion engine automotive vehicle. Alternately, the charger can be replaced by a controller and inverter. Another alternative variation directly drives the wheels or axles from one or more electric traction motors.

Referring now to FIGS. 2-5, wave disc engine 21 includes an air supply conduit or entrance 51 which extends from an annular lid 53. An internal end plate 55 has a hollow cylindrical shape extending from a flat plate 57. Alternately, a fluid entrance can have other shapes to guide and separate incoming fluid flows; it is basically a cavity that guides the fluid to the ports. Flat plate 57 is attached to annular lid 53 and internal end plate 55 includes a pair of ports 59. Furthermore, a radial wave rotor 61 is disposed within an annular housing 63 between a support 65 and flat plate 57. Bolts, rivets or other fasteners secure structure 65 to an annular base 67 of wave rotor 61 via matching holes 69 and 71 therein. Output shaft 73 centrally extends from support 65 and a centerline thereof defines a rotational axis 75 of the wave rotor. A circular ring 77 and a base 79 are additionally attached to housing 63. Four exhaust tubes 81 outwardly project in a radial manner from housing 63, however, more or less exhaust tubes may be employed of various shapes and angles. For example, only one exhaust tube is used for a single cycle per rotation. Housing 63 also serves as an external end plate surrounding a periphery 91 of wave rotor 61 and exhaust tubes 81 act as localized ports therein while the remainder of the housing blocks fluid flow from exiting the wave rotor.

One or more igniters or flame sources are attached to the housing and are in communication with wave rotor channels. Exemplary igniters include a spark plug, glow plug, microwave emitter, laser emitting a beam, plasma igniter, pilot flame, hot gas recirculation or the like. A fuel injector is also present adjacent entrance 51, on the top plate and/or through outer housing 63 to supply fuel into an aligned wave rotor channel.

Figure 6:
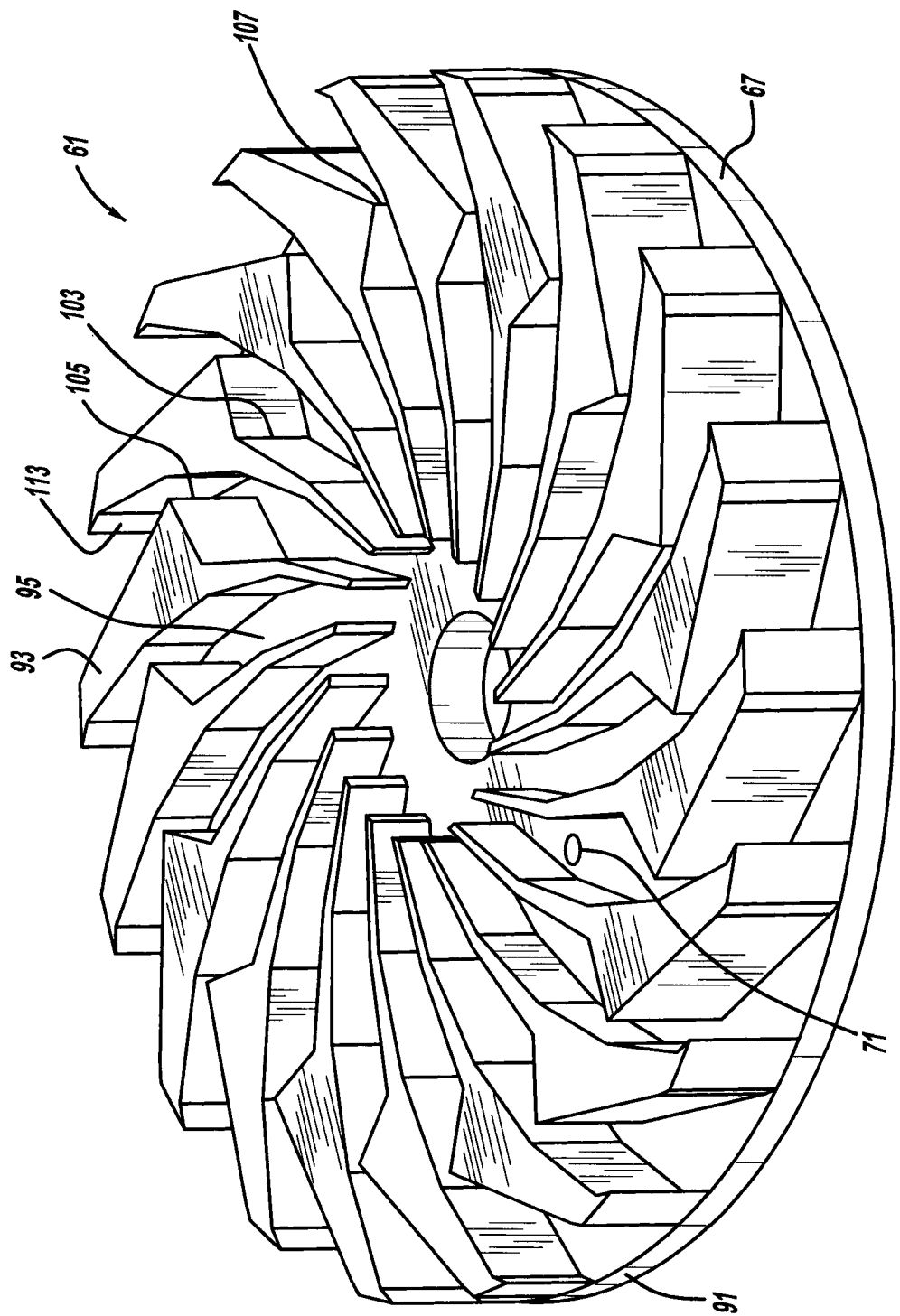
FIG. 6 is a perspective view showing an upper wave rotor layer employed in the first embodiment apparatus.
Figure 7:
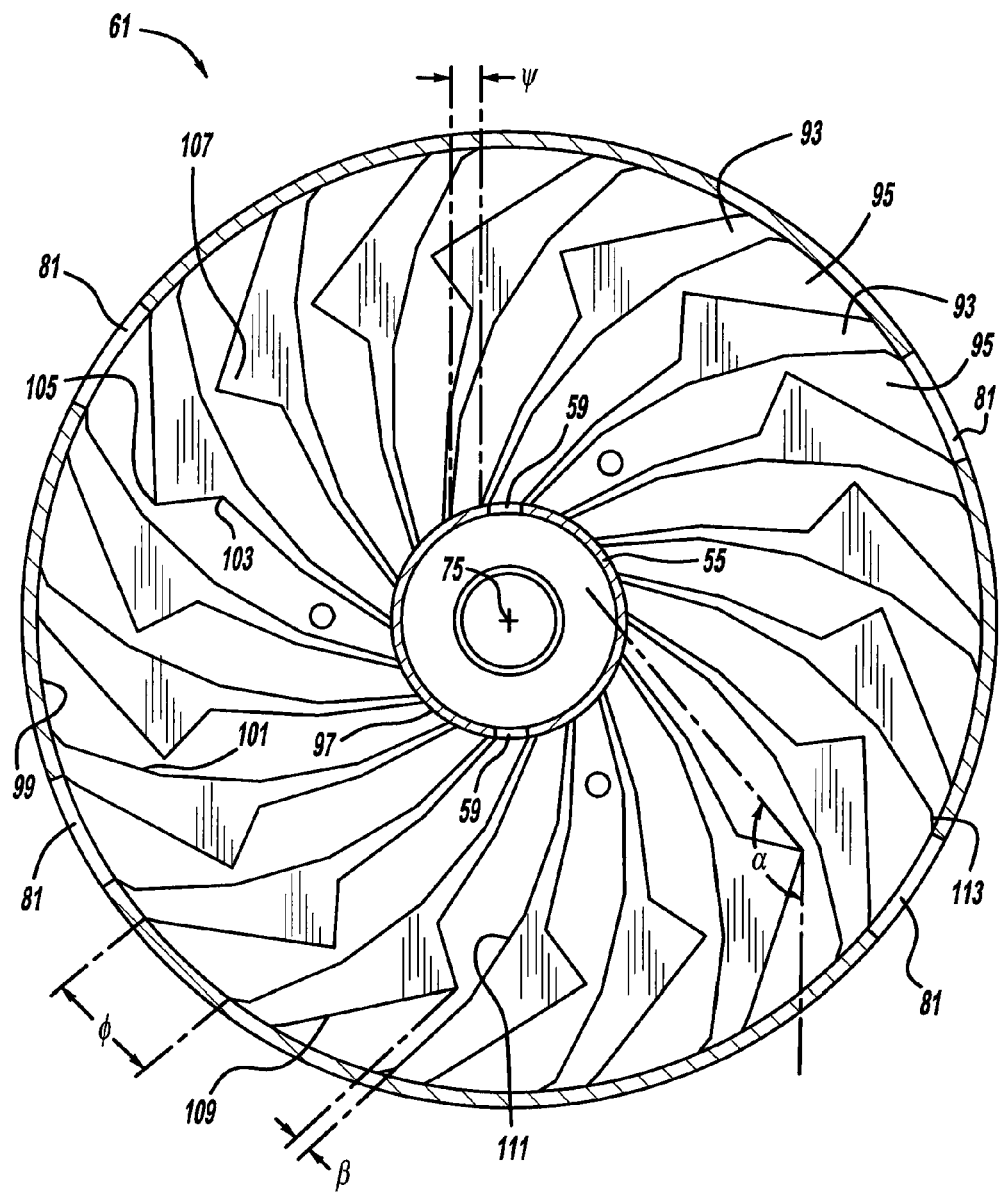
FIG. 7 is a true elevational view showing the upper wave disc layer of the first embodiment apparatus.

FIGS. 6 and 7 illustrate the details of the upper and lower layers of wave rotor 61. Only the upper layer is discussed although it is applicable to both, and it should be appreciated that some variations may only employ a single layer. At least ten, and in the present example eighteen, walls 93 define fluid flow passageways or channels 95 therebetween which generally outwardly radiate from rotational axis 75. Each channel 95 includes an inlet end 97, an outlet end 99 and a nozzle section 101. Each passageway has a generally curved shape between its inlet 97 and nozzle 101, then a sharp or abrupt internal bend 103, and thereafter an external bend 105 defined by offset angled surfaces of each wall 93. Bend 105 is located at an inwardly projecting and generally triangularly shaped heel 107, the wall cross-section of which is at least three times as wide, and more preferably at least ten times as wide, as an inlet width dimension $\psi$. The sharp bends 103 and 105 are inwardly spaced in a radial direction away from periphery 91 of wave rotor.

Heel 107 and bend 105 define one sidewall surface 109, acting with an opposing sidewall surface 111, to define a smallest constricted area $\beta$ therebetween. This constricted flow area within each passageway 95 significantly increases a flow velocity of a combusted mixture of air and fuel fluid flowing therepast from inlet 97; thus, the fluid velocity can be substantially supersonic as it flows through constricted area of nozzle 101. Also, each wall 93 has an offset angled toe 113 projecting from surface 111 opposite heel 107. A width dimension $\phi$ of adjacent outlet 99 is at least twice as wide as inlet dimension $\psi$. Therefore, exiting fluid is tangential and oblique relative to an average flow direction between inlet 99 and nozzle heel 107; in other words, the average flow direction change or angle $\alpha$ before and after the heel of nozzle is approximately 70-150°, and more preferably 130-140°. The nozzle preferably has an exit-to-throat area ratio of 3:1, although it may alternately be greater. The nozzle velocity increase and the oblique exiting direction enhances torque generation to self-power or rotate the wave rotor after combustion has started while also improving the engine efficiency. Alternately, the bend at heel 107 can have a rounded shape rather than the sharp angle shown.

Figure 8:
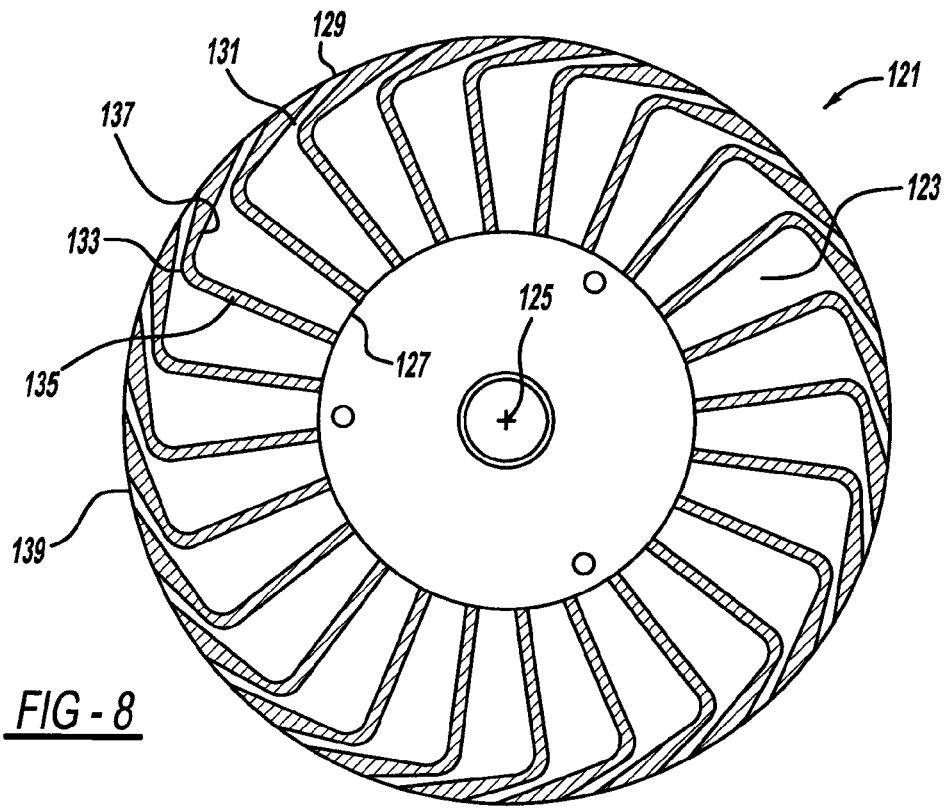
FIG. 8 is a true elevational view showing a second embodiment of the present invention apparatus.
Figure 10:
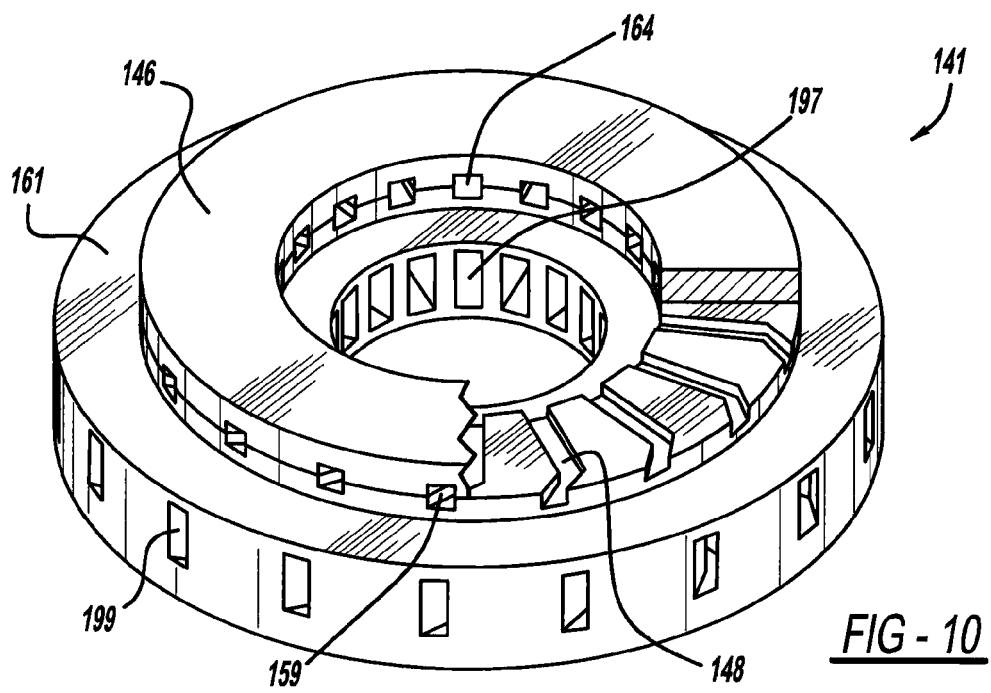
FIG. 10 is a fragmentary perspective view showing a wave disc of the third embodiment apparatus.
Figure 11:
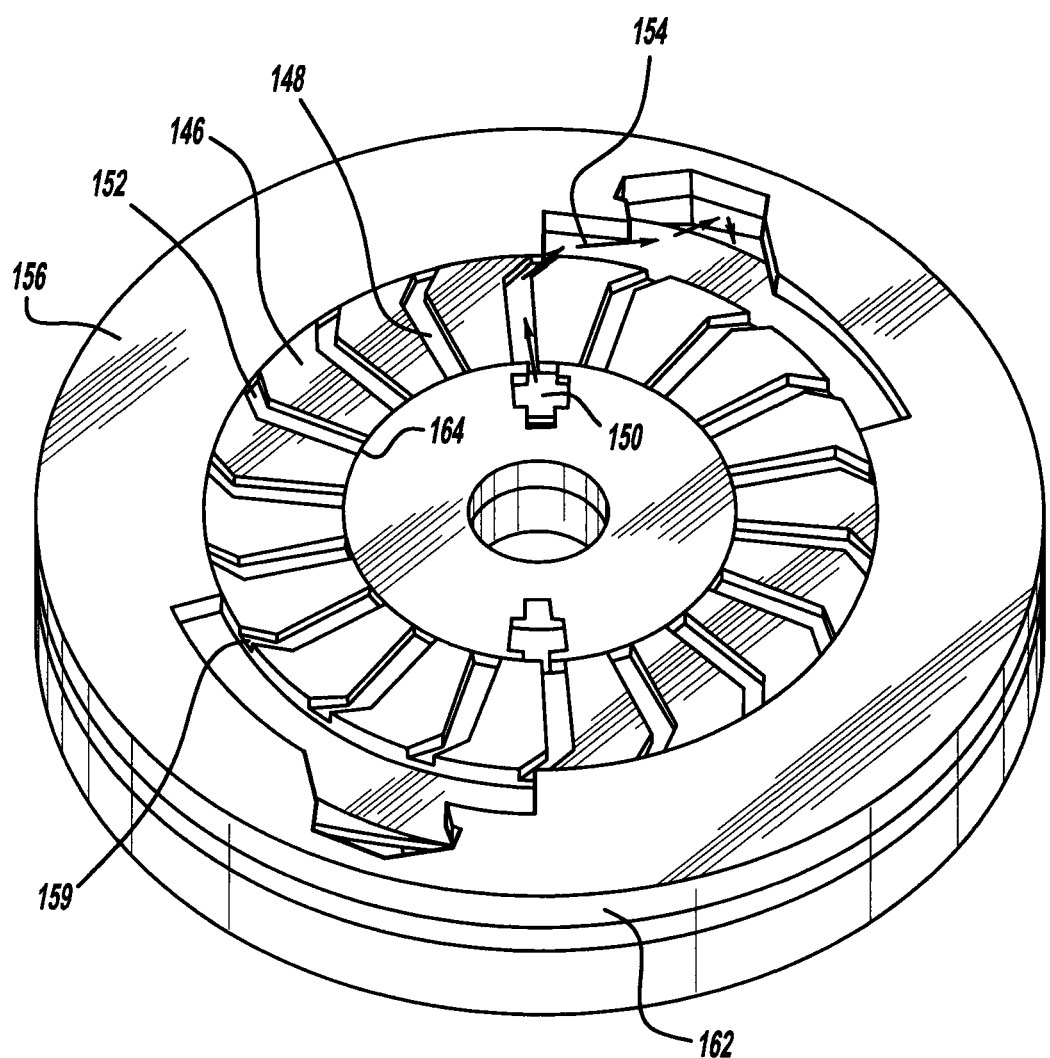
FIG. 11 is a fragmentary perspective view showing a top layer of the third embodiment apparatus.
Figure 12:
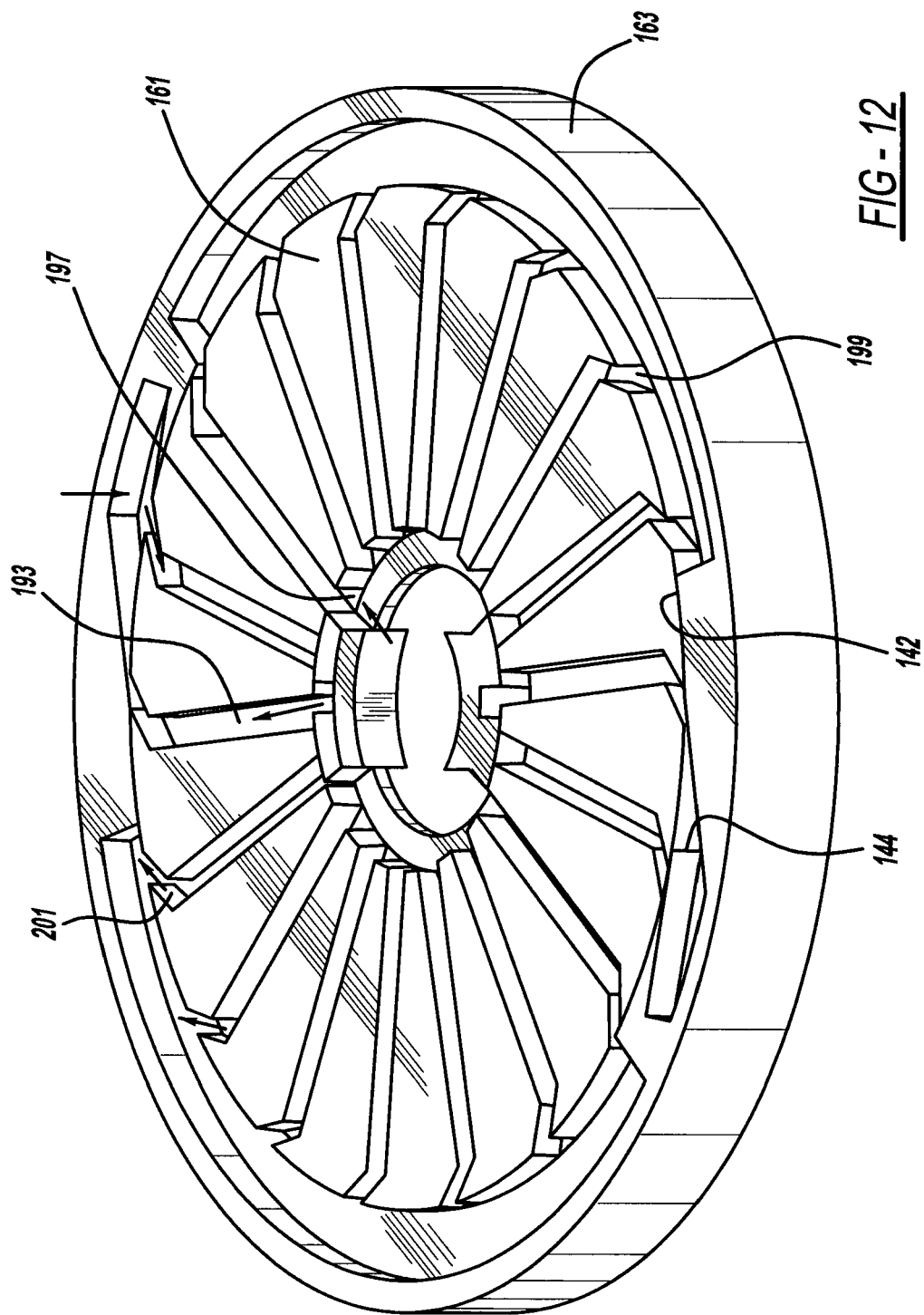
FIG. 12 is a fragmentary perspective view showing a bottom layer of the third embodiment apparatus.
Figure 13:
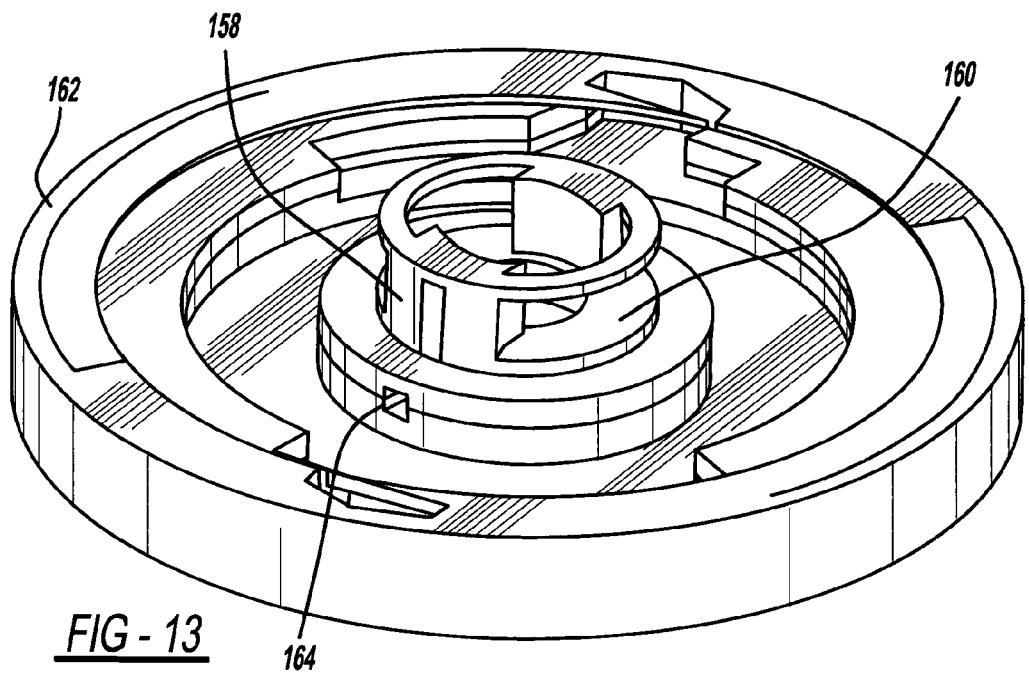
FIG. 13 is a fragmentary perspective view showing a top cover employed with the third embodiment apparatus.

An alternate embodiment wave rotor 121 is shown in FIG. 8. In this embodiment, multiple fluid carrying passageways 123 generally radiate outwardly from a rotational centerline 125. Each passageway has an inlet end 127 and an opposite outlet end 129. A nozzle segment 131 is located at the smallest constricted area of each channel created between a sharp outer bend 133 of a wall 135 and an opposite wall surface 137. A cross-section of each wall 135 between bend 133 and outlet 129 is preferably twice as thick as the wall cross-section that is adjacent inlet 127, although it may alternately be more than twice as thick. Moreover, the wall section continually increases in thickness between the bend and outlet. It is noteworthy, however, that the inner and outer wall bend 133 is inwardly spaced from a periphery 139 of wave rotor 121, in other words, the inner and outer fluid flowing wall surfaces thereat are offset angled from a tangent to the adjacent wave rotor periphery. A generally radial average fluid flow direction from inlet 127 to bend 133 is longer than an offset and tangential direction between bend 133 and outlet 129.

The nozzle increases power by directing the fluid tangentially while increasing the fluid velocity at the channel outlet, which also lengthens the time for torque producing expansion waves. It is desired to confine the combustion inside of the channels and to employ a pre-mixed charge of fuel and air, as well as a static mixer and high-velocity fuel injection. This improves the fuel and air mixing, and the flame is now contained in the channels during combustion. All of these features synergistically cause the wave disc engine to rotate in a self-sustained manner while also producing power.

An alternate embodiment of any of the wave disc engine embodiments disclosed herein, uses an internal end plate with one or more ports but does not employ an outlet end plate. Thus, all of the outlets of the fluid flowing passageways are free flowing without blockage. Accordingly, when a shock wave is caused by combusting fluid in the passageways and arrives at the outlets, the shockwave directly propagates without being reflected.

Reference is now be made to FIGS. 9-13. A wave disc engine apparatus 141 employs a first layer of passageways, more specifically, a radial wave rotor 161 having generally outwardly radiating and elongated passageways 193 with offset nozzles 201, defined by wall bends, therein. Each passageway has an internal end 197 and an opposite external end 199. All of the passageways on wave rotor disc layer 161 are coplanar on a plane generally perpendicular to a central rotational axis. An output shaft 173 is affixed to and rotates with a base 167 of wave rotor layer 161. A generator can be directly or indirectly coupled to output shaft 173 for generating electrical current to the automotive vehicle traction motor or other turbo machine. A housing 163 coaxially surrounds wave rotor disc layer 161 and has internal surfaces 142 thereof which act as an external end plate to selectively block external ends 199 of channels aligned therewith. Fresh air enters internal end 197 and outwardly, exits end 199 for every other passageway. Open ports 144 are also provided in external end plate or housing 163 to allow the supersonic and expanded fluid to exit or enter an aligned channel 193.

At least one upper or second disc layer 146 is stacked on top of wave rotor disc layer 161 such that the pair of layers rotate together about the common rotational axis in the preferred configuration thereof. Alternately, the two layers may rotate at different speeds or directions about the common axis. Wave rotor disc layer 161 is used for generating compression and expansion waves within its channels while upper layer 146 contains combustion chambers in its outwardly radiating channels 148. An injector 150 premixes fuel and incoming air, and then injects the mixed fluid into a selectively aligned passageway 148. During combustion, the pressure inside chamber passageways 148 increases by about four times or greater, and after combustion, the fluid exits an obliquely offset nozzle 152 of each passageway when aligned with an open port 154 in an outer end plate-like housing 156. This fluid outwardly exiting an outlet end 159 and port 154 is hot and of high pressure, which then expands to a medium pressure as it enters an associated conduit then into external inlet end 199 of lower wave rotor layer 161 in communication therewith. A shock wave due to the compression and expansion is thereafter created in the passageways of wave disc layer 161. Furthermore, an internal end plate 158 having circumferentially enlarged ports 160, extends from an upper housing 162. Ports 160 are selectively aligned with inlets 164 of upper layer 146 while single channel size ports 164 of internal end plate 158 selectively align with inlets 197 for wave rotor disc layer 161.

Figure 14:
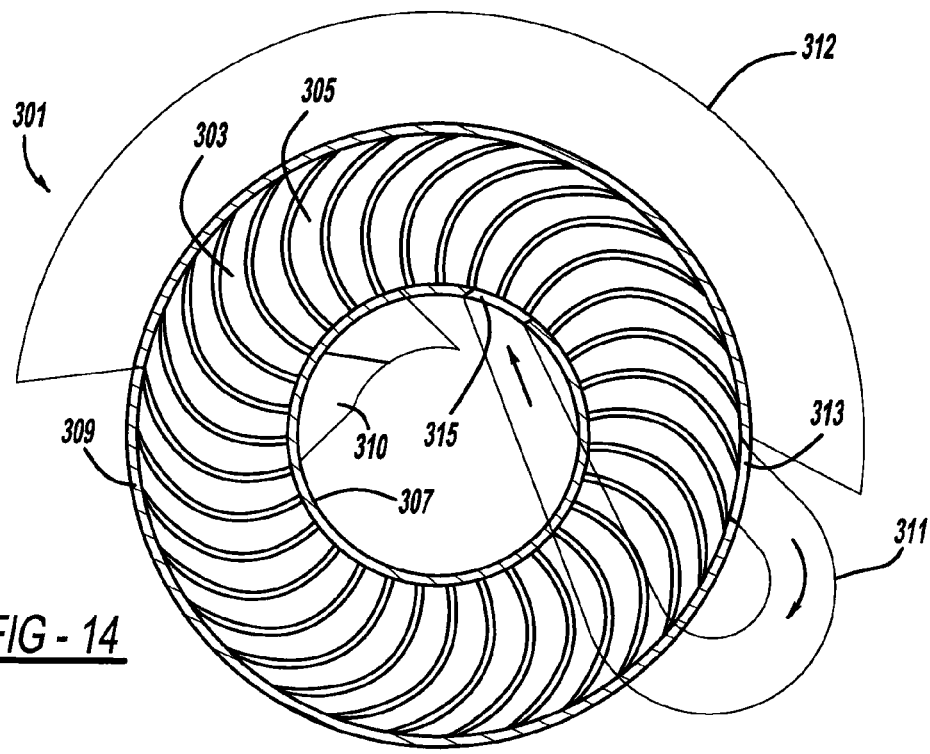
FIG. 14 is a diagrammatic true view showing a fourth embodiment of the apparatus of the present invention.
Figure 15:
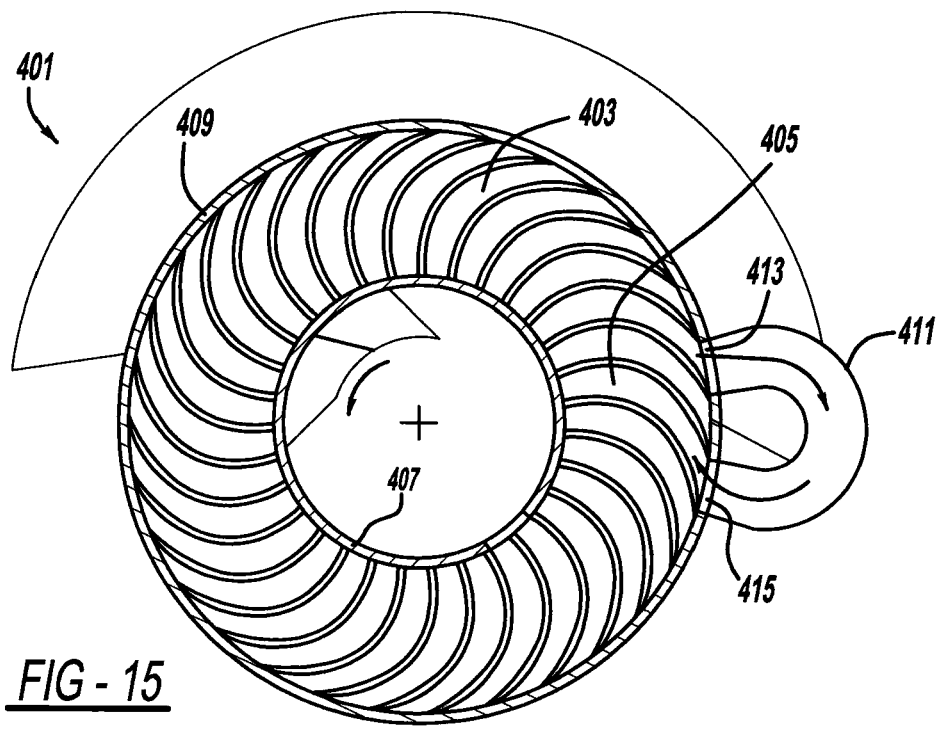
FIG. 15 is a diagrammatic true view showing a fifth embodiment of the apparatus of the present invention.

FIGS. 14 and 15 illustrate other embodiments of a wave disc engine apparatus 301 and 401, respectively. Apparatus 301 of FIG. 14 employs a radial wave rotor 303 having multiple curved and generally radially elongated channels 305 located between an internal end plate 307 and an external end plate 309. A divided wall entrance 310 (as will be discussed for FIG. 18) and an exhaust conduit 312 are also present. A stationary return conduit 311 connects an outlet port 313 with an inlet port 315 so as to flow exiting high-pressure exhaust gas into an inlet of another one or more rotating channels. This allows for additional energy extraction from the high-pressure exhaust gas while additionally driving or rotating the engine in a second pass.

Apparatus 401 of FIG. 15 has a similarly configured radial wave rotor 403, internal end plate 407 and external end plate 409. A stationary return conduit 411, however, connects an outlet port 413 of one or more channels with an external inlet port 415 of different one or more channels 405. This provides a pre-compression effect with the high-pressure exhaust gas.

Figure 16:
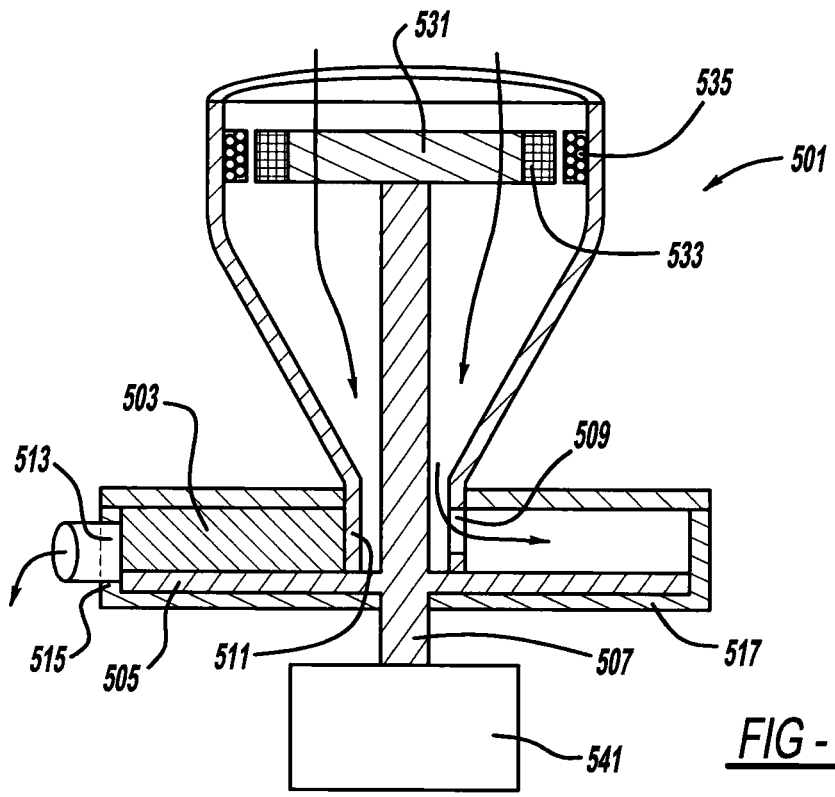
FIG. 16 is a cross-sectional view showing a sixth embodiment apparatus of the present invention.

FIG. 16 shows another embodiment wave apparatus 501. A radial wave rotor 503 is attached to and rotates with a base 505 about an output shaft 507. A port 509 is located within an internal end plate 511 while an exit port 513 is located in external end plate 515 portion of a housing 517. A compressor 531, or alternately a rotary wheel, is coupled to shaft 507 and rotates with radial wave rotor 503. A magnetic material 533 is attached to and rotates with a peripheral section of compressor 531. Meanwhile, electrically conductive wire windings 535 are attached to and stationarily mounted inside housing 517. It is alternatively envisioned that magnet 533 and wire windings 535 can be reversed. Thus, compressor 531 has a multifunctional and synergistic benefit by compressing incoming air thereafter supplied to wave rotor 503 while also generating electricity by the interaction of magnet 533 and wire windings 535 concentric therewith. An optional secondary generator 541 or other driven machine can also be coupled to output shaft 507.

Figure 17:
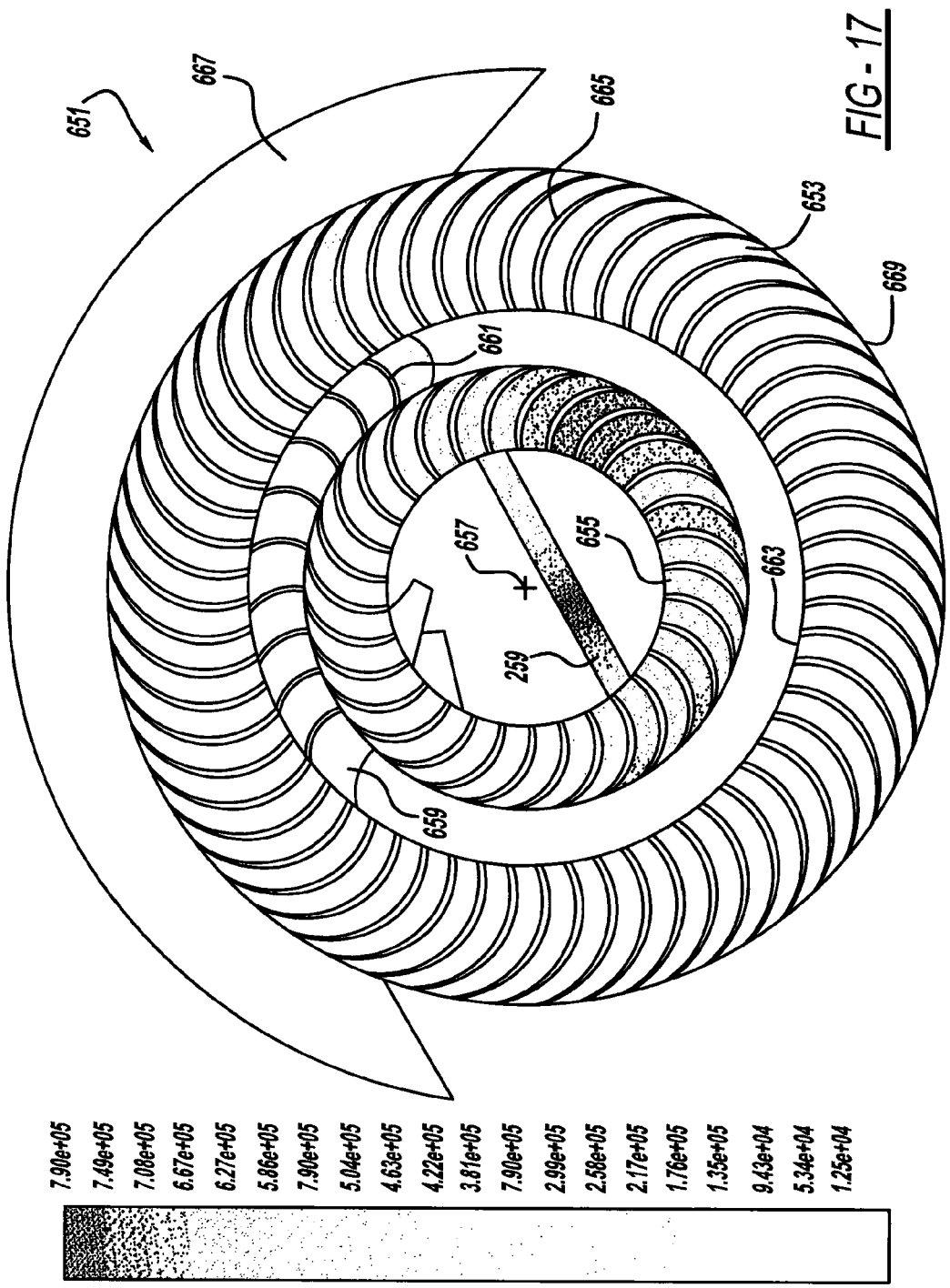
FIG. 17 is a diagrammatic true view showing a seventh embodiment apparatus of the present invention.

Referring now to FIG. 17, yet another embodiment of a wave disc engine apparatus 651 includes an internal combustion radial wave rotor 655 and a secondary turbine 655, which serves as an energy extractor or torque producer, which are concentric with each other and both rotate about an axis 657. A cross channel or return conduit 259 connects to multiple inlets of wave rotor 655 to enhance pre-compression before combustion. Hot, high pressure gases are taken from an inner end of a channel by return conduit 259 and reintroduced into another inner end of an opposite channel; the reintroduced hot and high pressure gases compress the unburned mixture and may subsequently also ignite those (similar to the function of FIG. 15). Additionally, a set of adjacent conduits 659, with curved walls 661, carry the fluid from outer ends of the wave rotor channels into internal inlet ends 663 of channels 665 of secondary turbine 653, when external end plate ports (here, an elongated, multi-channel slot) are aligned with the wave rotor outlets. A somewhat semi-circular exhaust duct 667 removes fluid exiting external outlet ends 669 of channels 665. The static pressures are advantageously shown for the wave rotor. For example, it is believed that near the center of return conduit 259, approximately 7.90 e+05 pascals will occur while the bottom half (as illustrated below ends of conduit 259) of wave rotor 655 will see approximately 5.04 e+05 to 7.49 e+05 pascals of static pressure in each radial channel thereof. Furthermore, the upper half of the wave rotor exhibits approximately 4.53 e+05 to 1.25 e+04 pascals.

Figure 18:
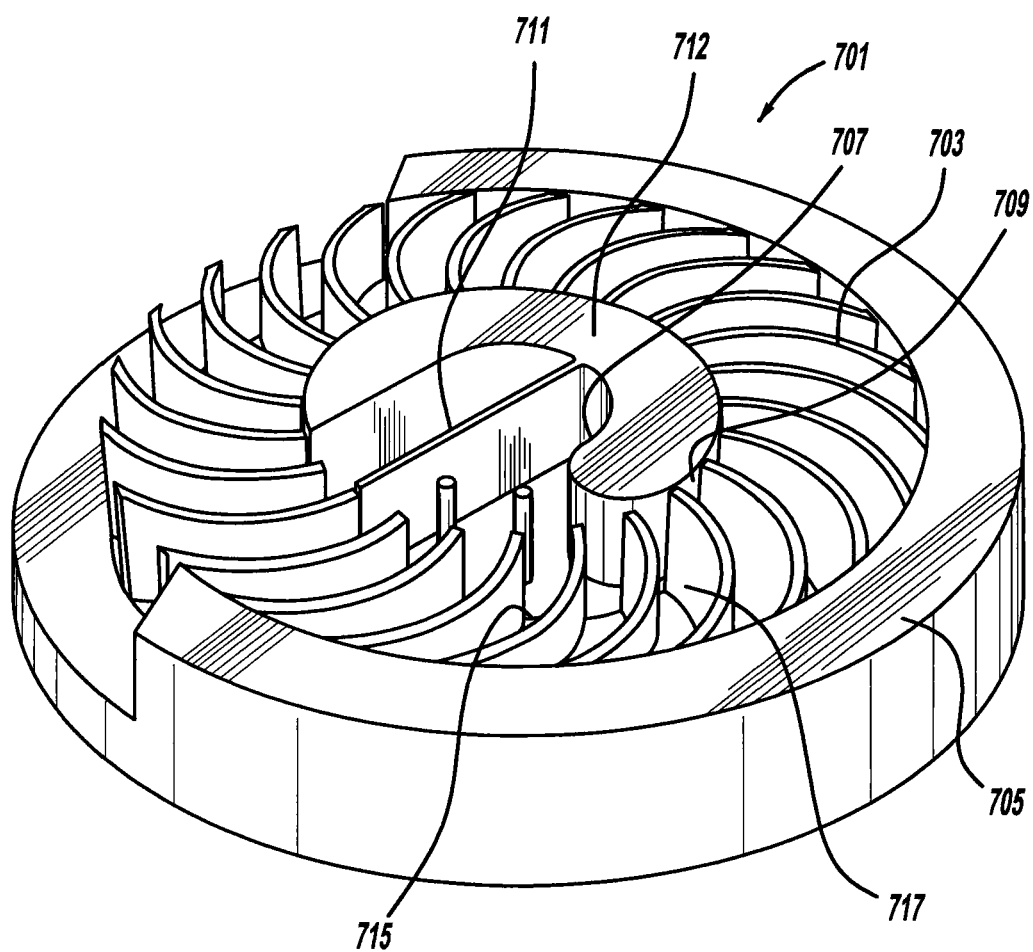
FIG. 18 is a fragmentary perspective view showing an eighth embodiment apparatus of the present invention.

FIG. 18 shows another embodiment of a wave disc engine apparatus 701. Apparatus 701 includes a wave rotor 703 and external end plate 705 like any of the prior embodiments, however, an incoming air portal or entrance 707, and internal end plate 709 are differently configured. Entrance 707 is divided by a centrally upstanding wall 711 such that one area between a C-shaped structure 712 and divider wall 711 allows for fresh air entry to a selectively aligned one or more inlets 715 of wave rotor channels 717. The other area between structure 712 and divider wall 711 allows for either purging of one or more selectively aligned channels 717 or, alternately, inflow of recirculated fluid. This divided entrance configuration advantageously provides fluid stratification which can change pressure wave compression/expansion and fluid combustion characteristics within the wave rotor.

Figure 19A:
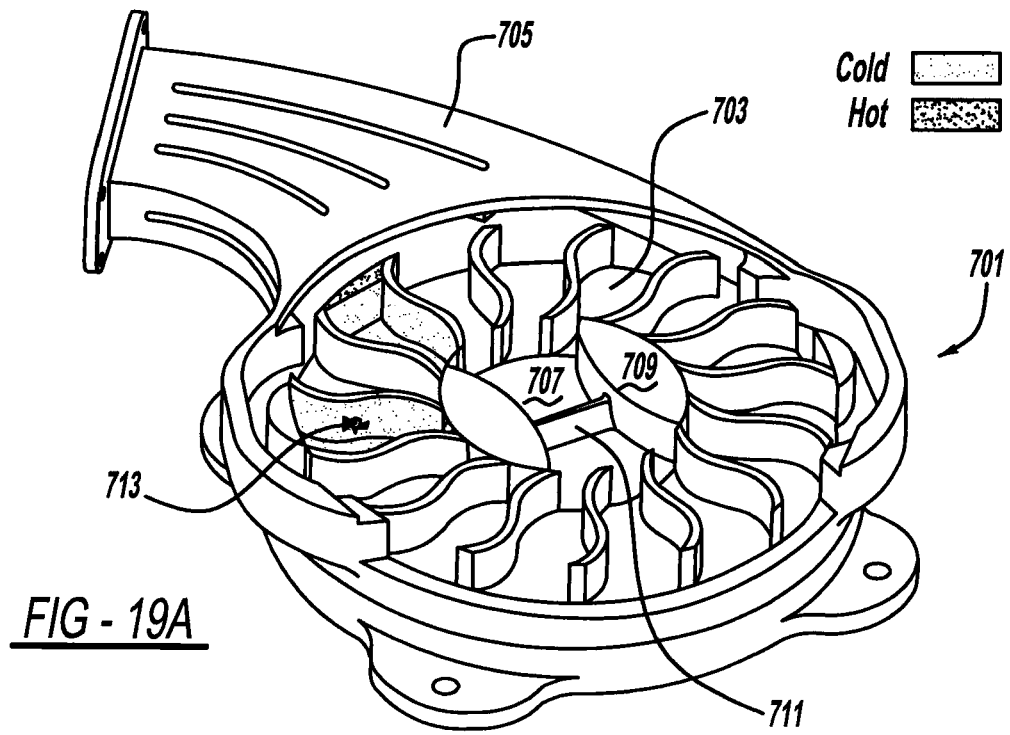
FIGS. 19A-19N are a series of diagrammatic perspective views showing a ninth embodiment apparatus of the present invention.
Figure 19B:
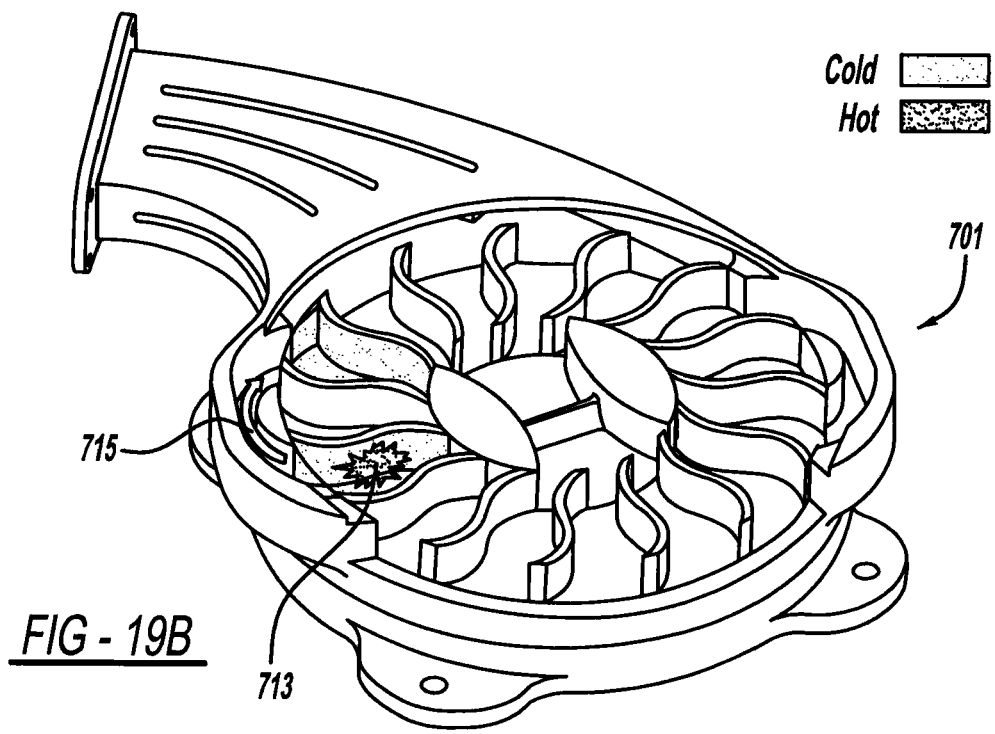
Figure 19C:
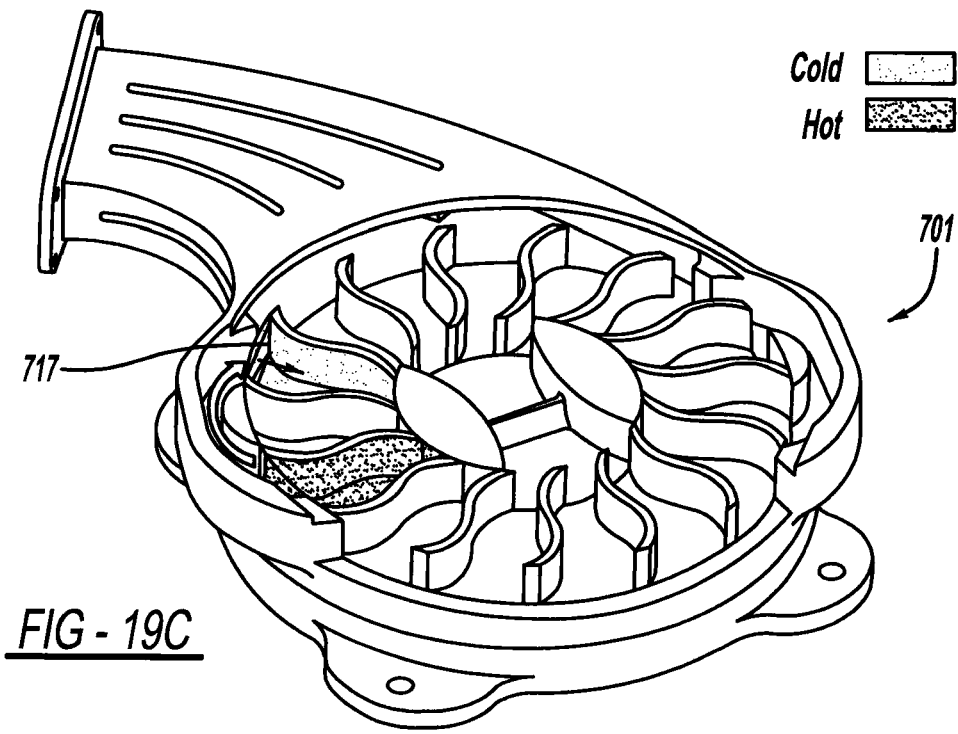
Figure 19D:
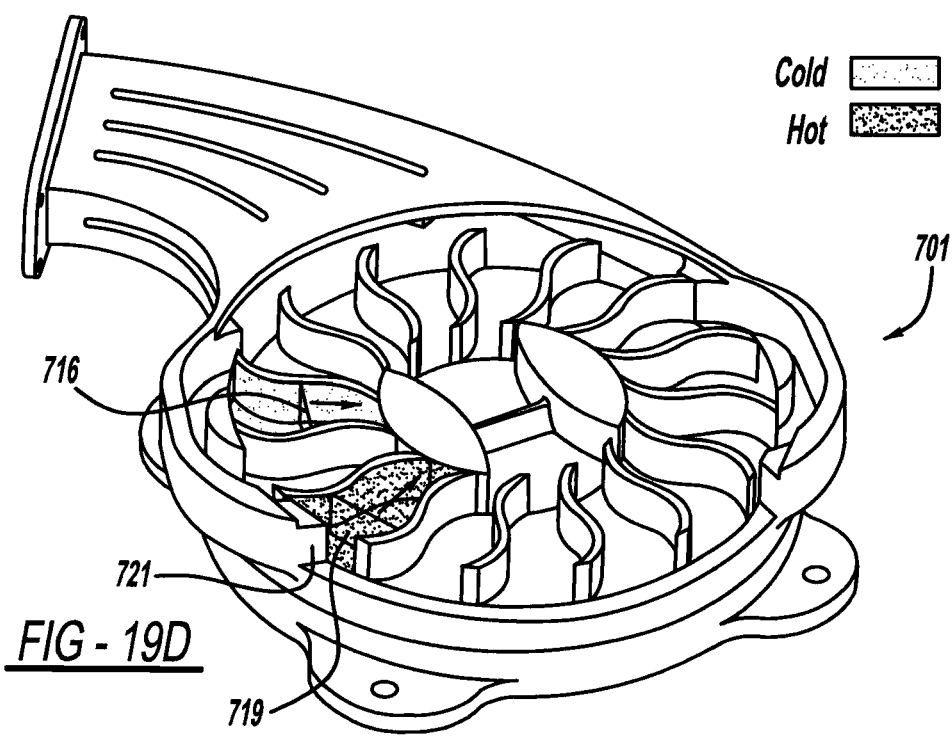
Figure 19E:
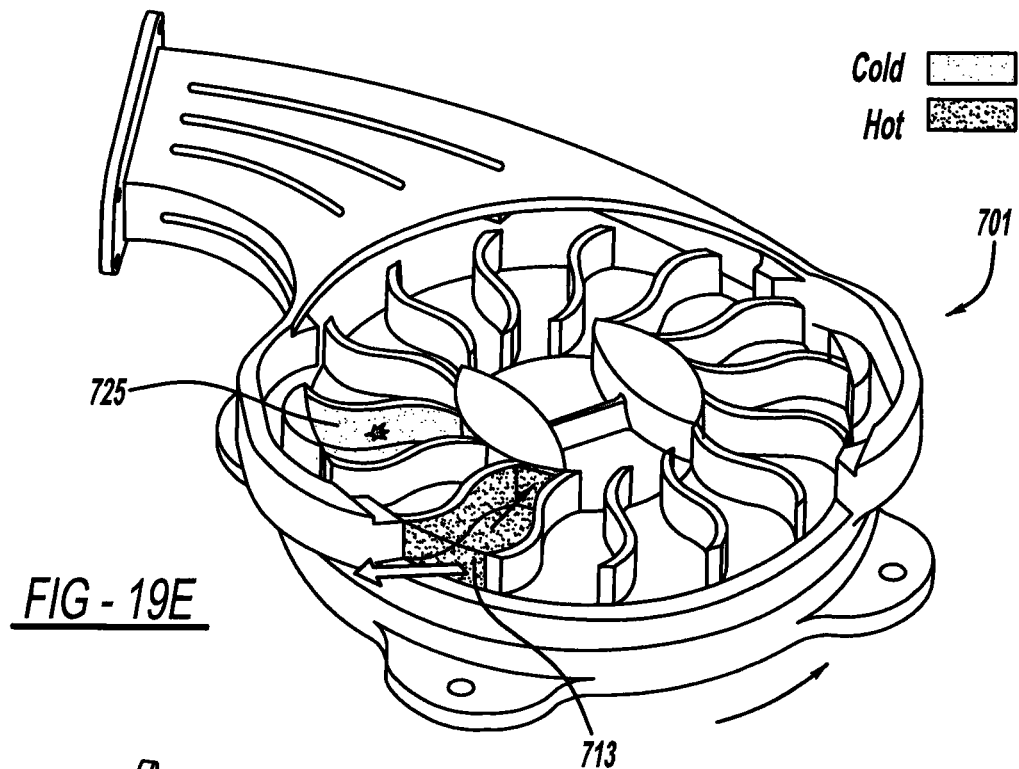
Figure 19F:
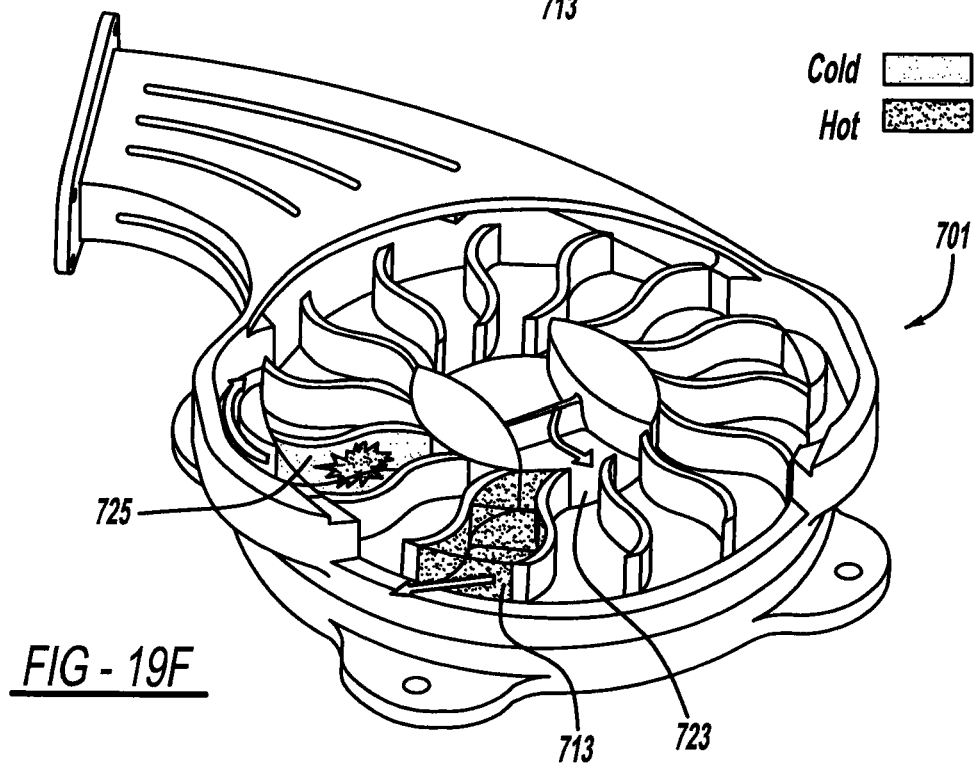
Figure 19G:
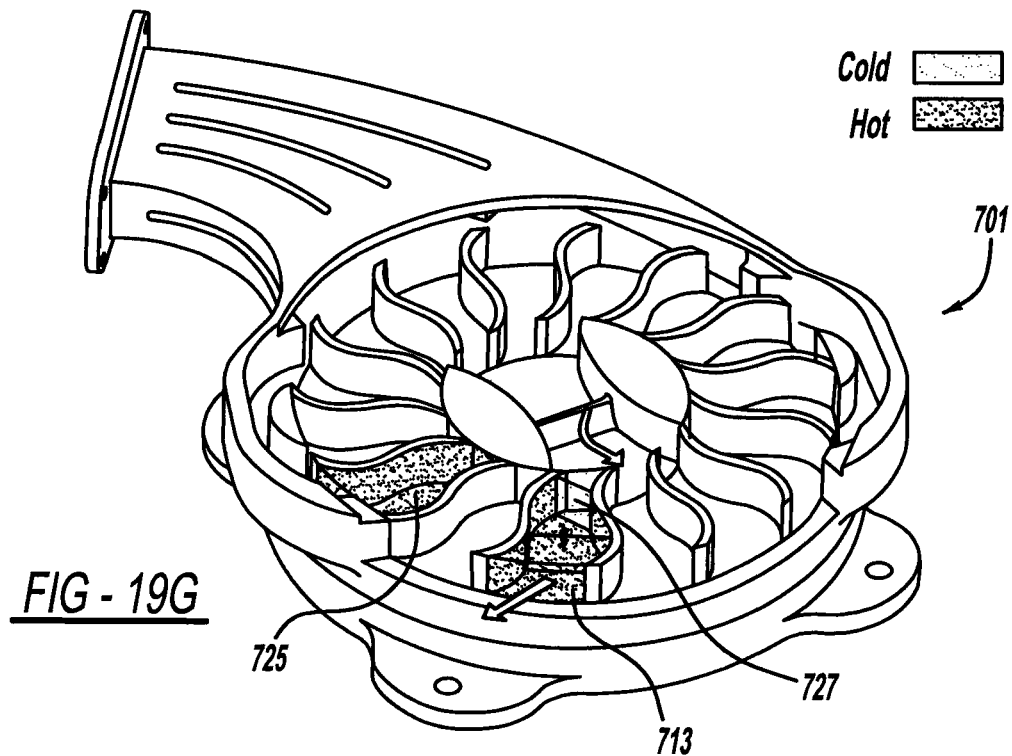
Figure 19H:
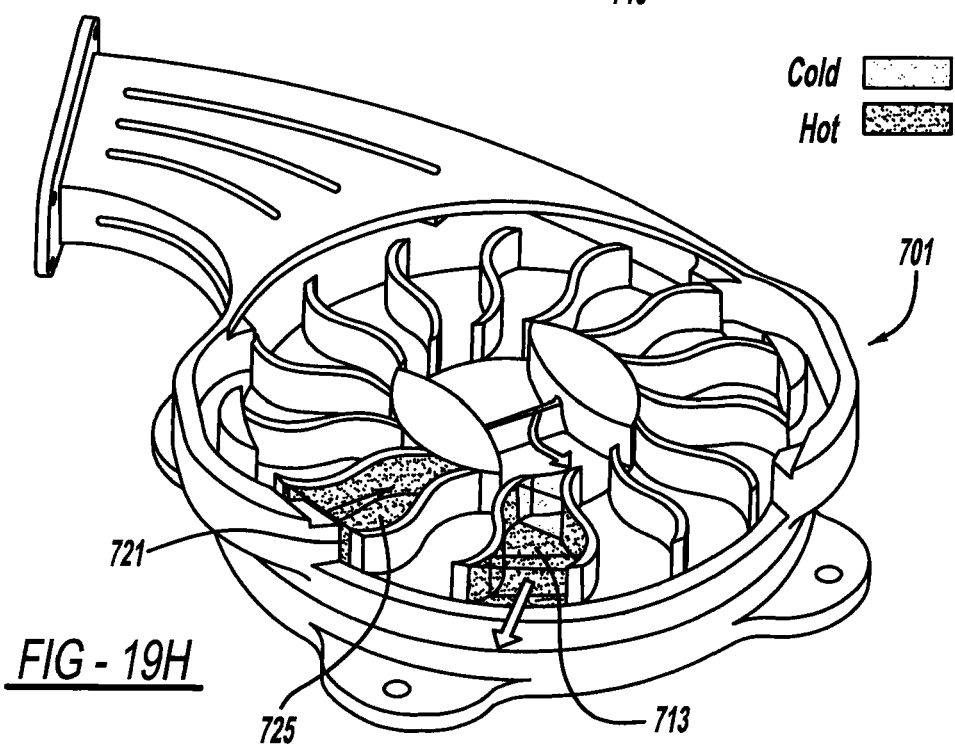
Figure 19I:
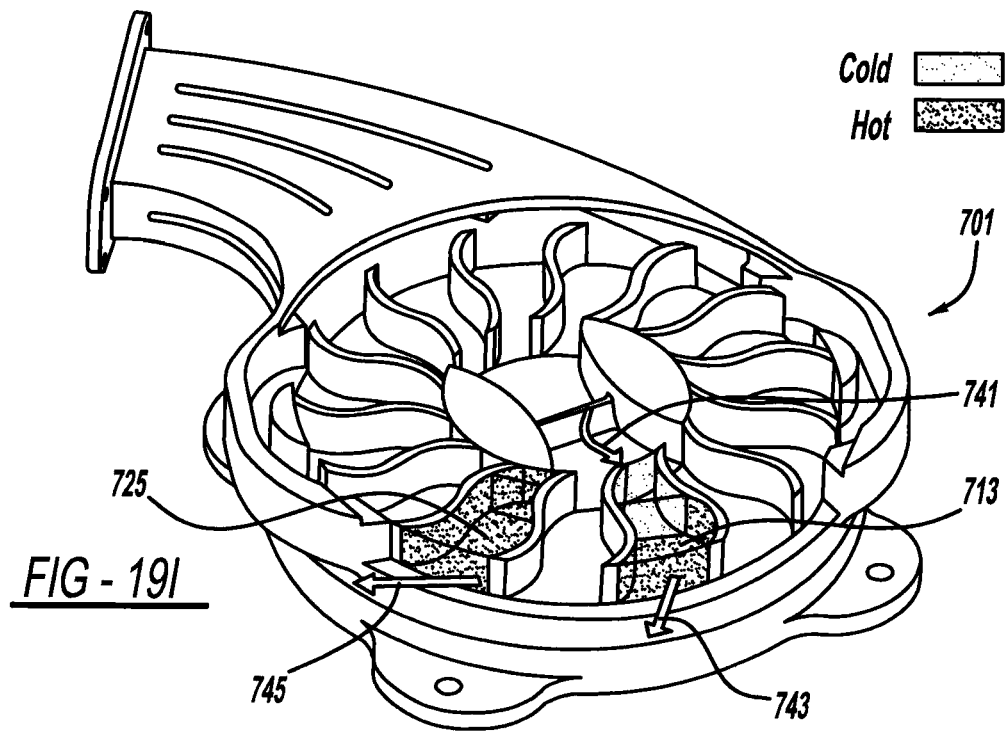
Figure 19J:
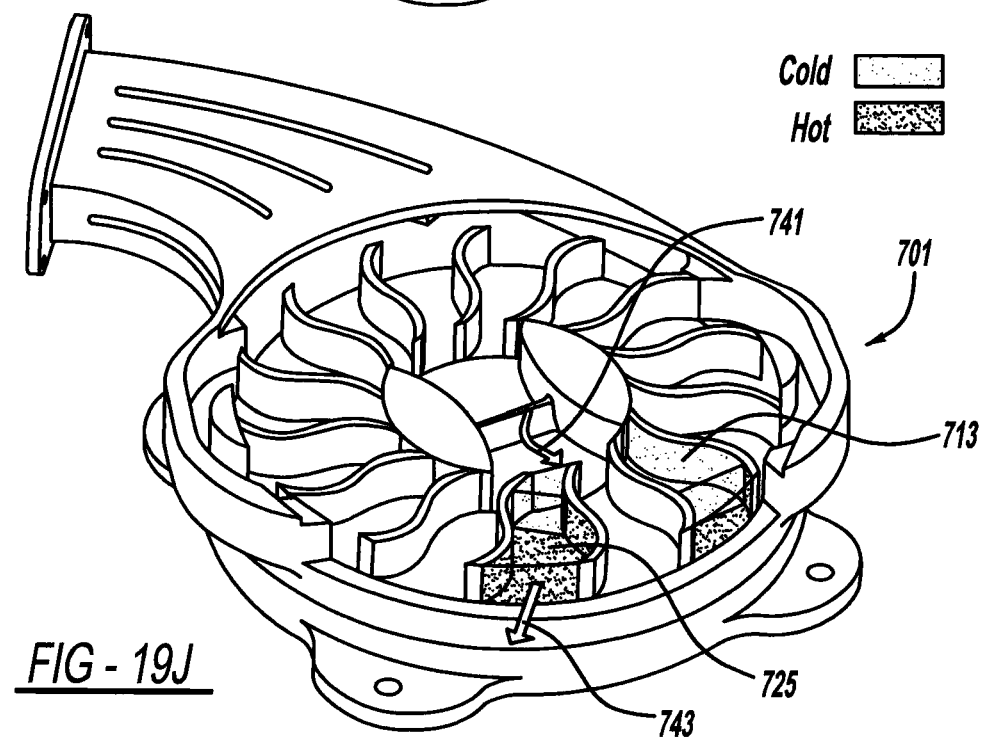
Figure 19K:
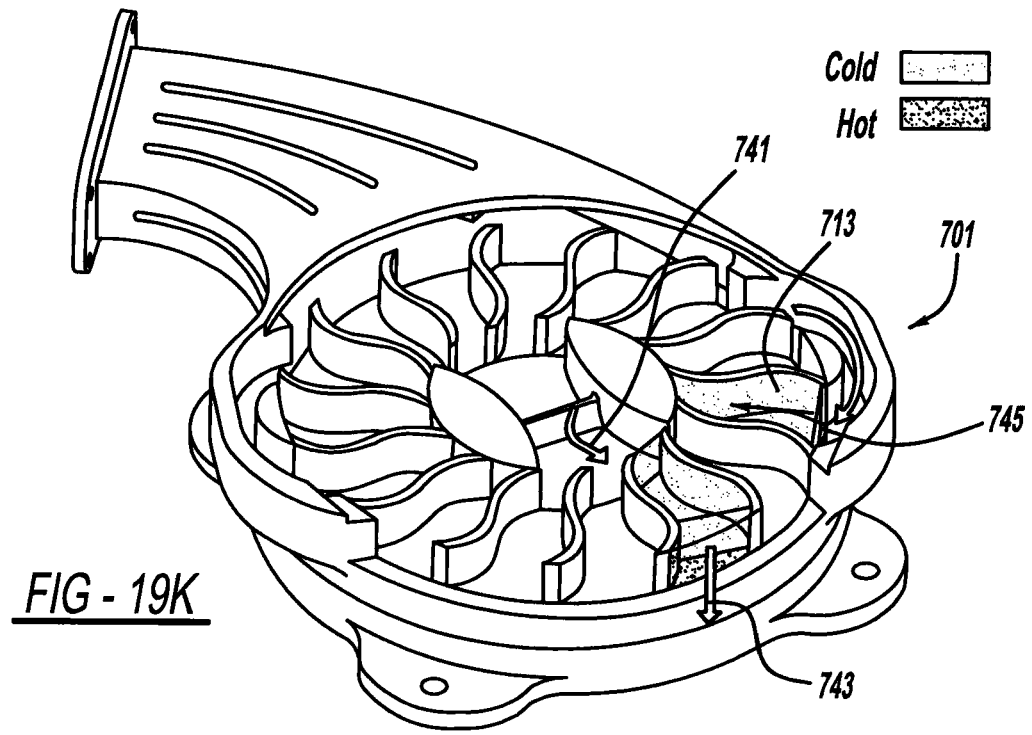
Figure 19L:
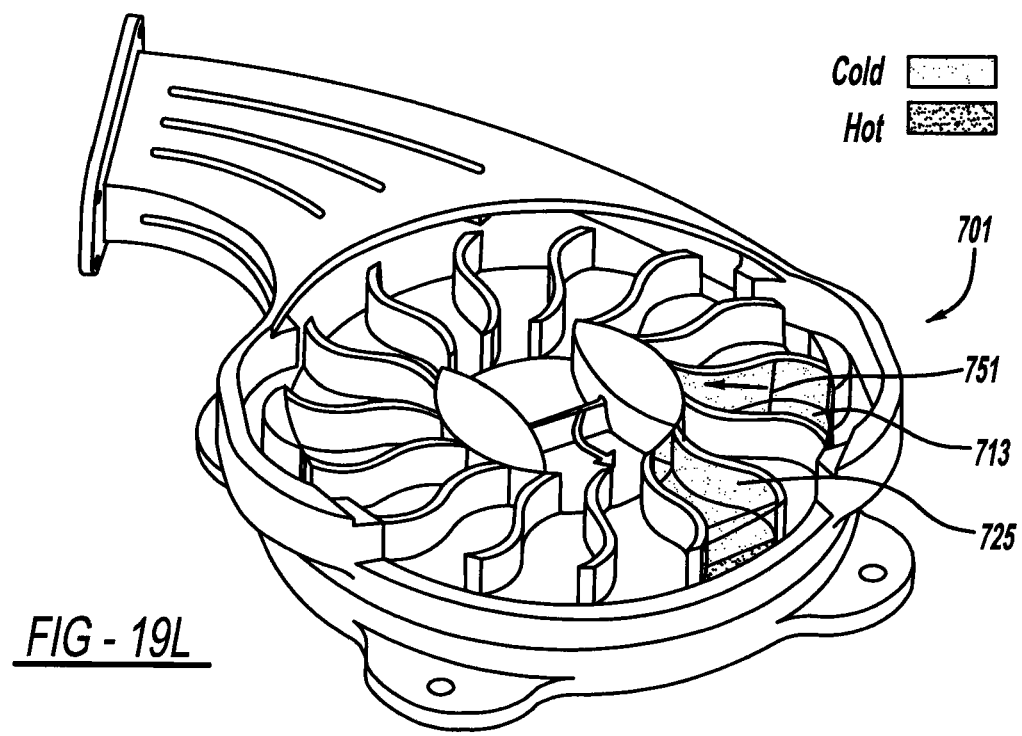
Figure 19M:
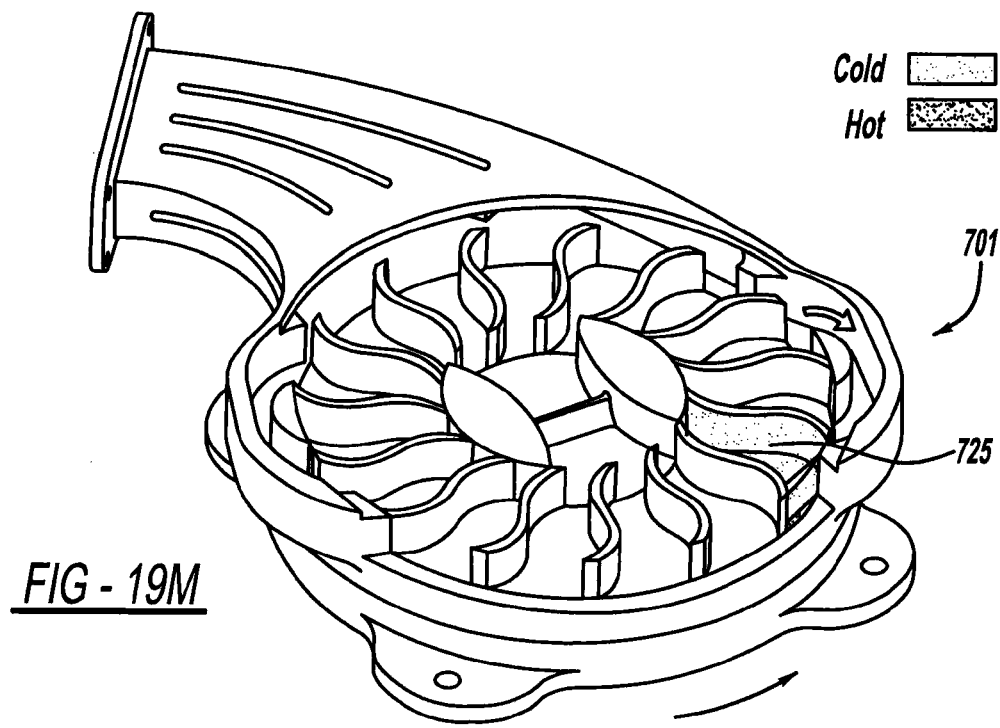
Figure 19N:
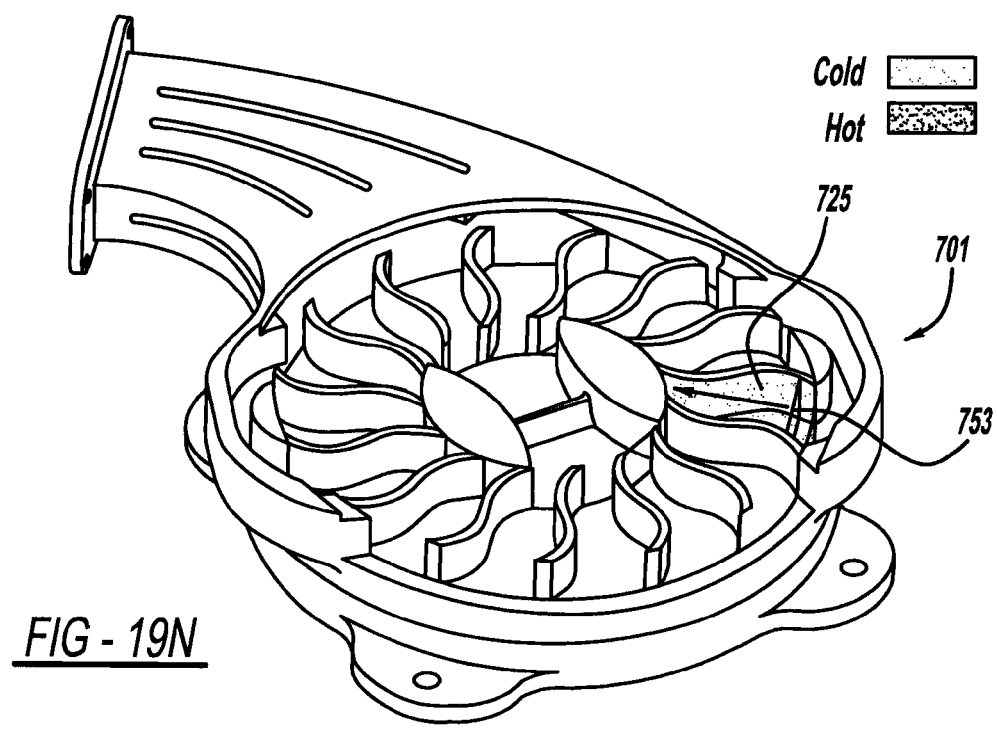

FIGS. 19A-19N illustrate a sequence of operation of yet a further embodiment wave disc engine apparatus 701. A radial wave rotor 703 rotates about a central axis within an outer housing 705. An incoming fluid entrance 707 includes a pair of spaced apart, elliptically shaped inner end plates 709 which are connected by an outstanding divider wall 711 spanning therebetween. Constant volume combustion is shown in channel 713 of FIGS. 19A and 19B. FIGS. 19B and 19C show exiting fluid flowing from channel 713 open to a high pressure return conduit 715 in housing 705, which initiates a compression shock wave 716 for the next cycle. FIG. 19D illustrates an expansion shock wave 719 starting as an exhaust port 721 opens. "Jet propulsion" of the exiting fluid is depicted in FIG. 19E. Furthermore, incoming fluid at port 723, jet propulsion exiting of hot exhaust fluid from rotated channel 713, and return conduit exhaust flow from a channel 725, are shown in FIG. 19F. Next, FIGS. 19G and 19H show combustion scavenging at an outlet of channel 713 while fresh fluid 727 begins to enter an inner inlet of channel 713. Meanwhile, an expansion shock wave 719 starts in channel 725. FIG. 19I illustrates loading at 741, scavenging at 743 and jet propulsion at 745. Subsequently, loading at 741 and scavenging at 743 are depicted in FIGS. 19J and 19K. FIG. 19K also illustrates a compression shock wave 745 forming near an outer end of channel 713 and inwardly moving therefrom. FIGS. 19L-N show the next rotated positions with compression shock waves 751 and 753 inwardly moving in their respective channels.

The function of the present wave disc engine apparatus can alternately be described as follows. The cycle begins with the sudden closing of the outlet port. A hammer shock wave is generated by the deceleration of the exiting flow to zero velocity and propagates toward the inlet, which in turn, compresses the fresh air-flow mixture behind the shock wave. The inlet port is still open to allow for more loading. Thereafter, once the shock wave arrives at the inlet end, the inlet port closes and the mixture in the channel is ignited. After the ignition, the constant volume combustion takes place within the channel, thereby producing a pressure and temperature rise during the combustion process. After the combustion is completed, the outlet end of the channel opens to ambience. This sudden opening of the channel creates an expansion wave propagating toward the inlet. Furthermore, torque generation is produced by the fluid tangential momentum at the outlet (i.e., jet propulsion). Once the pressure of the inlet end of the channel is reduced by the expansion wave below the inlet pressure, the inlet port opens and the fresh air-fuel mixture at the inlet pressure is drawn into the channel and flushes out the exhaust gas. Centrifugal force acting on the flow helps these flushing and loading processes. Subsequently, when the channel is filled up with the mixture, the outlet port closes suddenly. Then the cycle repeats itself.

It is also noteworthy that after the opening of the outlet, an expansion wave propagates toward the inlet, thereby reducing the pressure within the channel. Thereafter, it is reflected on the inlet wall (i.e., closed inner end plate) and the reflected expansion wave propagates toward the outlet end. Once arriving at the outlet, the reflected expansion wave is reflected as a compression wave due to the sub-sonic outflow. During the centrifugal scavenging process, however, expansion waves and compression waves travel back and forth such that once the outlet end is closed by the outer end plate, a hammer shock wave is generated and propagates toward the inlet end in the channel. Moreover, the expansion waves decrease the temperature and a clear interface lies between the exhaust gas and the fresh air mixture within the channel.

In one construction, a pre-mixed air-fuel fluid is supplied through an entry or mixture inlet. The mixture will be ignited when the channel with the combustion products, opens to the mixture inlet and the hot gas contacts the mixture. To prevent a backfire, another entry is added before the mixture inlet to supply only fresh air, thereby creating a buffer layer between the burned gas and the mixture. This additional entrance is alternately called an air inlet. It is ideally suited for bifurcated entrances such as those disclosed in various embodiments herein.

Figure 20:
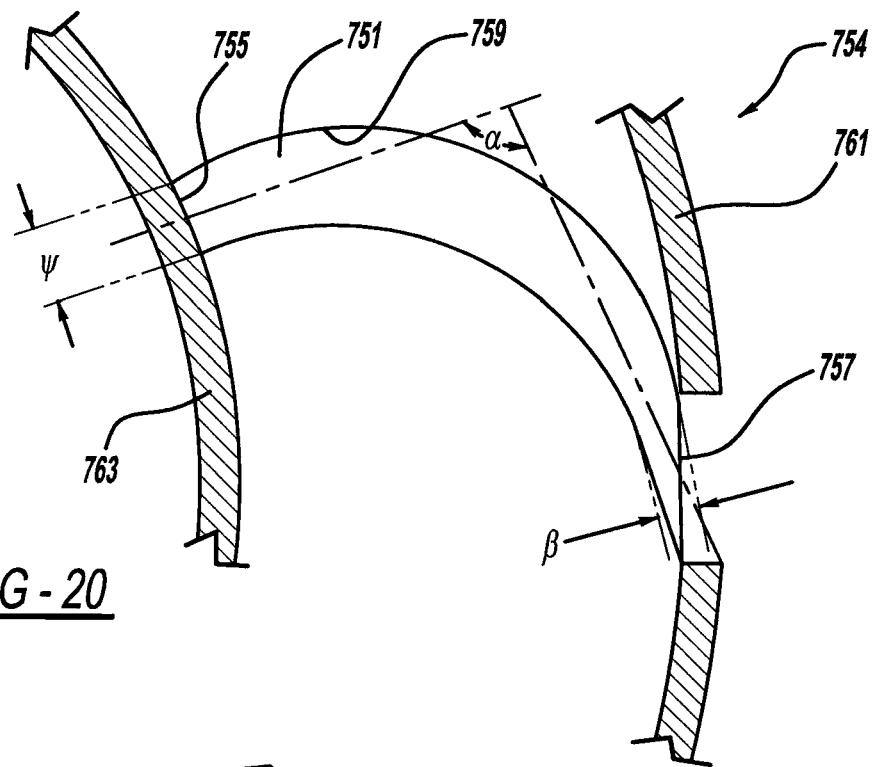
FIG. 20 is a diagrammatic true view showing a tenth embodiment of the apparatus of the present invention.

Applying the aforementioned principles, reference should now be made to FIG. 20, which illustrates a configuration for a typical channel 751 of another embodiment wave disc engine apparatus 754. Each channel 751 has an arcuate and generally C-shape converging or narrowing from an inlet end 755 to an outlet end 757. Thus, the width and cross-sectional area at β are less than width and area at ψ. Furthermore, a tangential offset angle α for the fluid flow path adjacent outlet end 757 relative to inlet end 755 is approximately 80°-90°. The side walls 759 between adjacent channels are thicker adjacent outer end plate 761 as compared to adjacent inner end plate 763 (as observed in the true view like that of FIG. 20).

The air inlet opening angle should be adjusted so that when the channel inlet is opened, the pressure is below ambient pressure, to minimize back flow into the air inlet. Furthermore, the wall angles of the ports should match with the channel or blade angles to avoid incidence loss, in otherwords, to minimize negative torque generation due to a suction surface of the channel wall which could also deter complete filling of the channel. The converging shape relationship of the channel inlet and outlet advantageously generate an air layer between the hot gas and the fresh mixture within the channel.

The converging nature of this wave rotor channel 751 is ideally suited for the present radial wave rotor use. Since the radial wave rotor in the wave disc engine is an unsteady flow device, the power generation principles should be distinguished from traditional steady flow turbines. For a steady flow turbine, the torque on the blades does not vary with time. In contrast, the torque on the channel walls 759 of wave disc engine 754 fluctuates greatly. The unsteady factors advantageously improve energy extraction. Furthermore, the source of torque on the channel wall is due to the pressure and to a lesser extent, viscous force, exerted by the fluid in the channel. Pressure on the pressure side or wall of the channel generates positive torque while the pressure on the suction side or wall generates negative torque, such that the net torque depends on the pressure differential.

Moreover, the front of the acoustic/shock wave propagated through a curved channel is approximately perpendicular to the channel wall. For the generally C-shaped channel desired with this embodiment, as the channel gradually turns, the expansion wave originates at the trailing edge of the upper wall and then the wave front adjusts to become perpendicular to the channel walls. During wave propagation toward the inlet, the wave front is always perpendicular to the channel walls. Furthermore, the wave front is convex to the inlet wall when the reflecting wave interferes with the incident wave. This generally C-shape to the radially extending channels maximizes the positive net torque due to the moving fluid wave characteristics within each channel.

It is expected in at least one operating condition that the channel shape of FIG. 20 will have an expansion duration of 0.4515 ms and an advantageously beneficial efficiency percentage of 3.89. The outlet opening size β has been found to be very influential on the expansion duration since the expansion process is slowed down by the smaller outlet opening. The preceding example employs a 70° inlet width angle and a 10° outlet blade angle with an outlet opening width β of approximately 0.8 cm. In another example, an inlet angle of 75° for an upper wall, 90° for a lower wall, an outlet angle for 10° for the upper wall and 10° for the lower wall, and an outlet opening of approximately 0.1515 cm, is expected to provide an expansion duration of approximately 1.275 ms and a commendable efficiency of approximately 5.12%. When the each converging shaped channel 751 has a length of approximately 5 cm and is rotated at approximately 2,000 rpm, it is expected to provide a duration of approximately 0.4365 ms, a power of approximately 4.7749 kW and an efficiency of approximately 8.71%. Another arcuate converging design employs at 70° inlet angle, a 10° outlet angle (relative to the tangent), a 5 cm inner radius and a 10 cm outer radius. While the radial wave rotor can be rotated between 1,000-20,000 rpm, the power and efficiency are expected to increase with the rotational speed. Furthermore, higher rotational speeds advantageously open and close the channels faster which is favorable to the generation of expansion waves and hammer shock waves of the fluid within the channel.

Figure 22:
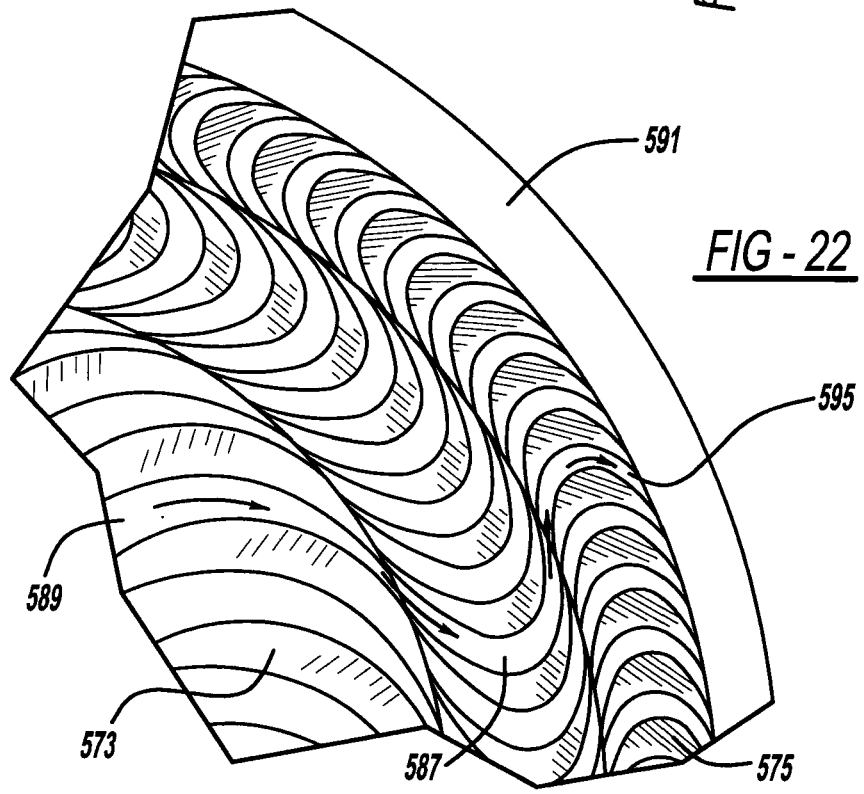
FIG. 22 is an enlarged diagrammatic true view showing the eleventh embodiment apparatus.
Figure 21:
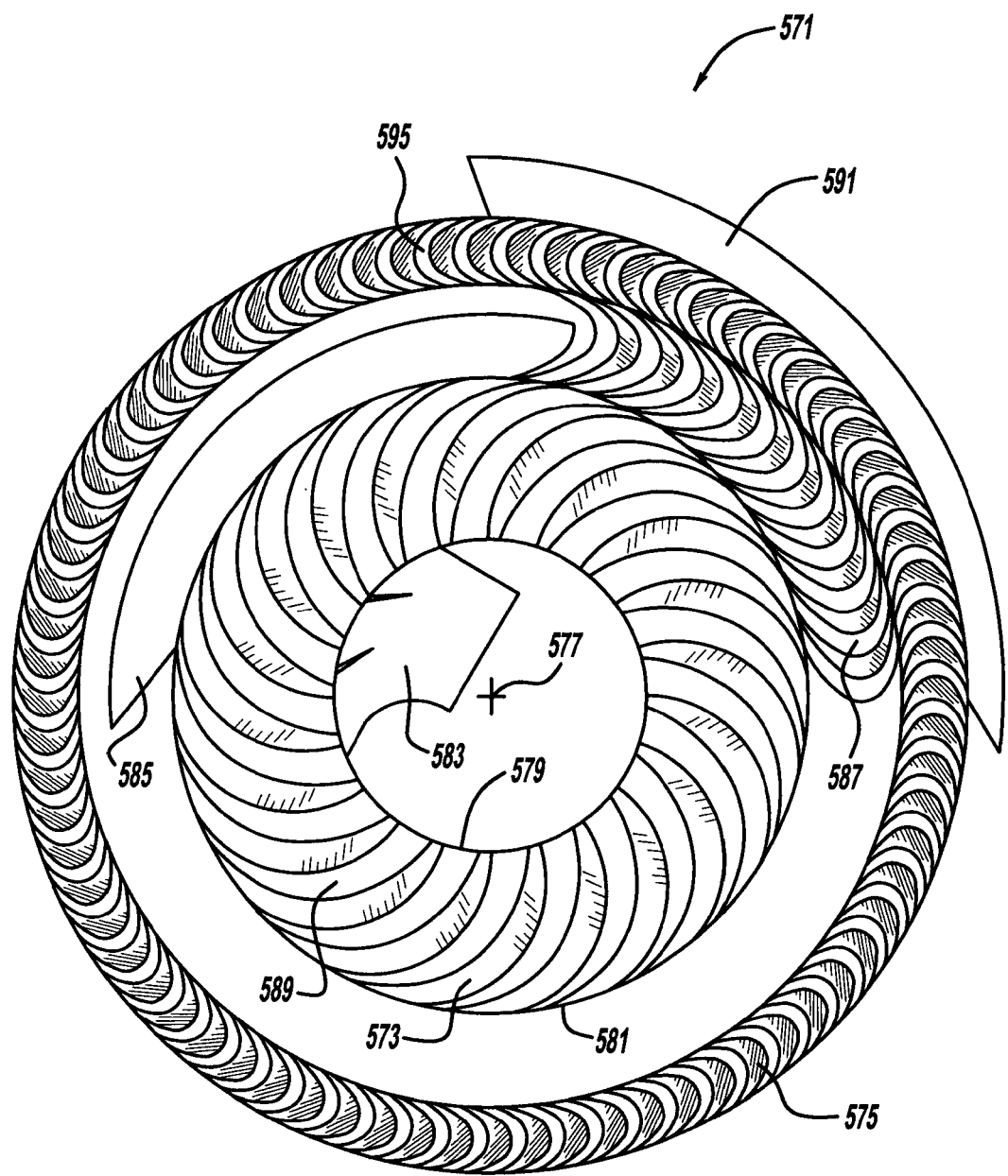
FIG. 21 is a diagrammatic true view showing an eleventh embodiment of the present invention.

Referring to FIGS. 21 and 22, another embodiment of a radial wave rotor or wave disc engine apparatus 571 is of a two-stage engine configuration. An inner radial wave rotor 573 is coaxially aligned with an outer turbine or radial wave rotor 575, which are oppositely rotated about a central axis 577. Apparatus 571 further includes an inner end plate 579, an outer end plate 581, a trifurcated inlet air/fuel entry port 583 and an elongated and partially circular outlet port 585. A set of stationary guide vanes or nozzles 587 are provided between outlet ports of inner wave rotor 573 and inlet ports of outer turbine 575. These nozzles 587 have a generally C-shape to reverse the airflow path exiting each converging and generally C-shaped channel 589 of inner wave rotor 573. A turbine outlet port 591 is also provided adjacent an outer periphery of outer turbine 575. The re-directed exhaust gases then flow through generally C-shaped and somewhat radially oriented channels or passageways 595 in outer turbine 575. The multiples of nozzles 587 advantageously avoid flow separation and vortices. The outlet opening of each nozzle passage is smaller than its inlet opening such that under-expanded exhaust gas can be further expanded to ambient pressure. Shock waves are generated when the outlet of the nozzle passage and the inlet of the turbine blade channel form a converging-diverging nozzle configuration which causes a negative pressure gradient in the turbine blade inlet thereby generating positive torque. It is envisioned that apparatus 571 can generate a power of 8.2902 kW with an efficiency of 11.01% in at least one operating condition.

Figure 23:
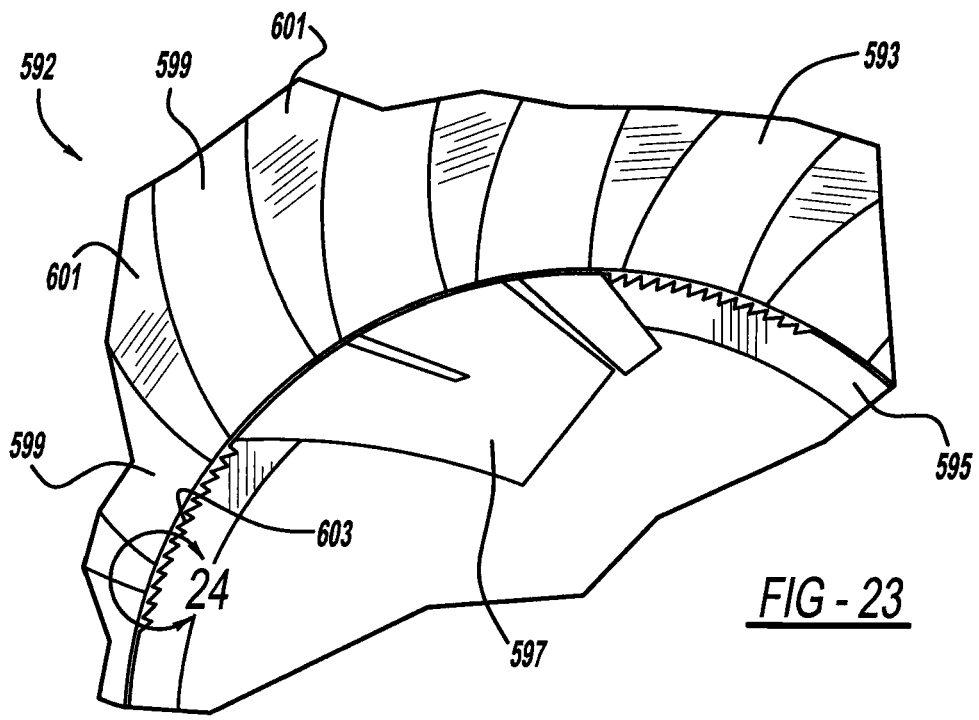
FIG. 23 is a fragmentary and diagrammatic true view showing a twelfth embodiment apparatus of the present invention.
Figure 24:
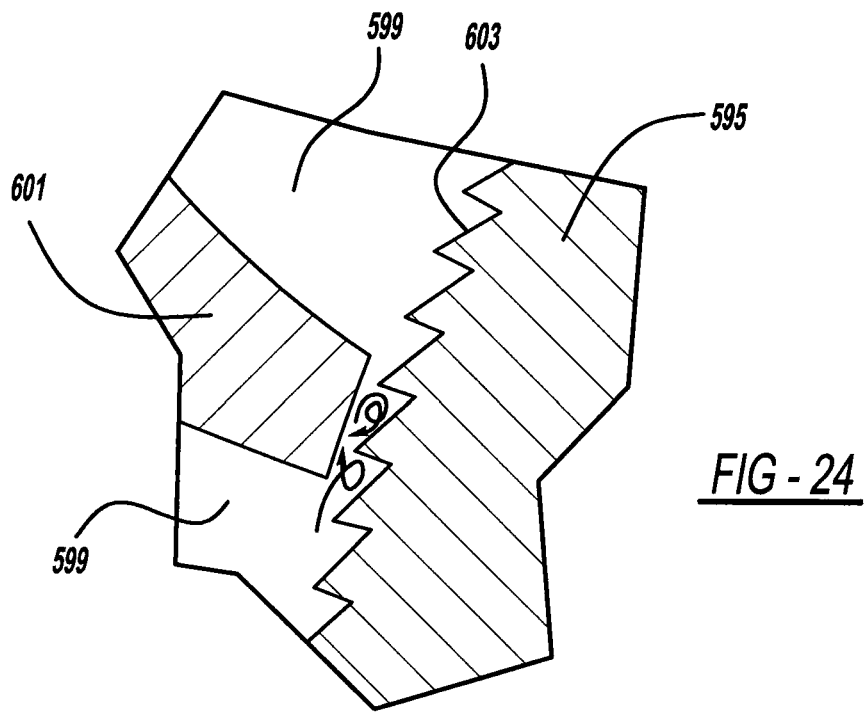
FIG. 24 is an enlarged diagrammatic view, taken within circle 24 of FIG. 23, showing the twelfth embodiment apparatus.

Reference should now be made to FIGS. 23 and 24 for a different embodiment wave disc engine apparatus 592. This embodiment apparatus includes a radial wave rotor 593 which rotates relative to a stationary inner end plate 595 and a trifurcated air and fuel inlet entry port 597. Wave rotor 593 includes multiple elongated channels or passageways 599, each having a generally radial direction of elongation with a somewhat C-shaped and arcuate converging configuration. Each of these channels 599 are separated by solid walls 601 which have a diverging thickness between inner end plate 595 and an outer end plate. A peripheral surface of inner end plate 595 includes a set of corrugations or teeth 603 arranged adjacent each circumferential side of inlet port 597. These teeth can alternately be on the entire peripheral surface of inner end plate 595. The repeating pattern of surface irregularities creating teeth 603 may have the triangular peak and valley shapes shown or alternately, square peaks and/or valleys, rounded peaks and/or valleys, a criss-crossing knurl pattern, or the like. The objective of these teeth is to create turbulence of any gas leaking from one wave rotor channel 599 to an adjacent channel through a gap between an inner end of the separating wall 601 and the peripheral surface of inner end plate 595. Such a turbulent flow serves as a seal between walls 601 and inner end plate 595, blocking subsequent leaking gas, which is expected to increase operating efficiencies while reducing backfire situations. Moreover, this approach reduces the need for a mechanical elastomeric or coating seal which would otherwise create efficiency-sapping friction.

Figure 25:
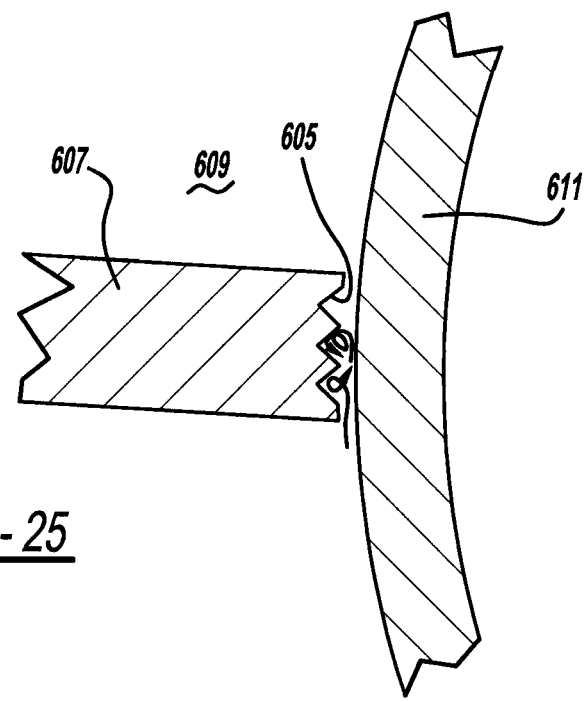
FIG. 25 is a fragmentary and diagrammatic true view showing a thirteenth embodiment apparatus of the present invention.

FIG. 25 illustrates another embodiment wherein teeth 605 are located on an inner end of a wall 607 separating adjacent radial wave rotor channels 609. These teeth cause turbulent blocking of by-passing combustion gases through the gap between each wall 607 and the adjacent smooth peripheral surface of inner end plate 611. Alternate tooth shapes and surface irregularities may alternately be employed.

It is also envisioned that a titanium alloy base with a ceramic coating can be used to make the radial wave rotor of any of the embodiments disclosed herein. The ceramic coating can be made of an abraidable material to improve mechanical sealing between ends of radial wave rotor walls and the adjacent peripheral surface of an inner end plate and/or outer end plate adjacent thereto.

Figure 26:
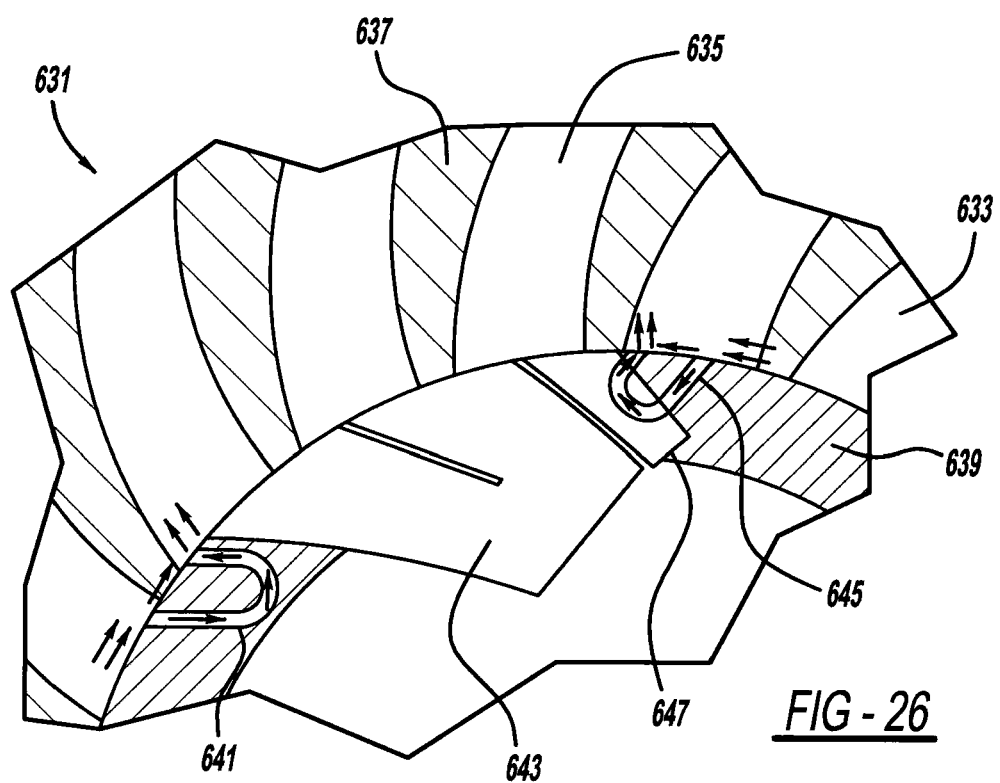
FIG. 26 is a fragmentary and diagrammatic true view showing a fourteenth embodiment apparatus of the present invention.

Another embodiment for the wave disc engine apparatus 631 is illustrated in FIG. 26. Wave disc engine apparatus 631 includes a radial wave rotor 633 having multiple converging channels 635 separated by diverging thickness walls 637 which rotate relative to a stationary inner end plate 639. A first by-pass conduit 641 is positioned adjacent a bifurcated air inlet entry port 643 and a second by-pass conduit 645 is positioned adjacent a fuel inlet entry port 647. The by-pass conduits each have a generally U-shape within end plate 639 such that open ends thereof are accessible by channels 635. The objective is to redirect a portion of the leaking fluid otherwise passing through a gap between an inner end of wall 637 and adjacent peripheral surface of inner end plate 639. When leakage jets or flows pass inlets of by-pass channels 641 and 645, portions flow through the conduits which causes jets of the by-pass fluid to flow out of outlets of the by-pass conduits. When the leaking jet flows and by-pass jet flows merge, they will thereafter travel along the channel walls in a generally radial direction instead of continuing in a circumferential direction. In this way, the leakage flows into the wave rotor channels without causing a backfire in the fuel inlet or blocking the inflow from the air inlet. The initial and merged air flows are shown by double arrows.

Figure 27:
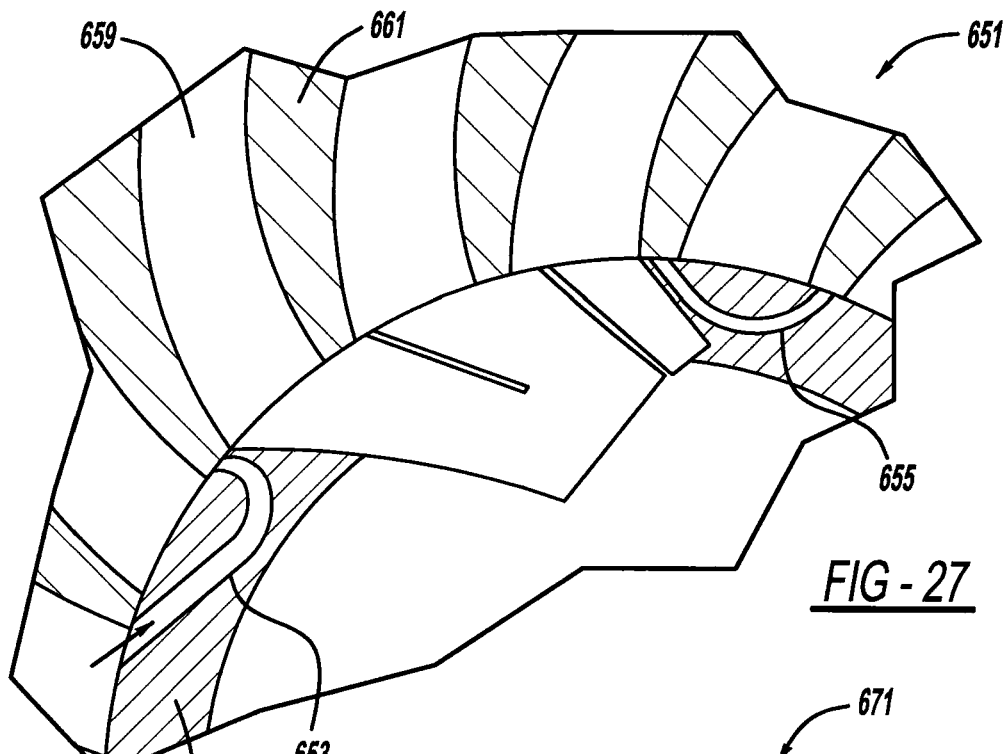
FIG. 27 is a fragmentary and diagrammatic true view showing a fifteenth embodiment apparatus of the present invention.

Another embodiment wave disc engine apparatus 651 is shown in FIG. 27. This embodiment is much like that shown in FIG. 26, however, a modified J-shape is used for by-pass conduits 653 and 655 in inner end plate 658. The inlet versus outlet spacing and angular orientations of by-pass conduits 653 and 655 differ from each other and from that of the prior embodiment. The J-shape provides different entry and/or exit angles for the gases therein. This embodiment is also envisioned to prevent backfiring of combustion fluid flowing between radial channels 659 if they leak past the separating walls 661.

Figure 28:
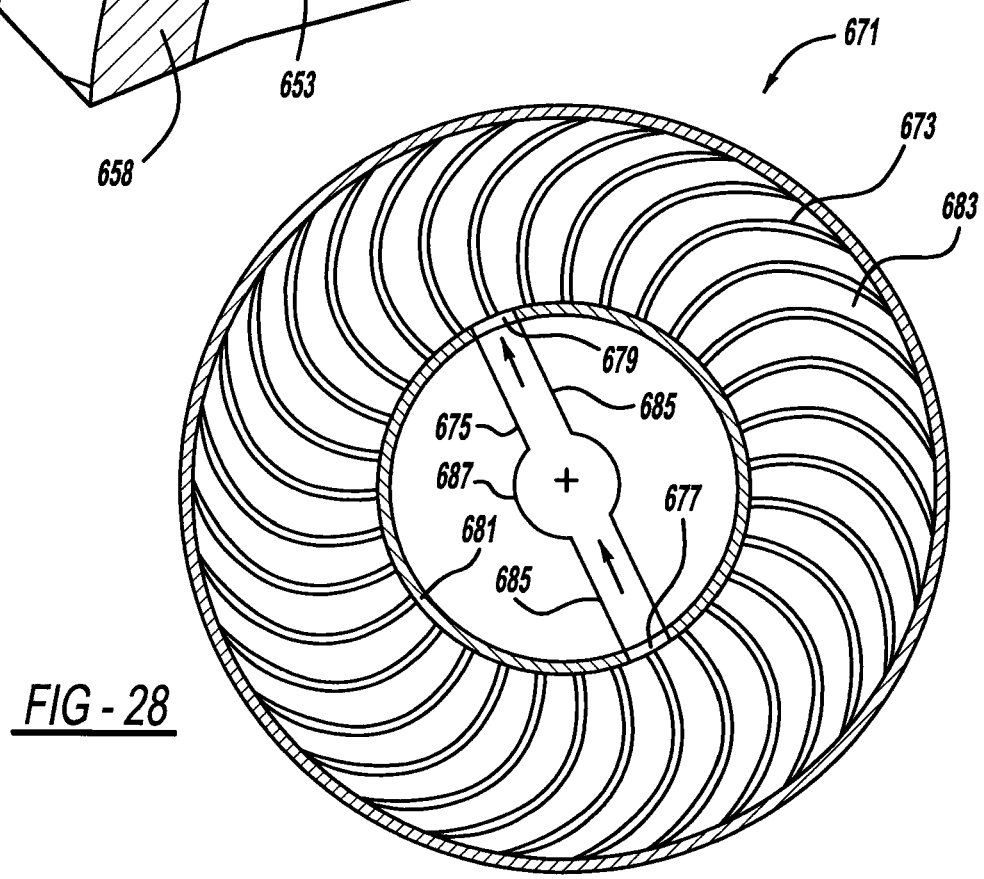
FIG. 28 is a diagrammatic true view showing a sixteenth embodiment apparatus of the present invention.

Still another embodiment of the wave disc engine apparatus 671 can be observed in FIG. 28. This apparatus has a radial wave rotor 673 similar to that of FIG. 17 however a reinjection passage or cross-channel 675 is differently configured. The injection passage 675 spans across and couples together ports 677 and 679 of inner end plate 681 around which the radial channels 693 spin. The injection passage 675 preferably has straight nominal segments 685, of a width and cross-sectional area slightly smaller than each channel 683, joined by a wider plenum segment 687. The somewhat spherical plenum segment 687 is preferably located at the middle rotational axis and has a cross-sectional width and area at least twice that of the somewhat cylindrical nominal segments 685. However, frusto-conical, elliptical, and other expanded shapes may be employed for plenum segment 687 and the plenum can be moved closer to one port or the other depending on the fluid flow characteristics desired. The re-injected gas transferred by the injection passage 675 aids in the burning of fleshly injected mixture. The re-injected gas has a very high temperature and can ignite the mixture much quicker than by using a spark alone. In one operating condition, the wave rotor rotates at about 20,000 rpm and the steady state, high instantaneous temperature is about 3,000° K. Furthermore, the enlarged plenum segment 687 serves to decouple a shock wave from the gas flow. This shock wave dissipation reduces timing and shock reverberation concerns. It is noteworthy that the fluid is at a high pressure when exiting port 677 and is at a low pressure when entering port 679.

Figure 29:
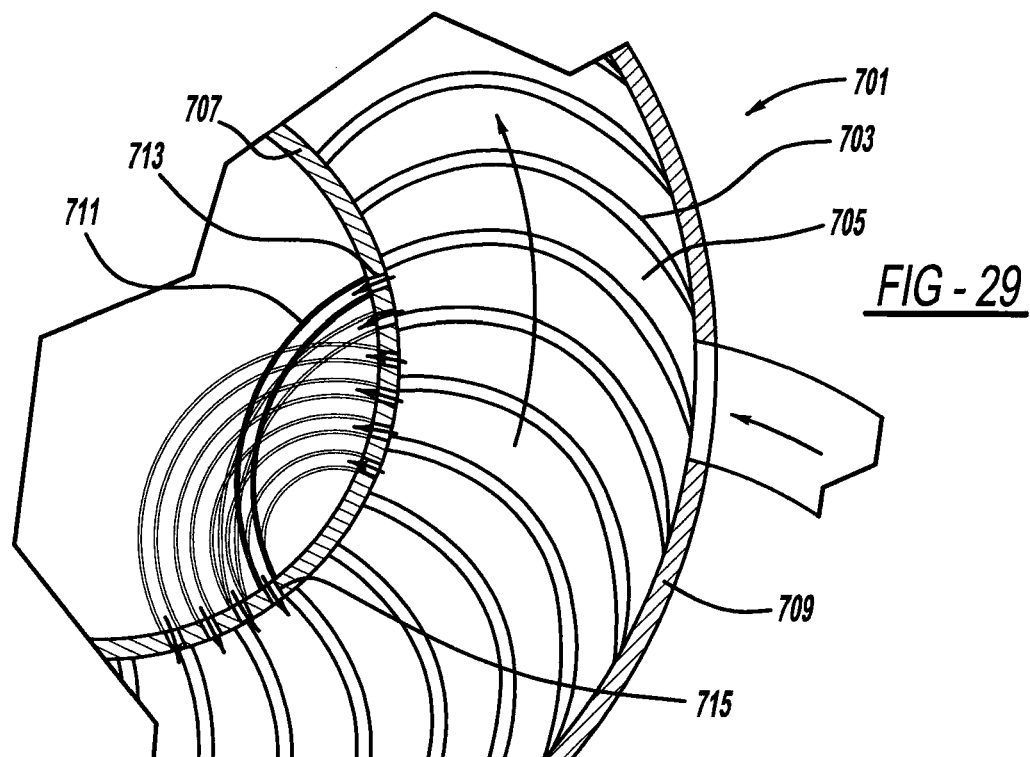
FIG. 29 is a fragmentary and diagrammatic view showing a seventeenth embodiment apparatus of the present invention.

Referring to FIG. 29, a further embodiment wave disc engine 701 has a radial wave rotor 703 with radially elongated and curved channels 705 spanning between stationary inner and outer end plates 707 and 709, respectively. Arcuate cross-channels or re-injection passageways 711 connect between ports 713 and 715 within inner end plate 707. Depending on the fluid re-injection and combustion characteristics, multiples of these re-injection passages can be employed on the same inner end plate, and can connect together channels that are spaced apart by two or more intervening channels.

Figure 30:
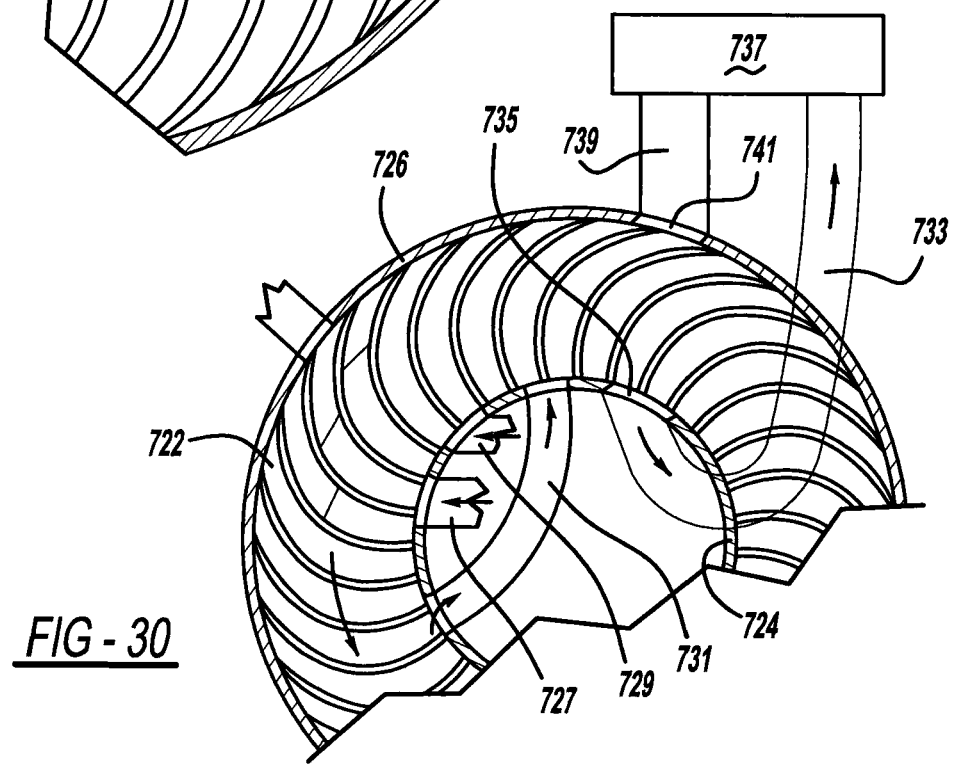
FIG. 30 is a fragmentary and diagrammatic true view showing an eighteenth embodiment apparatus of the present invention.

The embodiment of FIG. 30 employs a radial wave rotor 722 between an inner end plate 724 and an outer end plate 726. A pre-mix fuel and air entrance port 727 and a buffer air entrance port 729 are provided in inner plate 724. Furthermore, a cross-channel or reinjection by-pass passageway 731 is provided between a pair of ports in inner end plate 724. Additionally, an outlet passageway 733 flows from an inner end plate port 735 to a remotely located turbine 737 or other rotor. A return passageway 739 can optionally pass from an opposite outlet side of turbine 737 to a port 741 in outer end plate 726.

Figure 31:
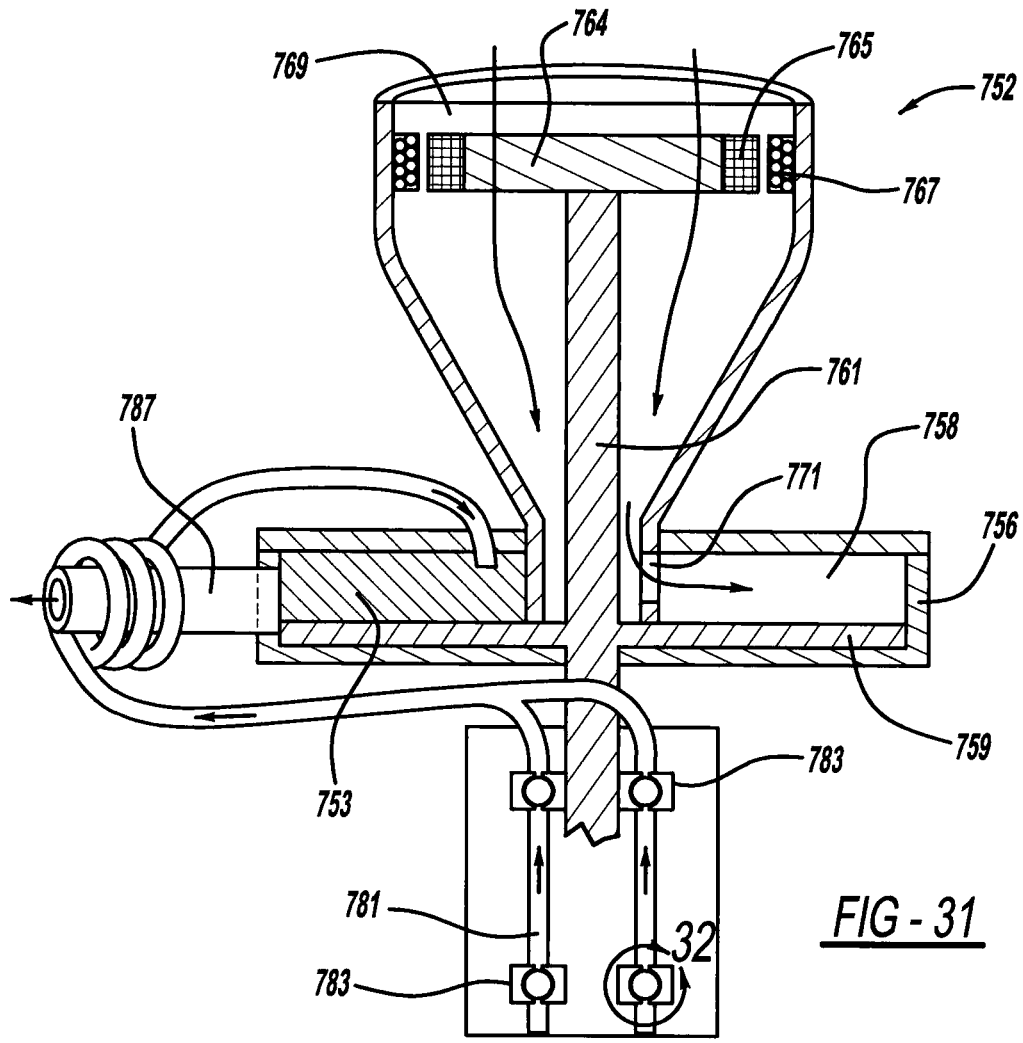
FIG. 31 is a cross-sectional view showing a nineteenth embodiment apparatus of the present invention.
Figure 32:
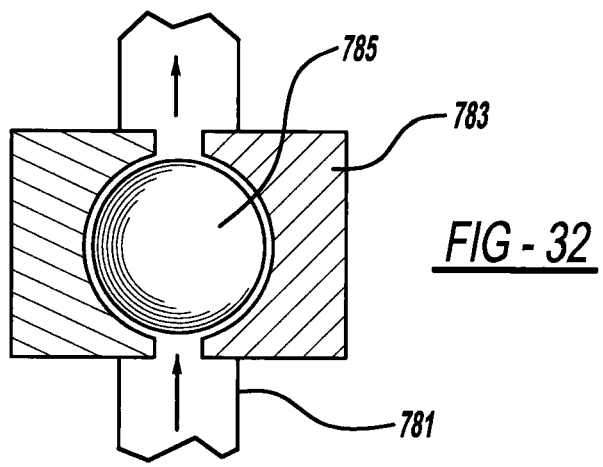
FIG. 32 is an enlarged and cross-sectional view taken within circle 32 of FIG. 31, showing the nineteenth embodiment apparatus.

Referring to another embodiment wave disc engine 752, in FIGS. 31 and 32, a radial wave rotor 753, similar to any of the prior embodiments, rotates within one or more housings 756 which define inner and outer end plates at the ends of rotating channels 758. A disc-like base 759 of wave rotor 764 is connected to a transmission shaft 761. A compressor or other rotor 764 is affixed to and rotates with shaft 761. Optionally, a magnetic material 765 can be affixed to a periphery of compressor 764 for electro-magnetic interaction with wire windings 767 to act as either a generator or a motor. The wire windings and magnetic material can be alternately reversed. Preferably, pre-mixed fuel and air enters inlet chamber 769, are additionally mixed and pushed by compressor 764, and subsequently flow into an inlet entry port 771 in the housing inner end plate for combustion and centrifugal scavenging within channels 758 of radial wave rotor 753 as it rotates. Exemplary fuel can include gasoline, ethane, natural gas and hydrogen. Unlike with an internal combustion engine, however, a radial wave rotor does not require highly compressed fuel and air. For example, a rich or pure fuel injection pressure is preferably between one barr and fifteen barrs, and more preferably between one barr and five barrs. For a pre-mixed fuel and air mixture, a slightly greater than ambient pressure is desirable, such as between one and three barrs.

In one optional version, pure fuel flows into tubes 781 mating with ball bearing assemblies 783. The fuel passes around the ball bearings 785 to cool the bearing assemblies 783. The fuel then exits the ball bearing assemblies and the tube carrying the warmed fuel is wrapped around an exhaust outlet 787 passing exiting hot, combusted gas from channels 758 of radial wave rotor 753. This coiled tube-to-exhaust interface serves to additionally pre-heat the fuel passing along tube 781 such that it has an elevated temperature when it enters either directly into the corresponding one or more channels 758 (as shown) or alternately into inlet chamber 769. The fuel advantageously removes heat from the bearing assembly 783 and exhaust 787, then assists in causing earlier combustion initiation within the associated wave rotor channels 758 due to its elevated temperature. Earlier combustion leads to a stronger shock wave moving along the channels which increases wave rotor rotational speed and power output.

Figure 33:
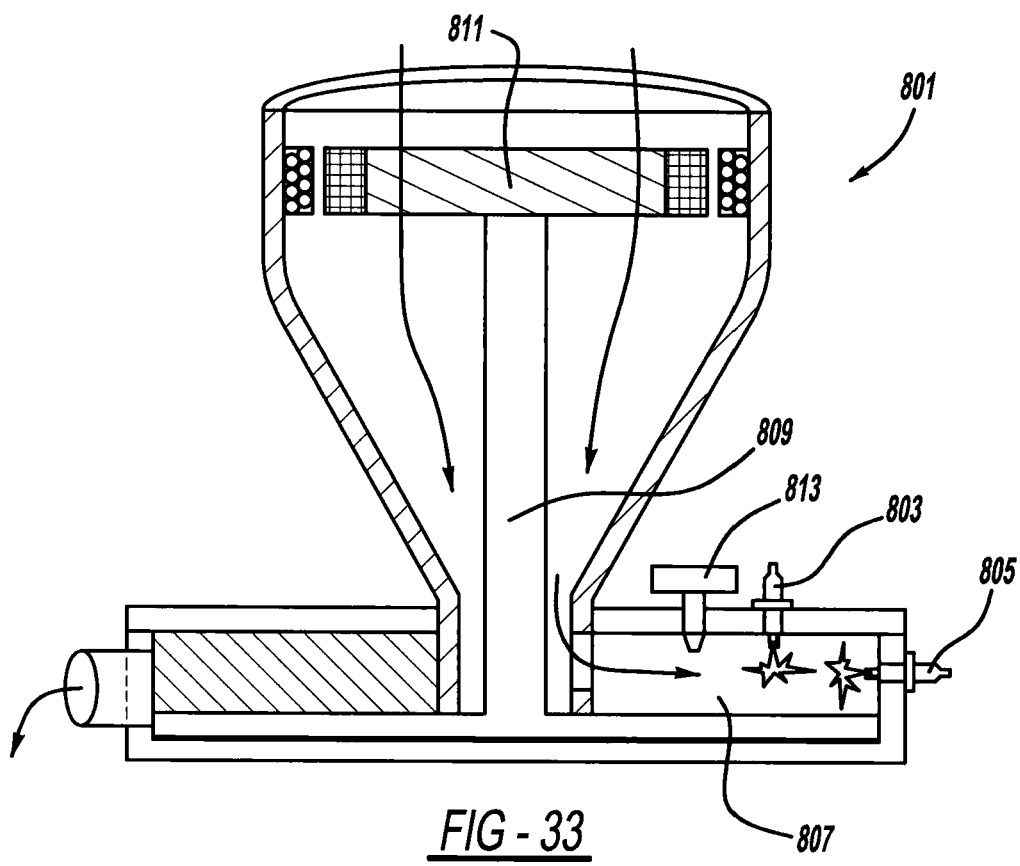
FIG. 33 is a cross-sectional view showing a twentieth embodiment apparatus of the present invention.

FIG. 33 shows still another embodiment wave disc engine apparatus 801. In this arrangement, one or more igniters 803 and 805 are located in and directly aligned with a middle and/or end section of the associated wave rotor channel 807. Radial wave rotor channels 807 rotate about a central output shaft 809 and an optional compressor or rotor 811. A supplemental fuel injector 813 can directly supplement pure fuel injection into a middle of aligned channel 807.

Figure 34:
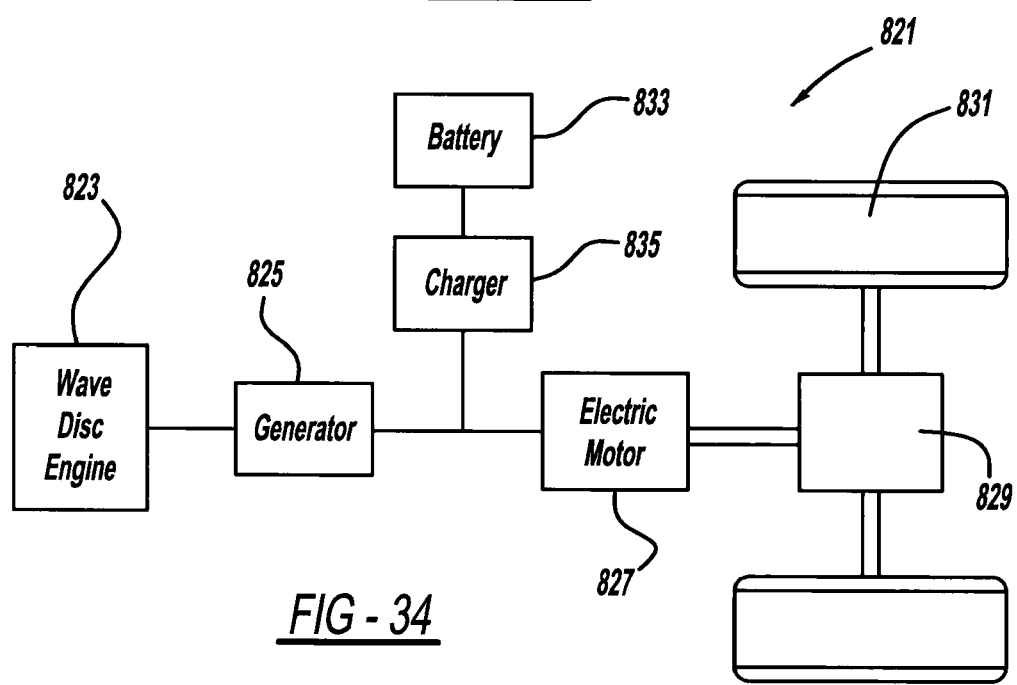
FIG. 34 is a diagrammatic view showing an electric drive system for an automotive vehicle in a twenty-first embodiment apparatus of the present invention.

FIG. 34 illustrates another wave disc engine 821 configuration used in an automotive vehicle. In this arrangement, a wave disc engine 823, preferably a radial wave rotor having any of the configurations previously discussed herein, is connected to a generator 825 which then supplies power to either or both electric traction motor 827 or a battery 833 and charger/alternator 835. Traction motor 827 directly and mechanically rotates a transmission 829 and driving wheels 831 having tires thereon. As a backup, the battery and charger may supply stored power to electric motor 827.

Figure 35:
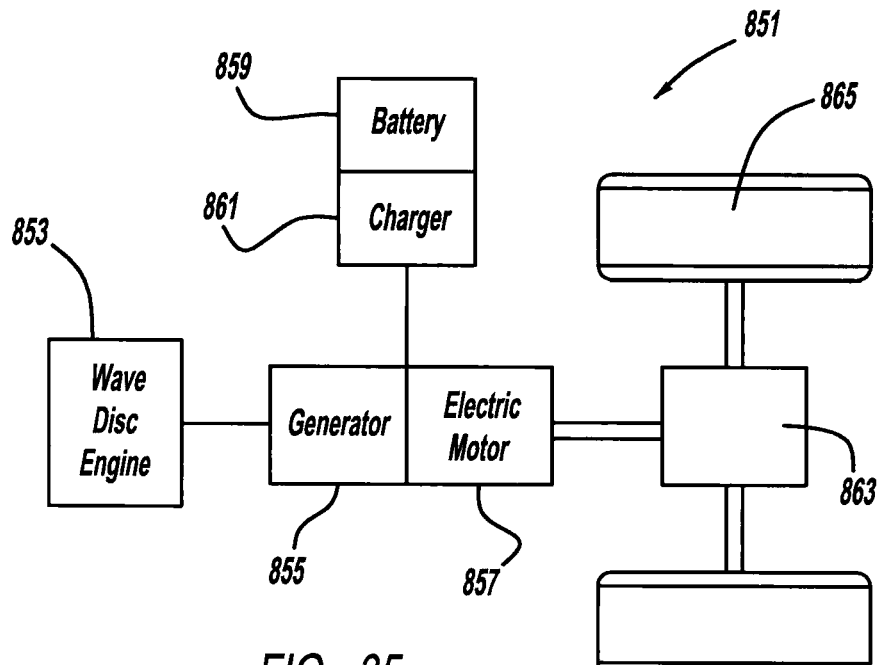
FIG. 35 is a diagrammatic view showing an electric driving system for an automotive vehicle in a twenty-second embodiment apparatus of the present invention.
Figure 36:
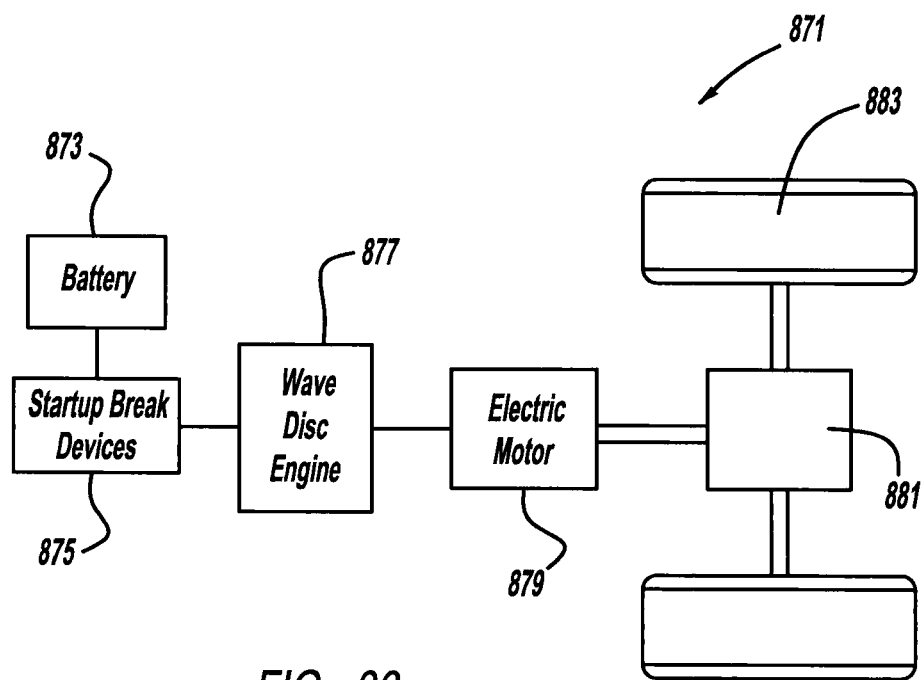
FIG. 36 is a diagrammatic view showing an electric drive system for an automotive vehicle in a twenty-third embodiment apparatus of the present invention.

Another configuration is shown as apparatus 851 in FIG. 35. This embodiment employs a radial wave rotor acting as a wave disc engine 853 which is connected to a generator 855 and electric drive motor 857, which may be coupled together as a single unit. A battery 859 and charger/alternator 861 can also supply power to electric motor 857. Electric traction motor 857 directly and mechanically drives a transmission 863 and drive wheels 865 which have tires thereon.

Yet another embodiment apparatus 871 for use in an automotive vehicle employs a battery 873 connected to start-up and breaking energy recapture devices 875. Such devices 875 are also connected to drive a wave disc engine 877, preferably employing a radial wave rotor, which is connected to an electric traction motor 879. Electric traction motor directly and mechanically drives a transmission 881 and driving wheels 883.

Figure 37:
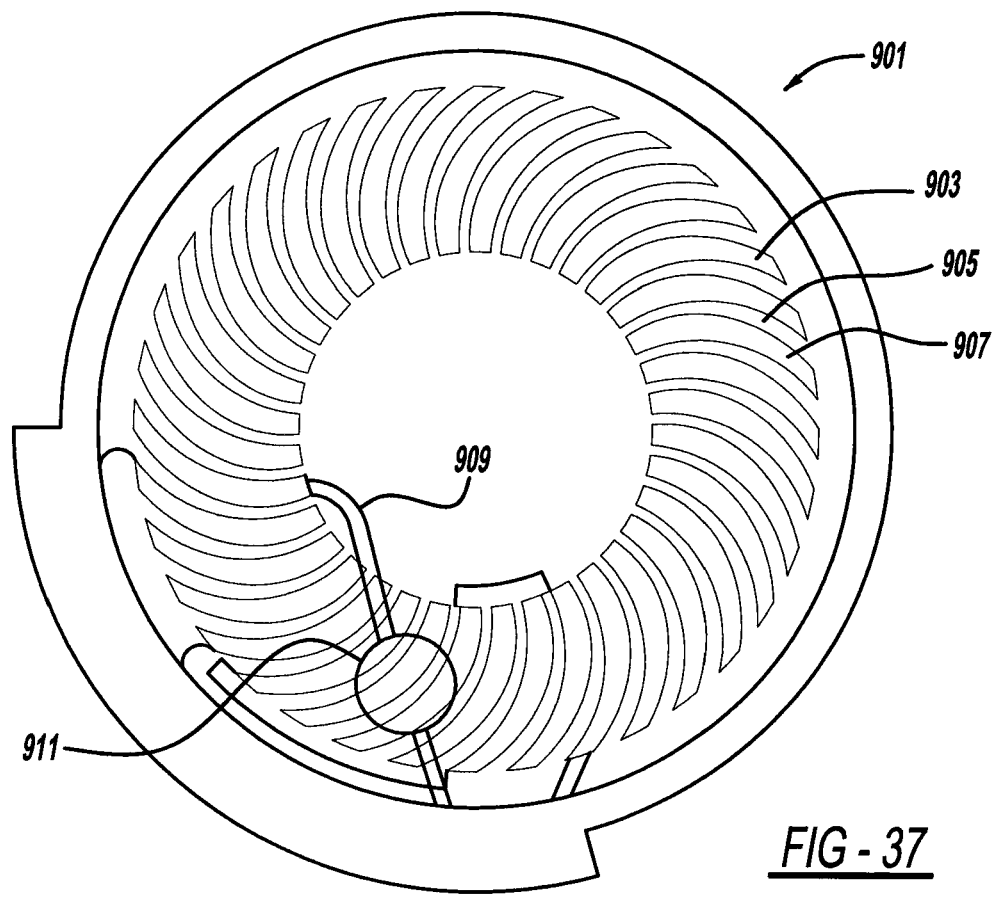
FIG. 37 is a diagrammatic true view showing a twenty-fourth embodiment apparatus of the present invention.

Referring to FIG. 37, another embodiment of a wave disc engine apparatus 901 includes a radial wave rotor 903 including a plurality of generally radially elongated and curved channels 905 separated by walls 907. Inner and outer end plates (now shown) are provided and a re-circulating or bypass conduit 909 connects an outlet port to an inlet port of the end plates and includes a laterally enlarged plenum 911 between ends of conduit 909. Plenum 911 is preferably of a generally spherical shape having an internal cross-sectional area at least twice that of conduit 909.

Figure 38:
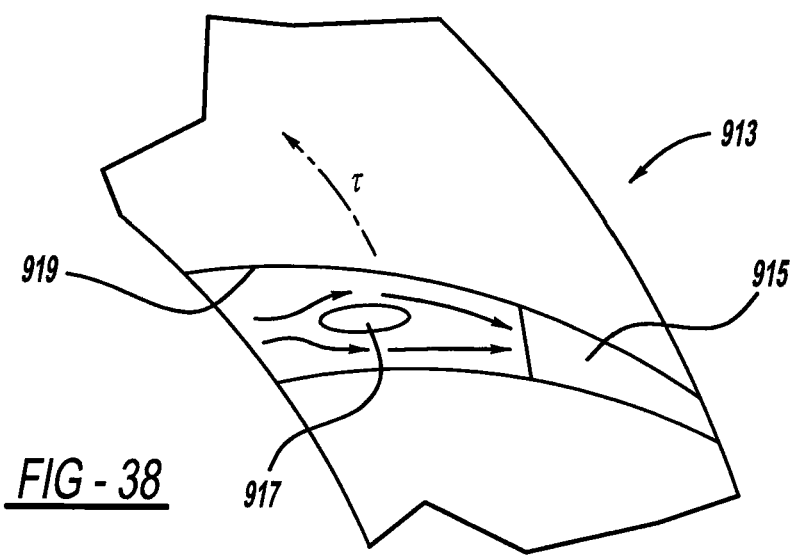
FIG. 38 is a diagrammatic true view showing a twenty-fifth embodiment apparatus of the present invention.
Figure 39:
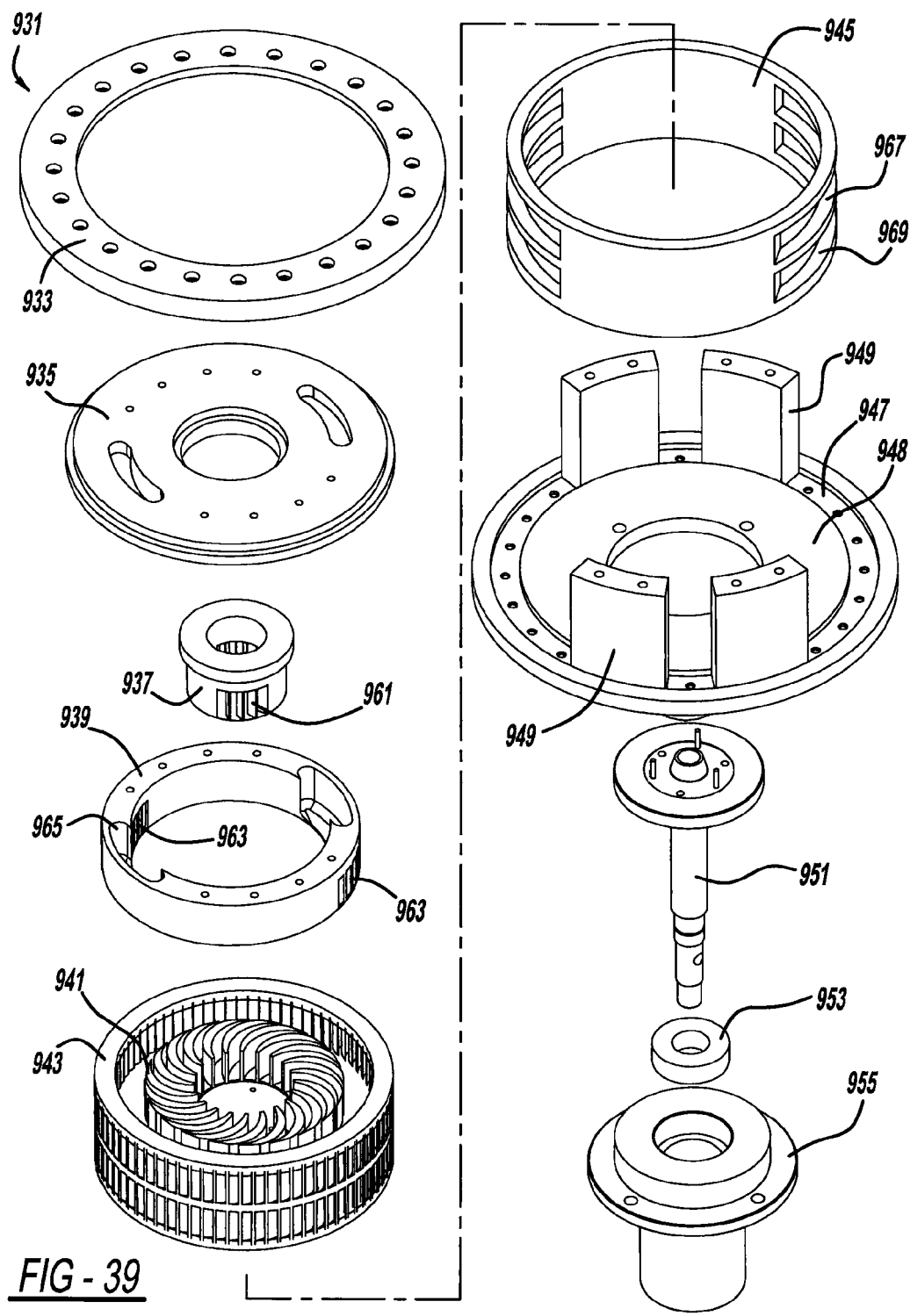
FIG. 39 is an exploded perspective view showing a twenty-sixth embodiment apparatus of the present invention.
Figures 41, 42:
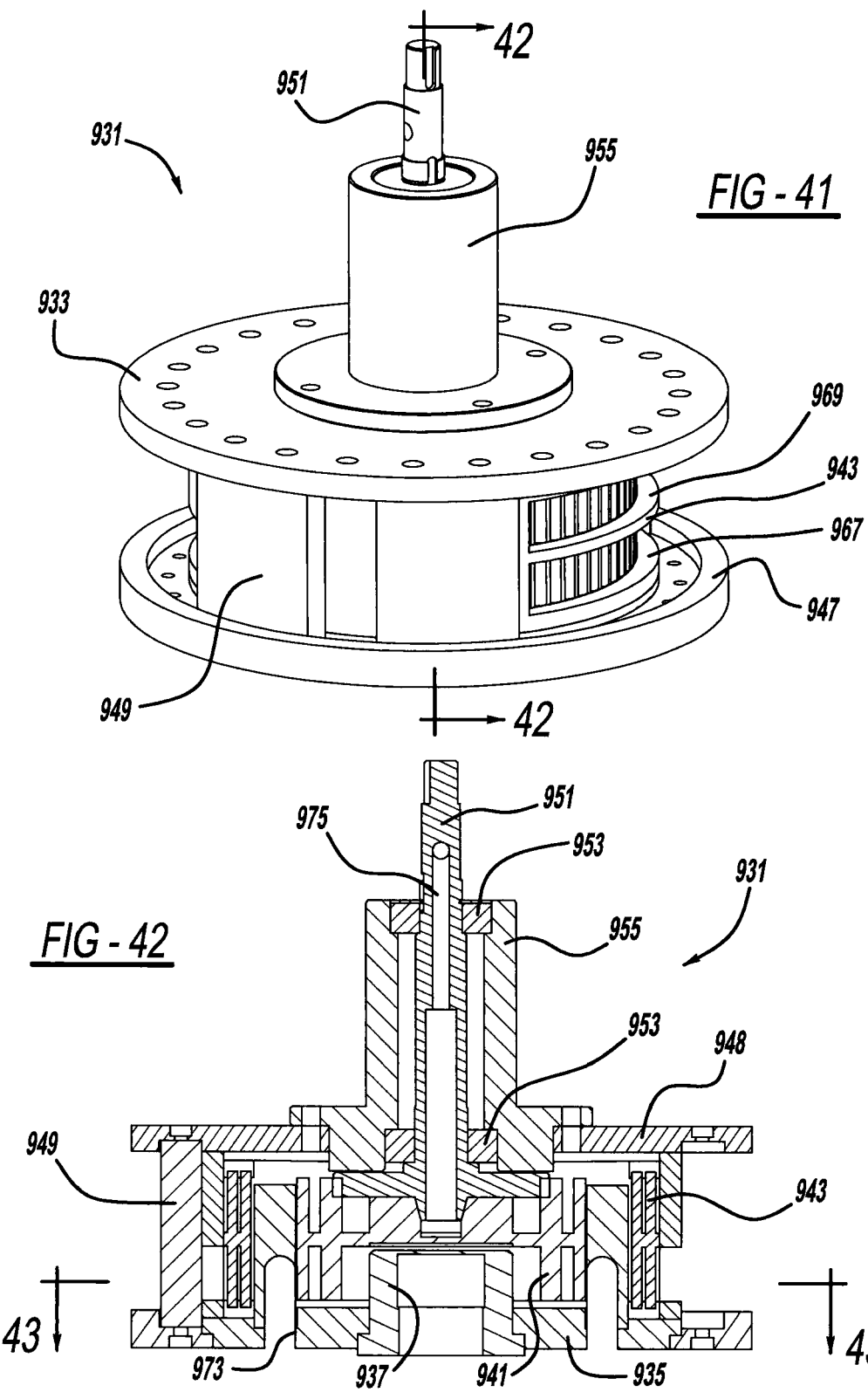
FIG. 41 is a perspective view showing the twenty-sixth embodiment apparatus.
FIG. 42 is a cross-sectional view, taken along line 42-42 of FIG. 41, showing the twenty-sixth embodiment apparatus.

FIG. 38 illustrates another embodiment wave rotor 913, such as that used in a wave disc engine. A radially elongated and converging arcuate channel 915 of radial wave rotor 913 includes an airfoil vane or wing 917 upstanding in a generally middle section of at least one, and preferably each of channels 915. Wing 917 is shown as having a generally oval true view shape, but it may alternately have pointed leading and/or trailing ends, symmetrical thickness, cambered thickness or various angles of attack relative to the channel centerline. Airfoil wing 917 advantageously causes a fluid flow pressure to be lower on the side thereof facing a leading wall surface 919 against which positive torque τ is desired in order to self-propel wave rotor 913. While it is preferred that such an airfoil wing 917 be used in a radial wave rotor for an automotive vehicle engine, which uses centrifugal scavenging and supersonically flowing shock waves in an air and fuel fluid mixture, it is alternately envisioned that such a freestanding, mid-channel airfoil wing can be employed in an axial wave rotor or other turbine rotor although many of the present advantages may not be fully realized.

Referring now to FIGS. 39-43, a wave disc engine apparatus 931 includes an upper fastening ring 933, an upper circular side plate 935, an annular inner end plate 937, an annular outer end plate 939, an upper radial wave rotor 941, a radial turbine 943, an optional annular outer housing 945, a lower fastening ring 947, a lower circular bottom side plate 948, structural spacers 949, an output shaft 951, bearing assemblies 953 and a stationary hub 955. It should be alternately appreciated that a fastening ring, the adjacent side plate, the spacers and/or the housing, may be integrally made from a single piece, and that spacers 949 may be entirely replaced by housing 945. Output shaft 951 is rotatably driven by wave rotor 941 while a concentrically nested or oppositely projecting secondary output shaft (not shown) is coupled to and operably rotated by turbine 943 which concentrically surrounds wave rotor 941 with outer end plate 939 therebetween. The wave rotor and turbine are shown as being of a double layer variety, although a single layer or additional layers may be employed.

Air and fuel fluid inlet ports 961 are provided in inner end plate 937 and high pressure exhaust ports 963 are provided in outer end plate 939. Furthermore, optional low pressure exhaust ports 965 are provided in outer end plate 939 for complete combustion fluid scavenging, and optional outlet ports 967 and 969 are located in housing 945 for coupling to optional recirculation return channels or exhaust venting. Moreover, it is alternately envisioned that pure, pre-heated fuel can be injected into injection apertures 971 in side plate 935 so as to flow the fuel directly into the aligned channels between ends thereof after insertion of fresh air into inner ends of the channels. Additionally, cross-flow exhaust ports 973 are provided in at least one of side plates 935 aligning with exhaust ports 965 in end plate 939. Furthermore, it is noteworthy that output shaft 951, coupled to an electric generator, has a hollow internal core 975 through which cooling air may be pumped for cooling bearing assemblies 953 and/or for carrying sensor wires.

Another embodiment wave disc engine 981 is illustrated in FIG. 44. A radial wave rotor 983 is coaxially sandwiched between an upper side plate 985 and a lower side plate 987. Radial wave rotor 983 has generally radially elongated channels or passageways 989 outwardly extending away from an axial centerline 991 about which they are operably rotated. These channels 989 may be straight or arcuately curved as discussed with any of the prior embodiments, and inner ends may be slightly offset from alignment with centerline 991, as is illustrated. An outer end plate 993 includes outlet ports 995 selectively aligned with peripheral ends of at least one of channels 989. An annular inner end plate may also be optionally used.

Generally, radially elongated inlet ports 997 are disposed in upper side plate 985 and similarly oriented radially elongated outlet ports 999 are disposed in lower side plate 987, to allow for cross-flow of air and/or fuel into a middle section of the aligned channels 989. This cross-flow embodiment, wave disc engine is preferably etched from silicone wafers and preferably has an outer diameter less than 10 cm. It is believed that this cross-flow design will provide constant volume combustion in a cyclical action of scavenging and refueling, combustion and expansion, in a very fast manner using centrifugal shock waves within the channels. At least 10 channels are present in the wave rotor and at least 6 radially elongated cross-flow ports are in each side plate. It is alternately envisioned that the wave rotor channels and/or cross-flow ports may have an arcuate configuration.

Figure 45:
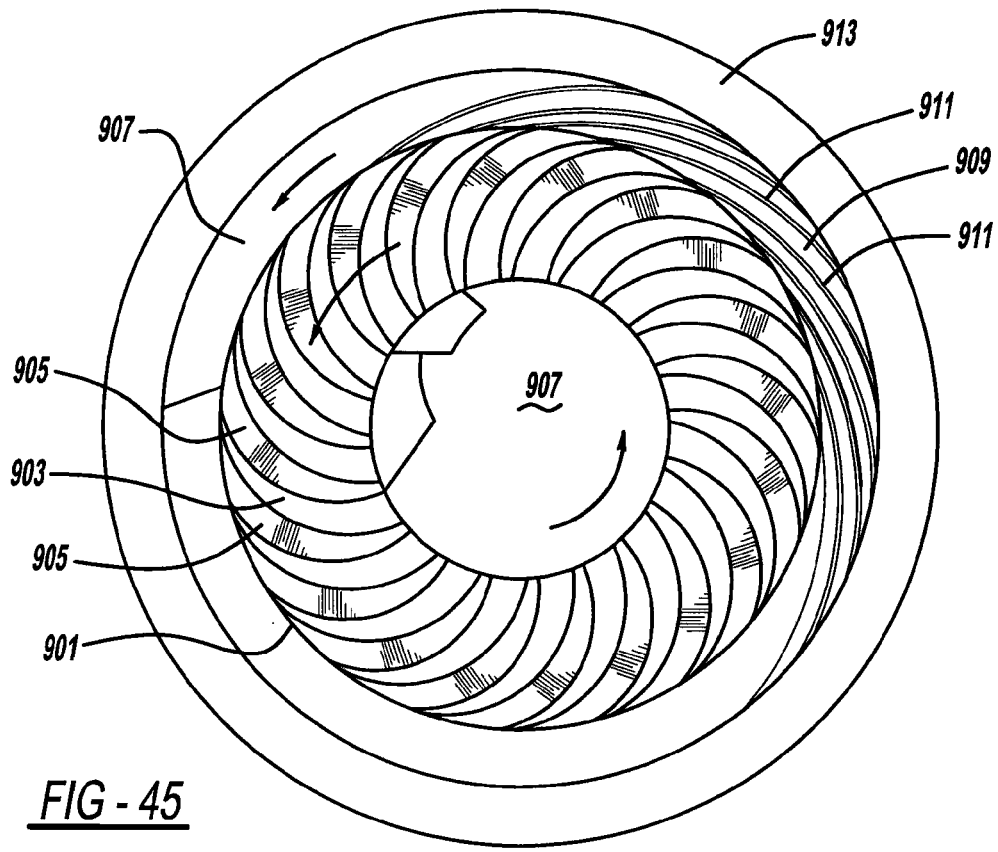
FIG. 45 is a diagrammatic true view showing a twenty-eighth embodiment apparatus of the present invention.

FIG. 45 shows a different embodiment of a wave disc engine. A radial wave rotor 901 has multiple arcuate converging passageways or channels 903 defined by upstanding walls 905. A casing 907 acts as an outer end plate and inner end plate upstanding from a disc spanning beneath rotor 901. Casing 907 includes multiple walls 911 defining passageways or channels 909 therein. These channels 909 arcuately curve in the same general direction essentially as an extension of rotor channels 903, but casing channels 909 have a more gradual and larger radius. An optional stationary housing 913 concentrically surrounds and is below casing 907 and rotor 901. Housing can either contain spaced apart exit ports or be primarily open to ambient air. Casing 907 rotates in the same direction as, but at a slower speed than, rotor 901 based on combusted fluid flowing from rotor channels 903 to casing channels 909 when they are aligned. For example, if casing 907 (rotating at 20,000 rpm) maintains the same combustion timing as in a 10,000 rpm wave disc engine, but is matched with radial wave rotor 901 rotating at 30,000, then there is a 10,000 rpm difference such that turbine work extraction at 30,000 rpm generates significantly more output power without negatively impacting combustion performance; this is in accordance with Euler's turbine equation. In this example, it is believed that the torque imparted by the combusting fluid will be: channel power=4.79 kW; outer casing power=0.67 kW; inlet power=−1.01 kW; thus a net power=4.48 kW. The generally radial fluid flow movement self-propels the wave rotor and casing.

Figure 46:
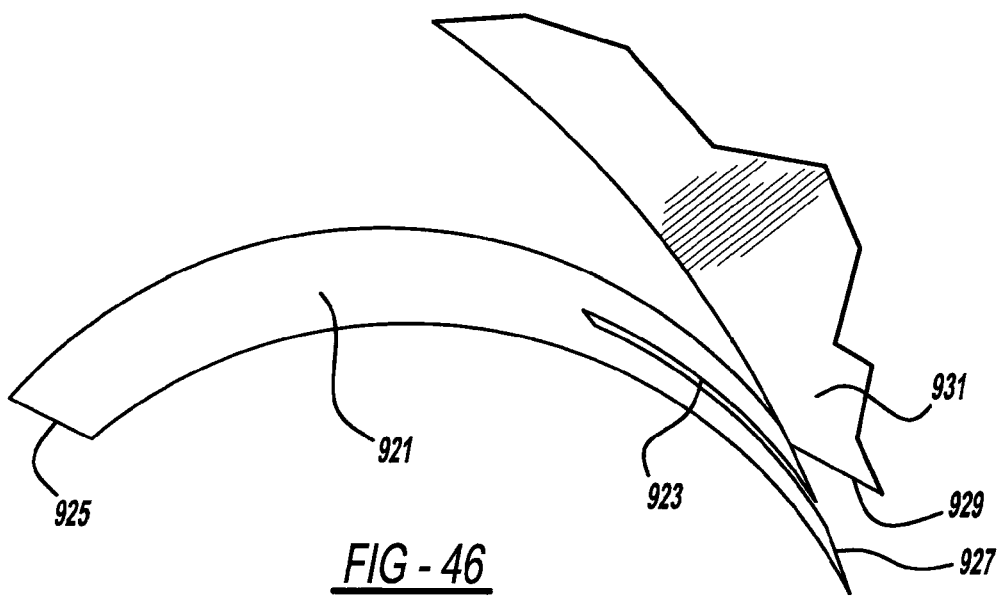
FIG. 46 is a diagrammatic true view showing a twenty-ninth embodiment apparatus of the present invention.

Referring now to the radial wave rotor variation of FIG. 46, one or more arcuately converging channels 921 has an elongated and arcuate splitting vane 923 located adjacent outlet end 927 and spaced away from inlet end 925. Vane 923 essentially divides the trailing third (i.e., less than a majority) of the channel length into two generally equal width and parallel segments. The outlet end 927 is shown aligned with an exit port 927 in an outer end plate 931. It is envisioned that splitting vane 923 will increase power extraction from the wave rotor by at least 20%. This is believed to be due to the generally radially moving combusting fluid and shock wave pressures creating positive torque on a pair of segment wall surfaces in the same channel, especially at the trailing portion of channel 921 which receives the majority of torque propulsion. The larger width and unobstructed initial two-thirds or majority of channel 921 allow for less wall surface friction losses, improved fuel-air mixing, and full combustion prior to fluid splitting by vane 923. It is alternately envisioned that vane 923 may have an airfoil shape. Furthermore, an alternate configuration employs an elongated splitting vane in a trailing minority section of any turbine or turbomachine rotor channel, although not all of the present advantages may be achieved.

Any of the radial wave rotor configurations disclosed herein are preferably manufactured from a zirconia ceramic powder in the following sequence. First, the ceramic powder is partially sintered. Second, it is then compressed in a set of dies. Third, the compressed power block is thereafter machined on a milling machine, etched or electrode cut to form the channels therein. Fourth, the machined ceramic wave rotor is fully sintered. The finished wave rotor is subsequently assembled to the support, output shaft and housing.

While various embodiments of the present wave disc engine apparatus have been disclosed, it should be appreciate that other modifications may be made. For example, more or less fluid flowing passageways and channels may be employed although some of the present advantages may not be realized. Additionally, differently shaped conduits and fluid flow paths may be provided, however, certain benefits from the present apparatus may not be achieved. Moreover, it should be appreciated that fluid flow can be reversed in some channels to flow toward the rotational axis, but some advantages may not be obtained. It is alternately envisioned that some of the features disclosed herein can be used for an axial wave rotor, although the radial centrifugal scavenging and other advantages will be forfeit. Additionally, while the wave disc engine apparatus is preferably used to power an automotive vehicle, other uses, such as aerospace and power plant turbine applications, may be employed, but certain advantage may not be realized. It is alternately envisioned that oxygen (oxidant/oxidizer) can be used instead of air, which will provide higher temperatures and likely, greater engine efficiencies. Individual elements or features of a particular embodiment are generally not limited to that particular embodiment, but, where applicable, are interchangeable and can be used in any of the other embodiments, even if not specifically shown or described. It is intended by the following claims to cover these and any other departures from the disclosed embodiments which fall within the true spirit of this invention.

The invention claimed is:

1. A wave apparatus comprising:
   (a) a radial wave rotor further comprising fluid flowing passageways which are rotatable about a central axis and outwardly radiate from the central axis, each of the passageways including an inlet and an outlet;
   (b) a stationary end plate including at least one port which allows fluid to enter an aligned inlet of the passageways and blocking fluid entry of the other inlets; and
   (c) a stationary conduit communicating between internal ends of at least two but less than all of the passageways of the radial wave rotor, opposite ends of the stationary conduit being located adjacent the end plate, the stationary conduit being within an outer periphery of the radial wave rotor, and the stationary conduit being adapted to at least one of the following:
      (i) bypass an additional passageway located between the at least two passageways which are spaced apart from each other;
      (ii) include a laterally enlarged plenum between the internal ends; or
      (iii) have a substantially J- or U-shape adjacent to the stationary end plate, which is an inner end plate of substantially cylindrical shape, wherein the stationary conduit operably redirects leaking fluid otherwise passing through a gap between a wall defining at least one of the passageways and the inner end plate.

2. The apparatus of claim 1, wherein the stationary conduits substantially straight and the spaced apart passageways are substantially opposite each other.

3. The apparatus of claim 1, further comprising an automotive vehicle comprising an electric traction motor, wherein rotation of the radial wave rotor generates electricity for use by the electric traction motor.

4. The apparatus of claim 1, further comprising an airfoil wing located within at least one of the passageways to increase positive rotational torque of the radial wave rotor when combusting fluid flows past both sides of the airfoil wing.

5. The apparatus of claim 1, wherein each of the passageways have a constricted width dimension closer to an external end than the internal end, and further comprising at least one of:
   (a) a smallest constricted width dimension being at or less than one-half of an internal end width dimension; or
   (b) the width dimension of each of the passageways converging toward the external end.

6. The apparatus of claim 1, wherein a flow path of combusted fluid flows in a first average direction between the internal end and a sharp bend, and then in a second average direction between the bend and an external end for at least one of the passageways, the second direction' being angularly offset from the first direction within 70-150°, and a majority of internal surfaces defining the passageways at the second direction being straight.

7. The apparatus of claim 1, wherein the stationary conduit redirects any undesired fluid leaking from any of the passageways.

8. The apparatus of claim 7, wherein the stationary conduit reduces backfiring of the radial wave rotor when fuel is burned in the passageways.

9. The apparatus of claim 1, wherein the stationary conduit has the additional passageway located between the at least two passageways which the conduit bypasses, the stationary conduit spanning between the internal ends of the at least two of the passageways.

10. The apparatus of claim 1, wherein the stationary conduit includes the laterally enlarged plenum which is internal to the radial wave rotor.

11. The apparatus of claim 1, wherein the plenum has a lateral cross-sectional area at least twice that of the stationary conduit which is a recirculation conduit, and fuel is combusted in the radial wave rotor passageways, and an inlet and an outlet of the plenum are connected to the stationary conduit both ends of which are connected to the radial wave rotor.

12. The apparatus of claim 1, wherein the plenum is substantially spherical and modifies a fluid shock wave flowing through the stationary conduit which is a recirculation conduit.

13. The apparatus of claim 1, wherein the stationary conduit recirculates combusted high pressure fluid from the outlet of one of the spaced apart passageways to the inlet of the other of the spaced apart passageways.

14. The apparatus of claim 1, wherein at least three of the passageways are co-planar and perpendicular to the central axis, and the at least three passageways are located between the opposite ends of the stationary conduit.

15. The apparatus of claim 1, wherein the stationary conduit collects high-pressure exhaust gas exiting at least one of the passageways and ducts the gas into another of the passageways to use extra energy from the high-pressure exhaust gas in order to additionally drive the radial wave rotor in a second pass so as to increase efficiencies.

16. The apparatus of claim 1, wherein a portion of each passageway containing a smallest constricted width dimension serves as a nozzle which generates a supersonic velocity of combustion fluid flowing in a tangential direction between the nozzle and the external outlet.

17. The apparatus of claim 1, further comprising at least one side plate stacked upon the radial wave rotor, the side plate including substantially radially elongated inlet ports which supply cross-flowing fluid into a middle section of the passageways when aligned therewith, and combusted fluid exiting the passageways.

18. The apparatus of claim 17, wherein there are at least ten radially elongated passageways in the radial wave rotor and at least six radially elongated inlet ports in the side plate, the radially elongated passageways are co-planar and elongated perpendicular to the central axis, and the fluid entering the inlet port of the side plate is air.

19. The apparatus of claim 1, wherein the stationary conduit includes the substantially J- or U-shape.

20. A wave apparatus comprising:
    a radial wave rotor including elongated fluid flow channels rotating around an axial centerline;
    a recirculation conduit coupling an end of at least a first of the channels to an end of at least a second of the channels, the at least first and second channels being spaced away from each other by at least one intervening channel not coupled to the recirculation conduit;
    a laterally enlarged plenum being located in the recirculation conduit between first and second ends thereof;
    an internal end plate;
    the first end of the recirculation conduit being between the internal end plate and the axial centerline; and
    the second end of the recirculation conduit being peripherally external to the channels.

21. The apparatus of claim 20, wherein the recirculation conduit recirculates combusted high pressure fluid from the outlet of one of the spaced apart channels to the inlet of the other of the spaced apart channels.

22. The apparatus, of claim 20, wherein the channels of the radial wave rotor are substantially radially elongated away from the axial centerline, and opposite ends of the recirculation conduit are located adjacent to the radial wave rotor with only the plenum being located between the recirculation conduit ends.

23. The apparatus of claim 20, wherein the plenum has a lateral cross-sectional area at least twice that of the recirculation conduit and fuel is combusted in the radial wave rotor channels.

24. The apparatus of claim 20, wherein the plenum is substantially spherical and modifies a fluid shock wave flowing through the recirculation conduit, and the plenum is located internal to the radial wave rotor.

25. The apparatus of claim 20, wherein all of the recirculation conduit is located internal to a radial wave rotor housing.

26. The apparatus of claim 20, wherein a fluid flow direction is straight between a first end of the conduit and the plenum and between the plenum and an opposite second end of the conduit.

27. A wave apparatus comprising:
(a) a radial wave rotor further comprising fluid flowing passageways which are rotatable about a central axis, each of the passageways including an inlet and an outlet;
(b) a stationary inner end plate including at least one port which allows fluid to enter an aligned inlet of the passageways;
(c) a conduit communicating between ends of at least two spaced apart but less than all of the passageways of the radial wave rotor;
(d) the conduit recirculating combusted high pressure fluid from the outlet of one of the spaced apart passageways to the inlet of the other of the spaced apart passageways;
(e) an end of the conduit being located between the inner end plate and the central axis, with at least a majority of the conduit being elongated in a substantially radial direction; and
(f) an automotive vehicular traction motor coupled to the radial wave rotor.

28. The apparatus of claim 27, wherein a portion of each passageway containing a smallest constricted width dimension serves as a nozzle which generates a supersonic velocity of the combusted high pressure fluid flowing in a tangential direction between the nozzle and an external end.

29. The apparatus of claim 27, wherein: the passageways outwardly radiate from the central axis; additional passageways are located between the spaced apart passageways; and the conduit is stationary and spans between multiple internal ports in the inner end plate.

30. The apparatus of claim 27, wherein at least three of the passageways are co-planar and perpendicular to the central axis, and the conduit is internal to the radial wave rotor.

31. The apparatus of claim 27, wherein the conduit is substantially straight and the spaced apart passageways are substantially opposite each other, and the conduit spans across an open central portion of the inner end plate.

32. The apparatus of claim 27, further comprising a laterally enlarged plenum located adjacent a middle section of the conduit to change a characteristic of a shockwave being transmitted through the conduit, the radial wave rotor using pressure waves in combusted high pressure fluid in the passageways triggered by sudden opening and closing of the passageways during their rotation relative to the stationary inner end plate, and the plenum is within an outer periphery of the radial wave rotor.

33. The apparatus of claim 27, wherein the automotive vehicular traction motor is an electric traction motor, wherein rotation of the radial wave rotor generates electricity for use by the electric traction motor.

34. The apparatus of claim 27, further comprising an airfoil wing located within at least one of the passageways to increase positive rotational torque of the radial wave rotor when combusting fluid flows past both sides of the airfoil wing.

35. The apparatus of claim 27, wherein each of the passageways have a constricted width dimension closer to an external end than in internal end, and further comprising at least one of:
(a) a smallest constricted width dimension being at or less than one-half of an internal end width dimension; or
(b) the width dimension of each of the passageways converging toward the external end.

36. A wave apparatus comprising:
(a) a radial wave rotor further comprising fluid flowing passageways which are rotatable about a central axis, each of the passageways including an inlet and an outlet;
(b) a stationary end plate including at least one port which allows fluid to enter an aligned inlet of the passageways;
(c) a conduit communicating between ends of the passageways of the radial wave rotor;
(d) the conduit recirculating combusted high pressure fluid from the outlet of one of the passageways to the inlet of another of the passageways;
(e) an automotive vehicular traction motor coupled to the radial wave rotor;
(f) the conduit redirecting undesired leaking fluid otherwise passing through a gap between a wall defining at least one of the passageways and the end plate;
(g) the conduit including a substantially J- or U-shape adjacent to the end plate; and
(h) the conduit being within an outside periphery of the radial wave rotor.

37. The apparatus of claim 36, wherein at least three of the passageways are co-planar and perpendicular to the central axis, and the at least three passageways are located between opposite ends of the conduit which are connected to the end plate.

38. The apparatus of claim 36, wherein the conduit collects the combusted high-pressure fluid, which is an exhaust gas, exiting the one of the passageways and ducts the gas into another of the passageways to use extra energy from the combusted high-pressure fluid in order to additionally drive the radial wave rotor in a second pass so as to increase efficiencies.

39. The apparatus of claim 36, further comprising a laterally enlarged plenum located adjacent a middle section of the conduit to change a characteristic of a shockwave being transmitted through the conduit, the radial wave rotor being a radial wave rotor engine which uses pressure waves in the combusted high-pressure fluid in the passageways triggered by sudden opening and closing of the passageways during their rotation relative to the end plate, the plenum being internal to the radial wave rotor.

40. The apparatus of claim 36, wherein the conduit reduces backfiring of the radial wave rotor when fuel is burned in the passageways, and the stationary end plate is an inner end plate with a central opening therein.

* * * * *